US007289233B2

(12) United States Patent
Kurokawa et al.

(10) Patent No.: US 7,289,233 B2
(45) Date of Patent: Oct. 30, 2007

(54) OPTICAL FILM MEASURING DEVICE

(75) Inventors: Masahiro Kurokawa, Fukuchiyama (JP); Takeshi Takakura, Kyoto (JP); Shinji Mizuhata, Fukuchiyama (JP)

(73) Assignee: Omron Corporation, Kyoto-shi (JP)

( * ) Notice: Subject to any disclaimer, the term of this patent is extended or adjusted under 35 U.S.C. 154(b) by 510 days.

(21) Appl. No.: 10/798,785

(22) Filed: Mar. 12, 2004

(65) Prior Publication Data

US 2004/0223165 A1 Nov. 11, 2004

(30) Foreign Application Priority Data

Mar. 14, 2003 (JP) ............................. 2003-70026

(51) Int. Cl.
*G01B 11/28* (2006.01)
*G01J 3/46* (2006.01)
*G06K 9/00* (2006.01)
*G01N 21/86* (2006.01)
*G01V 8/00* (2006.01)

(52) U.S. Cl. .................... 356/630; 356/402; 382/141; 382/145; 250/559.27

(58) Field of Classification Search ................. None
See application file for complete search history.

(56) References Cited

U.S. PATENT DOCUMENTS 5,608,526 A * 3/1997 Piwonka-Corle et al. ... 356/369
6,137,575 A * 10/2000 Sugiyama et al. .......... 356/503
6,181,427 B1 * 1/2001 Yarussi et al. .............. 356/445
7,012,699 B2 * 3/2006 Shinya et al. ............... 356/504
2004/0246493 A1 * 12/2004 Kim et al. ................... 356/504
2005/0002624 A1 * 1/2005 Finarov ...................... 385/115

FOREIGN PATENT DOCUMENTS

| JP | 57052806 A | * | 3/1982 |
| JP | 7-003365 |   | 1/1995 |
| WO | WO 03025497 A1 | * | 3/2003 |
| WO | WO 03040771 A2 | * | 5/2003 |

* cited by examiner

Primary Examiner—Gregory J. Toatley, Jr.
Assistant Examiner—Gordon J. Stock, Jr.
(74) Attorney, Agent, or Firm—Foley & Lardner LLP

(57) ABSTRACT

Light emitted from a light source (22) is used through a light projection optical system (23) to perform coaxial down-emission lighting on a measurement target (36). Light reflected by the measurement target (36) is formed on a photo-detector (26) through an image formation optical system (24). Along its optical path, a spectroscope (25) is provided for converting an image impinging on the photo-detector (26) into a spectroscopic image having a predetermined wavelength band. A measurement point extraction portion (32) in a signal processing portion (28) determines a predeterm film thickness measurement point from an image picked up by the photo-detector (26), extracts an image signal at the film thickness measurement point, and transmits t to film thickness operation portion (33). The film thickness operation portion (33) measured film thickness of a thin film, which is the measurement target (36), from this signal.

16 Claims, 38 Drawing Sheets

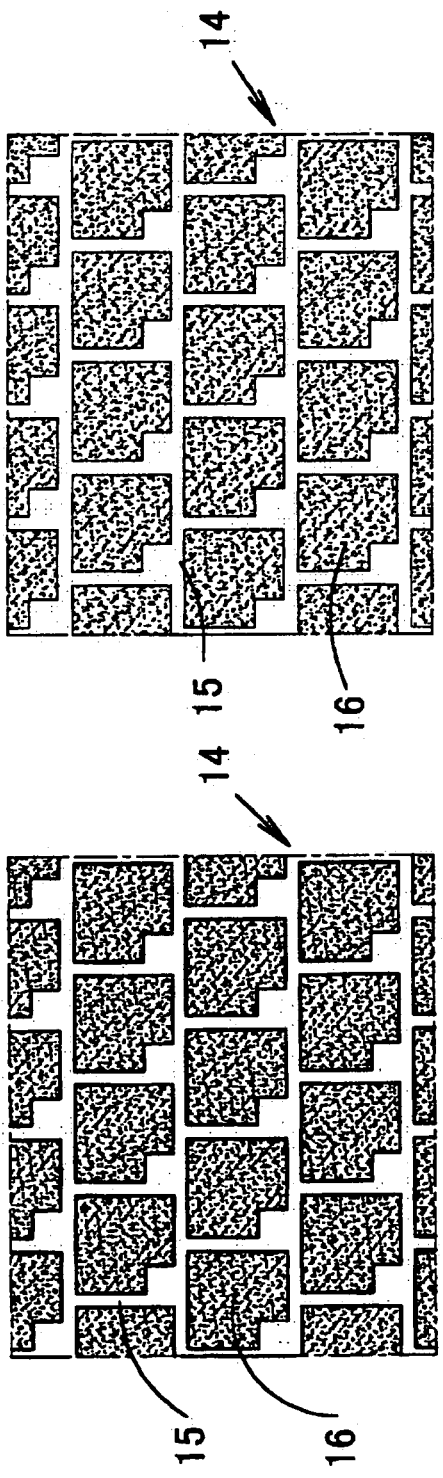
Fig. 26A
Fig. 26B
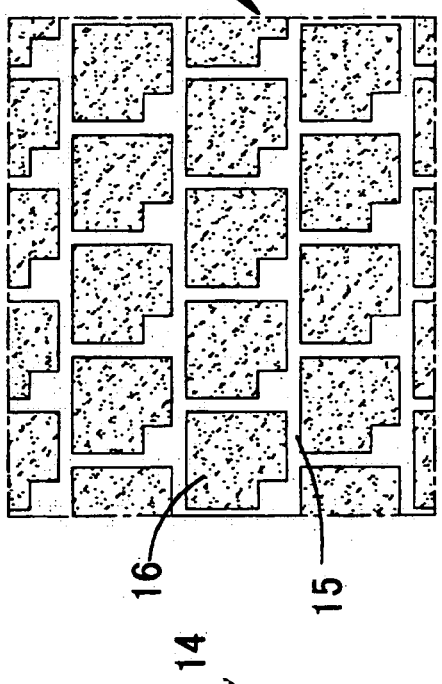
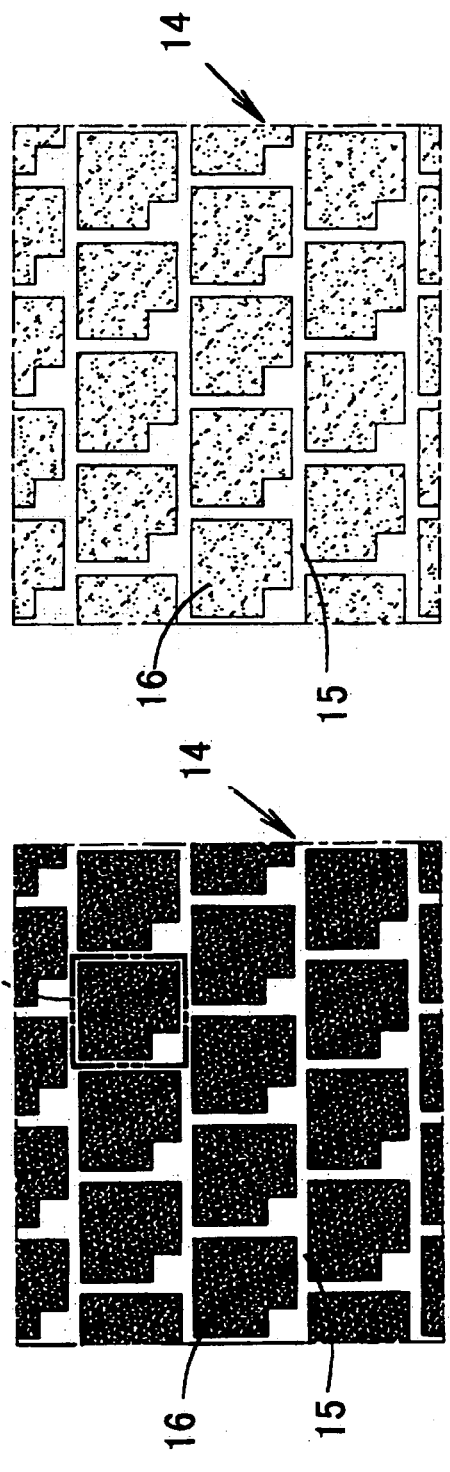
Fig. 26C
Fig. 26D 48B  48G  48R 48B  48G  48R

OPTICAL FILM MEASURING DEVICE

BACKGROUND OF THE INVENTION

1. Field of the Invention

The present invention relates to an optical film measuring device. More specifically, it relates to an optical film measuring device for measuring film properties such as a thickness and chromaticity of a thin film having transparency.

2. Description of the Prior Art

A film thickness inspecting device having a structure such as shown in FIG. 1 is known as a device for measuring a film thickness of a thin film which is formed on a substrate such as a glass substrate or a semiconductor substrate by using reflected light of light with which the substrate is irradiated in a process of manufacturing a flat panel display (FPD) such as a liquid crystal display (LCD) or a plasma display panel (PDP).

In this film thickness inspecting device 1, a movable stage 2 is provided for mounting thereon a measurement target and moving it in a 2-dimensional direction in a horizontal plane, above which movable stage 2 a microscope 3 is arranged. The microscope 3 has such a configuration that below a lens-barrel portion 4 containing part of a microscope optical system an objective lens 5 is provided, above the lens-barrel portion 4 an eyepiece lens 6 is provided, and on a side of the lens-barrel portion 4 a light source 7 is provided. Above the microscope 3, there are provided a spectroscope unit 8 comprised of a diffraction grating 9 and a photo-detector 10 and a camera 11. Further, this film thickness inspecting device 1 is equipped with a signal processing portion 12 for calculating by operations a film thickness of a measurement target and outputting it to a display 13 for displaying an image in a viewing field (observation area) of the microscope 3.

In such a manner, in this film thickness inspecting device 1, a measurement target is set on the movable stage 2 beforehand and a light emitted from the light source is made incident into the lens-barrel 4 from the side. The light incident into the lens-barrel 4 is reflected by a half-mirror (not shown) provided in the lens-barrel 4 and passes through the objective lens 5 so that the measurement target may be subject to coaxial down-emission lighting through the objective lens 5. The microscope 3 has, as a viewing field range, a film thickness measurement point along its optical axis and an observation area surrounding the point, so that an image in the observation area picked up by the camera 11 is displayed on the display 13. Light reflected by the measurement target at a film thickness measurement point centered in the observation area of the light with which the measurement target has been irradiated passes through a pinhole (not shown) in a reflection mirror provided at an image formation position in the microscope 3 and is split by the diffraction grating 9, so that a split-light spectrum generated by the diffraction grating 9 is received by the photo-detector 10. When a measurement switch on the film thickness inspecting device 1 is pressed to turn it on, the signal processing portion 12 measures a film thickness of the measurement target in accordance with a predetermined algorithm based on a received-light-intensity signal received from the photo-detector 10 and displays a measurement result on the display 13. (Such a film thickness inspecting device is disclosed, for example, in Japanese Examined Patent Publication No. No. 1995-3365)

FIG. 2 shows a TFT substrate 14 of an LCD device as one example of a measurement target, in which an image in the observation area of the film thickness inspecting device 1 is displayed. The TFT substrate 14 has been obtained by forming a thin film transistor (TFT) or a wiring line on a surface of a glass substrate and forming a poly-imide film on it. A region on the TFT substrate 14 in which a thin film transistor or a wiring is formed is hereinafter referred to as a light blocking region (black matrix) 15, and a region surrounded by the light blocking region 15 is pixel opening 16. In a case where such a TFT substrate 14 becomes a measurement target, what is to be measured by the film thickness inspecting device 1 is a film thickness in the pixel opening 16 of, for example, the poly-imide film.

However, such a film thickness inspecting device 1 as described above, which employs a light interference method in film thickness measurement, is cable of measuring a film thickness only in a region (at film thickness measurement point P at the center of the observation area) where a regularly reflected light near the optical axis can be received. Therefore, if the film thickness measurement point P of the film thickness inspecting device 1 is positioned on the light blocking region 15, a film thickness of a poly-imide film in the pixel opening 16 cannot correctly be measured.

Therefore, conventionally, a film thickness of a poly-imide is measured after moving the TFT substrate 14 on the movable stage 2 so that a point where film thickness measurement is desired (i.e., film thickness measurement point P in the pixel opening in the TFT substrate 14) may be positioned directly below the optical axis as observing an image through the objective lens 6 under the microscope 3 or as confirming the image displayed on the display 13.

Therefore, a conventional film thickness inspecting device 1 takes time to measure a film thickness and finds it difficult to inspect all of measurement targets by mounting them to a production line and so has been obliged to sample them in inspection.

SUMMARY OF THE INVENTION

In view of the above-described technological problem the present invention has been developed and, it is an object of the present invention to provide an optical film thickness measuring device that measure film properties such as a film thickness and chromaticity of a measurement target at a predetermined positions without aligning the measurement target.

An optical film measuring device related to the present invention is adapted to measure properties of a film of a measurement target at a predetermined film measurement position and comprises: a photo-detector whose observation area is a region which is larger than the film measurement position; part for determining the film measurement position based on an image in an observation area taken in by the photo-detector; part for extracting a signal at the film measurement position from an observation area taken in by the photo-detector; and part for calculating by operations properties of the film based on the signal extracted by the signal extraction part. The optical film measuring device of the present invention can be used to measure properties of a film such as a film thickness and chromaticity.

According to an optical film measuring device related to the present invention, a film measuring position is determined on the basis of an image in an observation area larger than a film measurement position taken in by the photo-detector, based on a signal extracted from which film measurement position, properties of a film can be obtained by operations, so that it is unnecessary to align a film measurement position of a measurement target to a predetermined position each time each of the measurement targets is measured. Therefore, it is possible to measure the properties of a film at a predetermined film measurement position irrespective of the position of the measurement target.

As a result, time required in film measurement can be reduced, thereby measuring film properties efficiently. Further, a film can be measured in short time, thereby performing in-line measurement in a condition where this optical film measuring device is mounted to a production line. Furthermore, alignment of a measurement target is rendered unnecessary, to eliminate a necessity of an alignment stage, thereby reducing device costs and simplifying film measurement operations.

In a case where an image of a measurement target to be taken in by the photo-detector is a periodic repetition of a pattern having a predetermined shape such as a tetragon or a hexagon, for example, the film measurement position determination part can extract any one of the patterns from the image of the measurement target taken in by the photo-detector and define a predetermined position in this pattern as the film measurement position. If the image has a periodic repetition of a pattern, by utilizing an image recognition technology etc., an original pattern which has been repeated can be extracted, so that in the this embodiment, by determining a predetermined position in that pattern to the film measurement position, the film measurement position can be determined to a constant position regardless of where the measurement target is positioned. The periodic repetition of a pattern having a predetermined shape includes an LCD substrate.

As another method for the film measurement position determination part to determine a film measurement position, a pattern registered beforehand is extracted from an image of a measurement target taken in by the photo-detector so that a predetermined position in this pattern may be determined as the film measurement position. According to this embodiment, by extracting a pattern registered beforehand from an image taken in by the photo-detector and determining the film measurement position as a predetermined position in this pattern, it is possible to determine the film measurement position to a constant position regardless of where a measurement target is positioned. Further, according to a pattern registering method, a pattern of interest can be extracted securely even in a case where an image has a plurality of patterns.

The film measurement position in the pattern may be registered in storage part as specified by an operator etc. from an outside through input part beforehand so that in accordance with the pattern extracted, for example, a center, a corner, or an intersection of the pattern can be determined automatically. In accordance with the former a fine film measurement position can be specified and in accordance with the latter the film measurement position can be determined automatically, thereby simplifying film measurement operations.

A method for registering a pattern extracted from an image can use: part for registering in storage part for registering in it as the registered patterned a pattern extracted on the basis of a characteristic point if the characteristic point is specified through input part from an outside on an image of a measurement target taken in by a photo-detector; and part for displaying the extracted pattern in a condition where it is superimposed on the image in an observation area. A pattern is extracted on the basis of a characteristic point in a case, for example, where a region or shape surrounded by characteristic points specified by an operator etc. is used as a pattern. According to such an embodiment, a pattern can be specified simply. Further, by displaying the extracted pattern as superimposed on an image in the observation area, it is possible to easily confirm that an operator's intended pattern has been registered properly. Display requirements should be such that a shape of the pattern and its position on a screen may be distinguished from each other, including reversing display, displaying of a specific color, or surrounding outer shapes of a pattern by bald lines, broken lines, etc.

Further, another method of registering a pattern extracted from an image may use part for extracting a pattern contained in a partial image if the partial image is specified, through input part from an outside, on an image of a measurement target taken in by a photo-detector and registering this pattern in storage part as the registered patterned; and part for displaying the extracted pattern in a condition where it is superimposed on the image in an observation area. According to the this embodiment, only by specifying a region one size larger than a pattern desired to be specified as a pattern to be registered, a pattern included in it is extracted as the pattern to be registered, so that the pattern to be registered need not accurately be specified, thereby enabling simplifying pattern registration operations.

A further method for a registering a pattern extracted from an image may use: part for, if one point or region is specified, through input part from an outside, on an image of a measurement target taken in by a photo-detector, extracting as a pattern a region which contains this one point or region and which has roughly a constant luminosity over the image and registering the extracted pattern as the pattern to be registered in storage part; and part for displaying the extracted pattern in a condition where it is superimposed on the image in an observation area. According to this embodiment, a pattern to be registered need not accurately be specified, thereby enabling simplifying pattern registration operations.

The embodiment of the present invention can make incident only light in a predetermined wavelength band upon the photo-detector and is equipped with spectroscopic part which can selectively switch the wavelength band. Therefore, it is possible to measure properties of a film based on images of different wavelength bands obtained by switching the spectroscopic part, thereby measuring properties of the film at an accuracy higher than that in the case of measurement by use of light having a single wavelength or only by use of white light.

In an embodiment equipped with spectroscopic part, when part for determining a film measurement position determines the film measurement position based on an image in an observation area, preferably a contract of this image is set to a highest value. By determining the film measurement position in such a manner that the image contrast may be highest, an accuracy can be improved at which the film measurement position is determined. Although the contrast can be set to a highest value by obtaining images of a measurement target in a plurality of pre-selected wavelength bands and determining beforehand one such of the images as to correspond to one such of the wavelength bands that in it a predetermined position of the obtained images or the image as a whole may have a maximum average contrast (preliminary test), by obtaining by calculations such a wavelength band of a spectroscopic image that in it this image as taken in by the photo-detector may have a highest contrast from pre-registered optical constant and thickness of a measurement target based on information about a configuration of the measurement target, a necessity of the preliminary test can be eliminated. In place of registering the optical constant, a database may be equipped to store an optical constant for each of materials and register the materials so that the optical constant corresponding to any one of the registered materials can be selected from the database and used in calculations.

Further, since the optical film measuring device of the present invention is equipped with part for displaying each of pixels in a color that corresponds to one such of a plurality of wavelength bands that in it a detected light intensity may be the highest in a visible light region of images which correspond to the plurality of wavelength bands obtained by spectroscopic part based on the obtained plurality of wavelength bands, a film measurement position can be set on this image displayed in the color. By doing so, especially in the case of a color filter, it is secure and easy for an operator to select a pixel of a specific color and set it as a film measurement position.

According to the embodiment of the present invention, in a case where an image of a measurement target to be taken in by the photo-detector is a periodic repetition of a pattern having a predetermined shape, the film measurement position determination part extracts a characteristic point of the pattern from the image of the measurement target taken in by the photo-detector, to define a predetermined position with respect to this characteristic point as the film measurement position. It is to be noted that a predetermined position with respect to a characteristic point includes the characteristic point itself. According to this embodiment, not pattern itself but a pattern's characteristic point, for example, a pattern's corner can be used as a reference to determine a film measurement position. A predetermined position with respect to this pattern's characteristic point may be registered beforehand or determined to a constant position.

In a case where an image of a measurement target to be taken in by the photo-detector has lattice-shaped or frame-shaped patterns, a center of intersections of these patterns may be defined as the film measurement point. According to this embodiment, it is possible to easily measure properties of a film at a position where it has lattice-shapes or frame-shapes.

According to the embodiment of the present invention, the film measurement position determination part may be arranged to determine a plurality of film measurement positions based on an image in an observation area taken in by the photo-detector and film properties operation part may be arranged to obtain by operations properties of a film based on a signal extracted from the plurality of film measurement positions. In such an embodiment, it is possible to calculate film properties averaged over a plurality of positions, thereby improving a stability of measurement results.

In the embodiment of the present invention, the photo-detector may take in an image of a measurement target in such a manner as to surround a corner of the measurement target so that from the image taken by the photo-detector the corner of the measurement target can be extracted and used as a reference to thereby determine the film measurement position.

Further, in a case where a measurement target which is formed on a substrate as divided into a plurality of fractions is measured, the photo-detector may take in an image of the measurement target in such a manner as to surround a corner of the substrate so that the image taken in by the photo-detector the corner of the substrate can be extracted and used as a reference to thereby determine the film measurement position. It is thus possible to measure measurement targets at a predetermined position even if the plurality of measurements is formed on the substrate.

When setting a region of an observation area, by permitting an operator to set at his own choice the region of the observation area into which an image is taken in by the photo-detector for each type of a substrate, an image corresponding to a measurement target can be extracted.

The embodiment of the present invention comprises: a light source for emitting white light; spectroscopic part equipped with a spectroscopic filter which covers a range from a visible region to a near-infrared region; and part for measuring chromaticity and a film thickness of a colored thin film. According to this embodiment, it is possible to measure chromaticity and a film thickness of a thin film, which is a measurement target, at a time, thereby performing measurement operations efficiently.

The embodiment of the present invention comprises: a light source for emitting white light; and spectroscopic part in which there are arranged a spectroscopic filter for a wavelength of about 450 nm, a spectroscopic filter for a wavelength of about 550 nm, a spectroscopic filter for a wavelength of about 650 nm, a plurality of spectroscopic filters for a visible-light region, and a plurality of spectroscopic filters for a near-infrared region through an infrared region in such a configuration that at least the spectroscopic filter for a wavelength of about 450 nm, that for a wavelength of about 550 nm, and that for a wavelength of about 650 nm are arranged in order, so that it is possible to obtain an image required to determine a film measurement position in short time by using first the spectroscopic filter for a wavelength of about 450 nm, that for a wavelength of about 550 nm, and that for a wavelength of about 650 nm.

Further, by permitting reflected light and transmitted light of light which has been emitted from the light source and with which a measurement target has been irradiated to be taken in by the photo-detector, it is possible, for example, to measure a film thickness from an image of the reflected light and chromaticity from an image of the transmitted light.

Note here that the above-described components of the present invention can be combined arbitrarily as much as possible.

BRIEF DESCRIPTION OF THE DRAWINGS

FIGS. 26A, 26B, 26C, and 26D show spectroscopic images obtained through different filters.

DESCRIPTION OF THE PREFERRED EMBODIMENTS

First Embodiment

Figure 3:
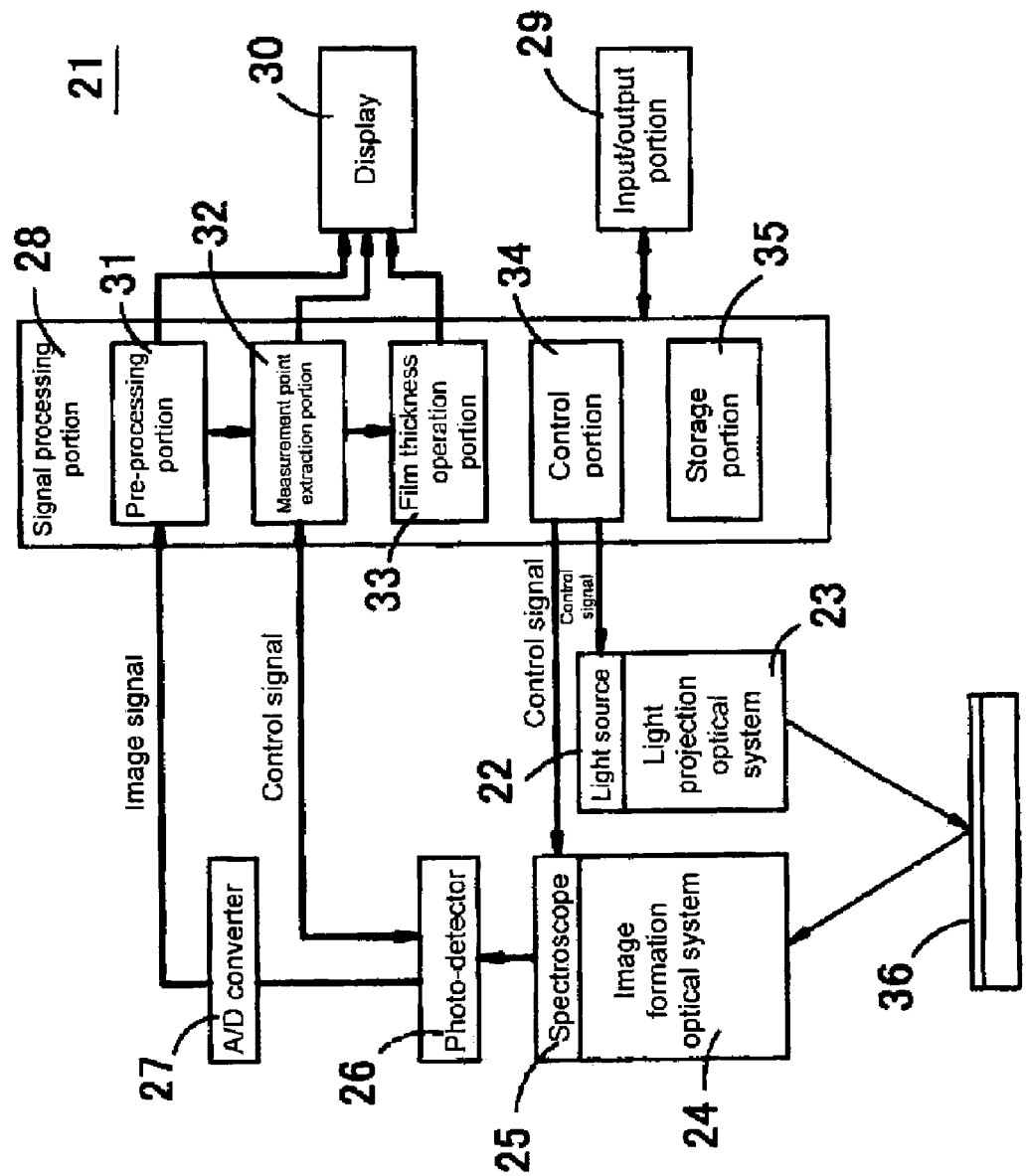
FIG. 3 shows an outlined configuration of a film thickness measuring device according to a first embodiment of the present invention.

FIG. 3 shows an outlined configuration of a film thickness measuring device 21 according to a first embodiment of the present invention. This film thickness measuring device 21 comprises a light source 22, a light-projection optical system 23, an image-formation optical system 24, a spectroscope 25, a photo-detector 26, an A/D converter (analog/digital converter) 27, a signal processing portion 28, an input/output portion (which may be divided into an input portion and an output portion) 29, and a display 30. The light source emits 22 white light or multi-color light and is constituted of, for example, a halogen lamp, a white LED, or a plurality of LEDs having emitted-light wavelengths. The light-projection optical system (illumination optical system) 23 is an optical system for irradiating an observation area having a predetermined spread with light emitted from the light source 22 and constituted of a lens etc. The image-formation optical system 24 is an optical system which is lit by the light-projection optical system 23 to form an image of light reflected by a measurement target positioned in an observation area onto the photo-detector 26 and constituted of a microscope optical system. The spectroscope 25 extracts an image having a specific wavelength (hereinafter referred to as spectroscopic image and not limited to an image of visible light) from images in the observation area taken in by the image-formation optical system 24 and is constituted of, for example, a transmission type or a reflection type spectroscopic filter. The spectroscope 25 is capable of switching a selected wavelength, so that spectroscopic images having different colors or wavelength bands can be obtained by switching the spectroscope 25. The photo-detector 26 has a spectroscopic image extracted by the spectroscope 25 formed on it. As the photo-detector 26, a region-divided type light receiving element in which a plurality of a number of detection cells is collected in a two-dimensional space, for example, a two-dimensional CCD, a photodiode array, etc. is used, to enable outputting an intensity signal of a light received at each of the light receiving cells.

Figure 4:
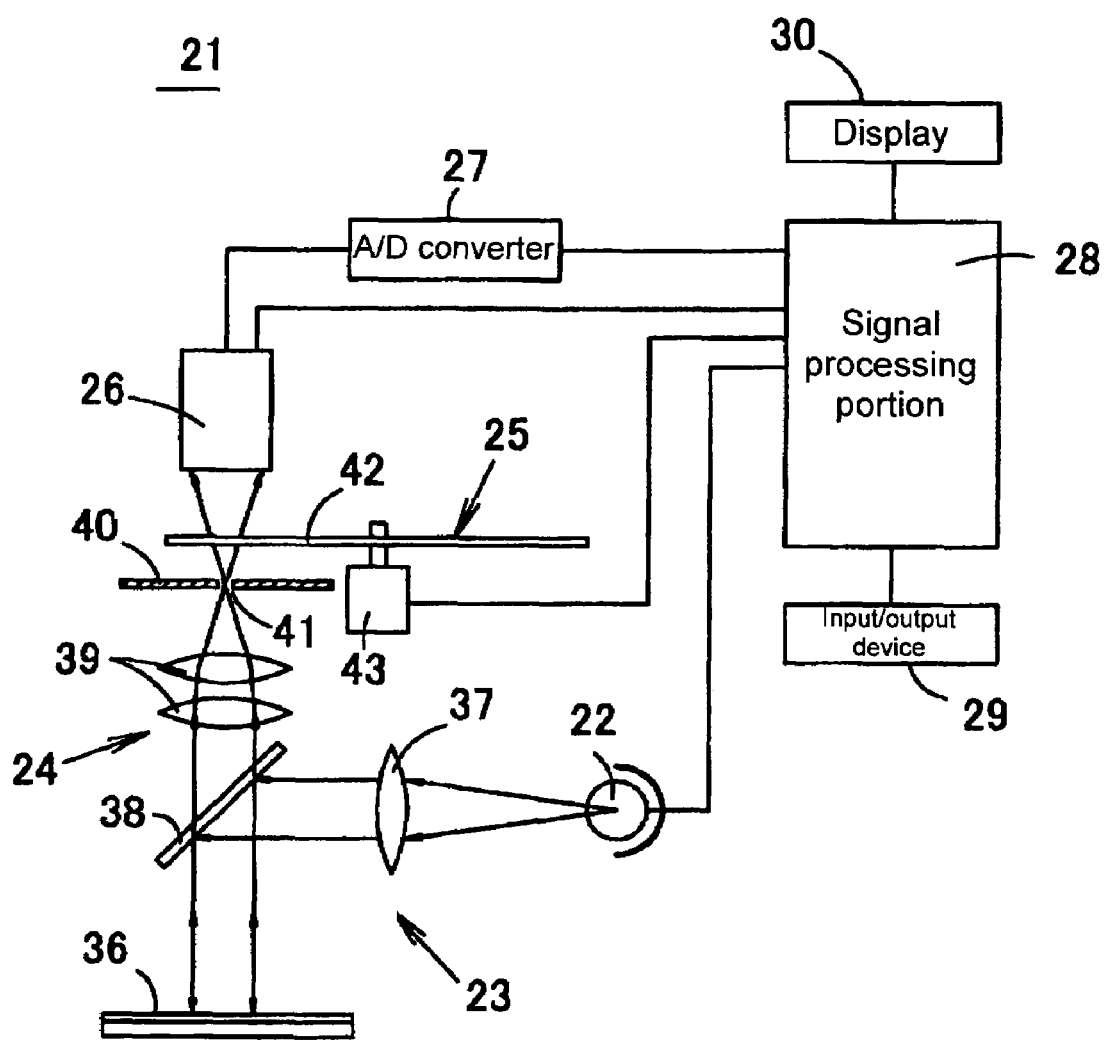
FIG. 4 shows a configuration diagram of a specific example of an optical system of the film thickness measuring device of FIG. 3.

FIG. 4 shows one example of specific configuration of an optical system used in the above-mentioned film thickness measuring device 21. In the specific configuration shown in FIG. 4, the light source 22 is constituted of a white light source such as a halogen lamp and a reflection plate and arranged on side of the horizontally laid image-formation optical system 24. The light-projection optical system 23 is constituted of a collimation lens 37 for converting white light (light having all wavelength bands) emitted from the light source into parallel light and half mirror 38 which is arranged in the image-formation optical system 24. In this configuration, white light emitted from the light source 22 is converted by the collimation lens 37 into parallel light, reflected by the half mirror 38, and projected to the observation area below. Therefore, if the measurement target 36 is positioned in the observation area, the measurement target 36 is subject to coaxial down-emission lighting by use of the white parallel light. The light with which a thin film of the measurement target 36 has been irradiated is reflected by an upper surface and a back surface of the thin film, so that the light reflected by the upper surface and the light reflected by the back surface of the thin film interfere with each other for each of wavelengths in accordance with a film thickness of the thin film.

The image-formation optical system 24 is constituted of a microscope optical system 39 comprised of a plurality of lenses arranged above the half mirror 38 and a light blocking plate 40. At a midpoint of the light blocking plate 40, a pinhole is formed. The white light regularly reflected by the measurement target 36 and returned is collected by the microscope optical system 39 to one point at the pinhole 41, so that light which has passed through the pinhole 41 passes through the spectroscope 25.

Figure 5:
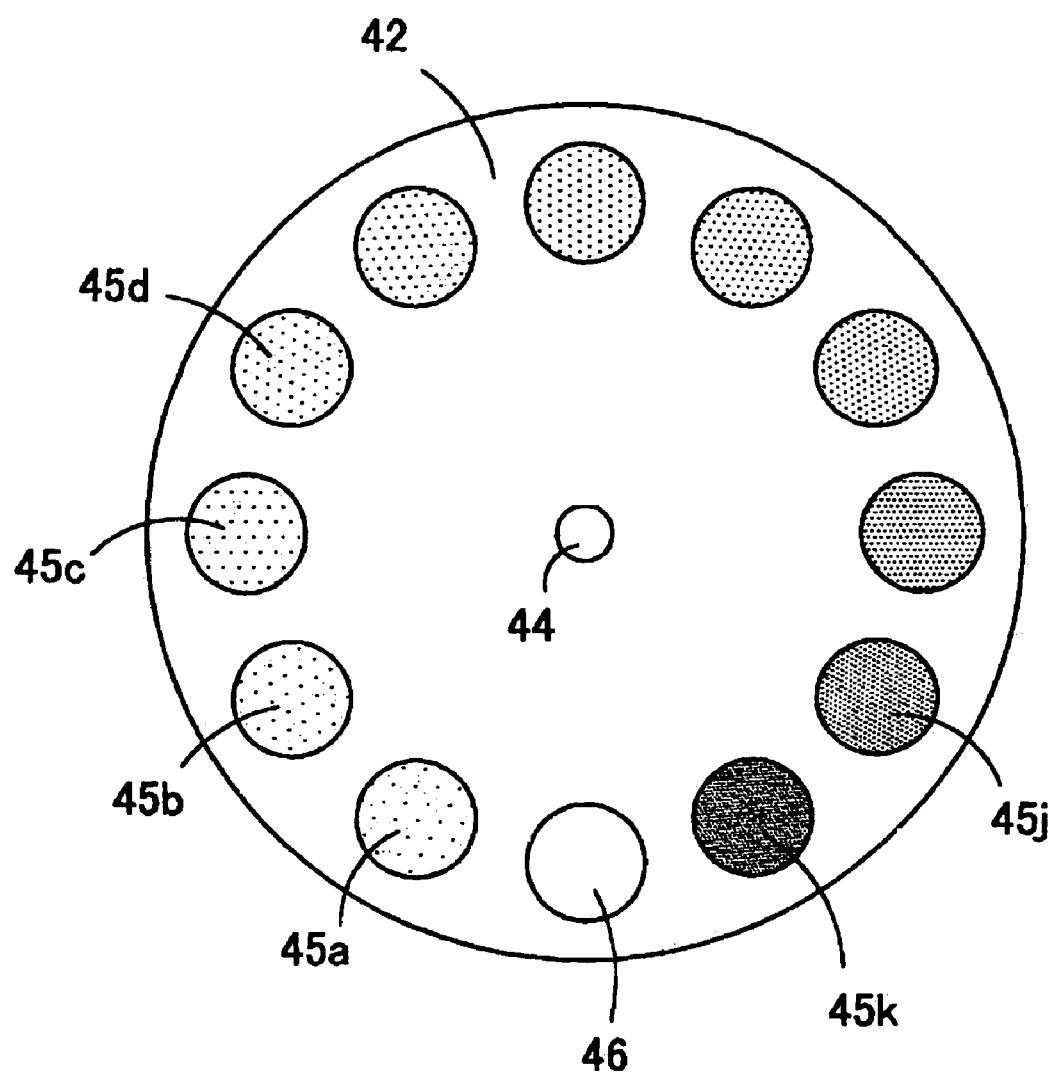
FIG. 5 shows a plan view of a spectroscope used in the film thickness measuring device of FIG. 4.

The spectroscope 25 is constituted of a filter plate 42 which is rotated by a control motor 43 such as a pulse step motor. FIG. 5 is a plan view of the spectroscope 25. A center of the disk-shaped filter plate 42 is supported by a rotary shaft 44 of the control motor 43 and, in an outer periphery of the filter plate 42 a plurality of opening is formed so that they may be distant equally from the rotary shaft 44 and these opening except one have, embedded therein, transmission type spectroscopic filters (band-pass filters) 45a, 45b, 45c, . . . which have different selected wavelengths, with the exceptional one opening having no spectroscopic filter embedded therein to serve as a transparent pore 46. As these transmission type spectroscopic filters 45a, 45b, 45c, . . . , a dielectric multi-layer film etc. can be used. The filter plate 42 of the spectroscope 25 is arranged above and near the light-blocking plate 40 and, by rotating the filter plate 42 by the control motor 43, the transparent pore 46 or an arbitrary one of the spectroscopic filters 45a, 45b, 45c, . . . can be moved to a position that faces the pinhole in the light-blocking plate 40. Therefore, in a case where any one of the spectroscopic filters 45a, 45b, 45c, . . . is positioned over the pinhole 41, white light which has passed through the pinhole impinges on the spectroscopic filter over it, for example, 45a, so that only light in a specific wavelength band determined by that spectroscopic filter impinges on the photo-detector 26. It is to be noted that the pinhole 41 permits only parallel light of the light reflected by the measurement target 36 to pass through itself, thereby reducing effects due to fluctuations in distance between the image-formation optical system 24 and the measurement target 36 and also that one of the spectroscopic filters is reduced in size to thereby enable providing the many kinds of spectroscopic filters 45a, 45b, 45c, . . . in the filter plate 42.

The photo-detector 26 is constituted of a region-divided type light receiving element such as a CCD or a photo-diode array. By adjusting a focal distance of the microscope optical system 39, the measurement target 36 and a light receiving surface of the photo-detector 26 are adjusted so as to be placed at mutually conjugate positions, so that an image of the measurement target 36 in the observation area (light receiving viewing field) is formed on the light receiving surface of the photo-detector 26. However, in a case where any one of the spectroscopic filters 45a, 45b, 45c, . . . is set over the pinhole 41, an image of the measurement target 36 is not formed as it is but such a spectroscopic image of images of the measurement target 36 as to be in a specific wavelength band determined by a type of the relevant spectroscopic filter is formed on the photo-detector 26.

An image formed on the photo-detector 26 is photo-electrically transferred by the photo-detector 26 and sent to the A/D converter 27. The A/D converter 27 converts an analog image signal output from the photo-detector 26 shown in FIG. 3 or 4 into a digital signal and inputs it into the signal processing portion 28. It is to be noted that a variety of control signals and a timing signal are also transmitted and received between the photo-detector 26 and the signal processing portion 28.

As shown in FIG. 3, the signal processing portion 28 is constituted of a pre-processing portion 31, a measurement point extraction portion 32, a film thickness operation portion 33, a control portion 34, and a storage portion 35 and realized by a CPU, an electronic circuit, a personal computer, software, etc. The control portion 34 causes the signal processing portion 28 to measure a film thickness by controlling overall operations of the pre-processing portion, the measurement point extraction portion 32, the film thickness operation portion 33, etc. Further, the control portion 34 outputs a control signal to the light source 22 or the spectroscope 25 to turn the light source 22 on and off or rotate the filter plate 42 of the spectroscope 25, thereby switching a selected wavelength. The storage portion 35 is constituted of a hard disk or a memory or such a medium as a CD or DVD, to store data or programs required to extract a film thickness measurement point at the measurement point extraction portion 32 and data and programs required to calculate by operations a film thickness at the film thickness operation portion 33.

The pre-processing portion 31 receives a digital signal (image signal from the photo-detector 26) input through the A/D converter 27 and performs noise reduction processing on the received digital signal. As the noise reduction processing, for example, signal averaging processing may be used. The averaging processing may be averaging performed as related to a time axis, spatial averaging by which an average value is obtained between each light receiving cell and the surrounding light receiving cells, or both of these. A digital signal processed at the pre-processing portion 31 is output to the measurement point extraction portion 32. Further, the digital signal processed by pre-processing portion 31 is output to the display 30, so that a measured image of the measurement target 36 picked up by the photo-detector 26 is displayed on the display 30.

The measurement point extraction portion 32 uses an image recognition technology to extract, for example, a predetermined pattern from a measured image in the observation area based on a digital signal received from the pre-processing portion 31 and determines a predetermined film thickness measurement point in this extracted pattern. The measurement point extraction portion 32, when having determined a film thickness measurement point, transmits only a signal positioned at the film thickness measurement point of image signals (i.e., a signal of a light receiving cell at the film thickness measurement point or a signal of the film thickness measurement point and the surrounding light receiving cells) to the film thickness operation portion 33. Further, a pattern extracted by the measurement point extraction portion 32 and film thickness measurement point data may be output to the display 30 so that the extracted pattern and the film thickness measurement point can be displayed on the display 30. It is to be noted that a method and an algorithm for extracting a measurement point at the measurement point extraction portion 32 are described later specifically.

The film thickness operation portion 33 stores in the storage portion 35 signals of film thickness measurement points extracted from a plurality of spectroscopic images having different wavelengths obtained by switching the spectroscopic filters 45a, 45b, 45c, . . . of the spectroscope 25 and compares data at these film thickness measurement points (data of reflection coefficient of interference light) to a logical model, thereby calculating a film thickness of the measurement target at the film thickness measurement point. For example, by comparing a set of measurement values of the reflection coefficient for each selected wavelength to a set of the reflection coefficient values at the respective selected wavelengths, a film thickness is calculated. The calculated film thickness value is output to the display 30 or the input/output portion 29 to be displayed.

Figure 6:
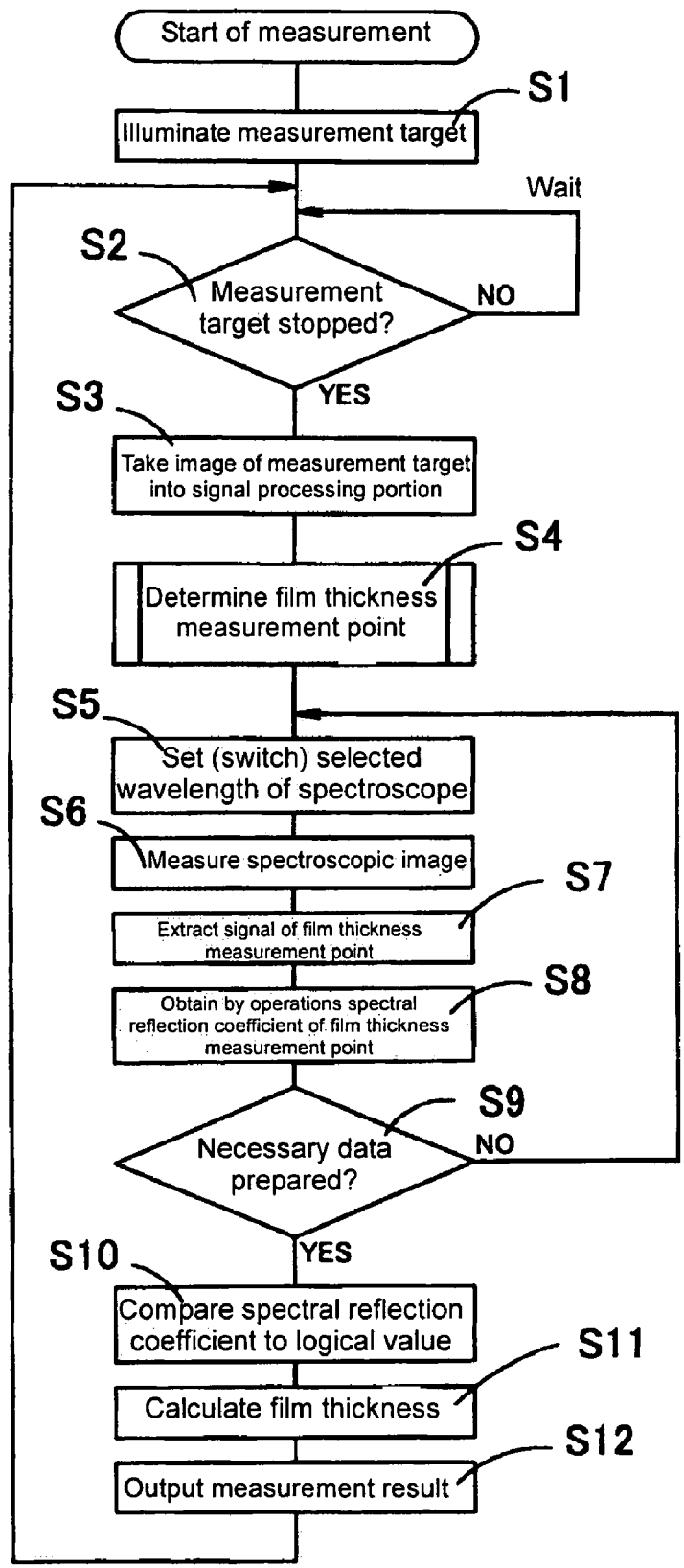
FIG. 6 shows an explanatory flowchart of steps for measuring a film thickness of a target by using the film thickness measuring device.

FIG. 6 is an explanatory flowchart of steps for measuring a film thickness of the measurement target 36 carried intermittently by a conveyor, by using the film thickness measuring device 21. The following will describe operations of the steps for measuring a film thickness of each of the measurement targets 36 by the film thickness measuring device 21 such as shown in FIG. 3 or 4, along FIG. 6. When film thickness measurement starts, the control portion 34 turns the light source 22 on to illuminate a measurement target in the observation area (step S1) and the film thickness measuring device 21 waits until the measurement target 36 carried by the conveyor stops just below it (step S2). When the measurement target 36 has stopped directly below the film thickness measuring device 21, the photo-detector 26 picks up a while color image or a spectroscopic image having any selected wavelength through the image formation optical system 24 and the spectroscope 25. Data of the measured image picked up by the photo-detector 26 is taken into the measurement point extraction portion 32 via the A/D converter 27 and the pre-processing portion 31 (step S3). The measurement point extraction portion 32 extracts, for example, a predetermined pattern from the measured image by using the image recognition technology and determines a predetermined film thickness measurement point in this extracted pattern (step S4). The thus extracted predetermined pattern's image or the determined film thickness measurement point may be displayed on the display 30. When the film thickness measurement point has been determined, a position of the film thickness measurement point (position of the light receiving cell) is stored in the storage portion 35.

Next, a control signal is output from the control portion 34 to the spectroscope 25 to set a spectroscopic filter having a predetermined selected wavelength, for example, the filter 45a over the pinhole 41 (step S5), thereby measuring a spectroscopic image in a predetermined wavelength band by the photo-detector 26 (step S6). Data of the spectroscopic image measured by the photo-detector 26 is sent via the A/D converter 27 and the pre-processing portion 31 to the measurement point extraction portion 32. The measurement point extraction portion 32 extracts only a signal positioned at the film thickness measurement point of the data of this spectroscopic image and sends it to the film thickness operation portion 33 (step S7). When having received the signal of the film thickness measurement point, the film thickness operation portion 33 calculates by operations a spectral reflection coefficient of the film thickness measurement point from that signal and saves an operation result in the storage portion 35 temporarily (step S8).

When the spectral reflection coefficient of the predetermined wavelength at the film thickness measurement point is thus obtained, the film thickness operation portion 33 decides whether data of the spectral reflection coefficient for a necessary number of wavelengths is available (step S9). If the data pieces of the spectral reflection coefficient are not available as many as required in film thickness measurement, it returns to step S5 again to switch the spectroscope 35 to a different spectroscopic filter, for example, 45b and measure a spectroscopic image having a different wavelength by the photo-detector 26, extracts a signal at the film thickness measurement point by the measurement point extraction portion 32, saves in the storage portion 35 a spectral reflection coefficient of the film thickness measurement point calculated by operations by the film thickness operation portion 33, and decides whether data of the spectral reflection coefficient for the necessary number of wavelengths is available (steps S5-S9).

It repeats steps S5-S9 in such a manner and, if it decides that the necessary data is available at step S8, compares the plurality of data pieces of the spectral reflection coefficient temporarily stored in the storage portion 35 and logical values of the spectral reflection coefficient which have been stored beforehand to each other (step S10), thereby calculating a film thickness of the measurement target 36 (step S11). When a film thickness of the measurement target 36 has been calculated, the film measurement result is output to the display 30 or the input/output portion 29 (step S12).

When film thickness measurement of the measurement target 36 stopped below the film thickness measuring device 21 is completed, this measurement target 36 is carried out from the position below the film thickness measuring device 21 by the conveyor. When the measurement target 36 whose measurement is completed is carried out, the film thickness measuring device 21 waits until a next measurement target 36 is carried in and, when the next measurement target 36 is set below the film thickness measuring device 21, performs steps S2-S13 to measure its film thickness.

By such a film thickness measuring device 21, it is possible to measure data of a spectroscopic image in an observation area which is sufficiently larger than a film thickness measurement point and automatically extract data of a predetermined position (film thickness measurement point) based on this spectroscopic image data by the measurement point extraction portion 32 and then measure a thickness of a certain thin film, which is the measurement target 36, at the film thickness measurement point, thereby eliminating a necessity of an operation of setting the film thickness measurement point to predetermined positions of the respective measurement targets 36 before measurement. Therefore, it is possible to measure a film thickness at a predetermined film thickness measurement point irrespective of the position of the measurement target 36, thereby resulting in a reduction in time required for film thickness measurement to perform film thickness measurement efficiently. Further, it is possible to measure a film thickness in short time, thereby performing in-line measurement in a condition where this film thickness measuring device 21 is mounted to a production line.

Furthermore, the measurement target 36 need not be aligned, so that an aligning stage is unnecessary, thereby reducing costs of the film thickness measuring device 21 and simplifying film thickness measurement operations. Further, a film thickness can be measured in an observation area which is sufficiently larger than a film thickness measurement point, so that it is unnecessary to change a mounting position of the film thickness measuring device 21 for each measurement target even if these measurement targets 36 have different measurement positions.

Second Embodiment

Figure 7:
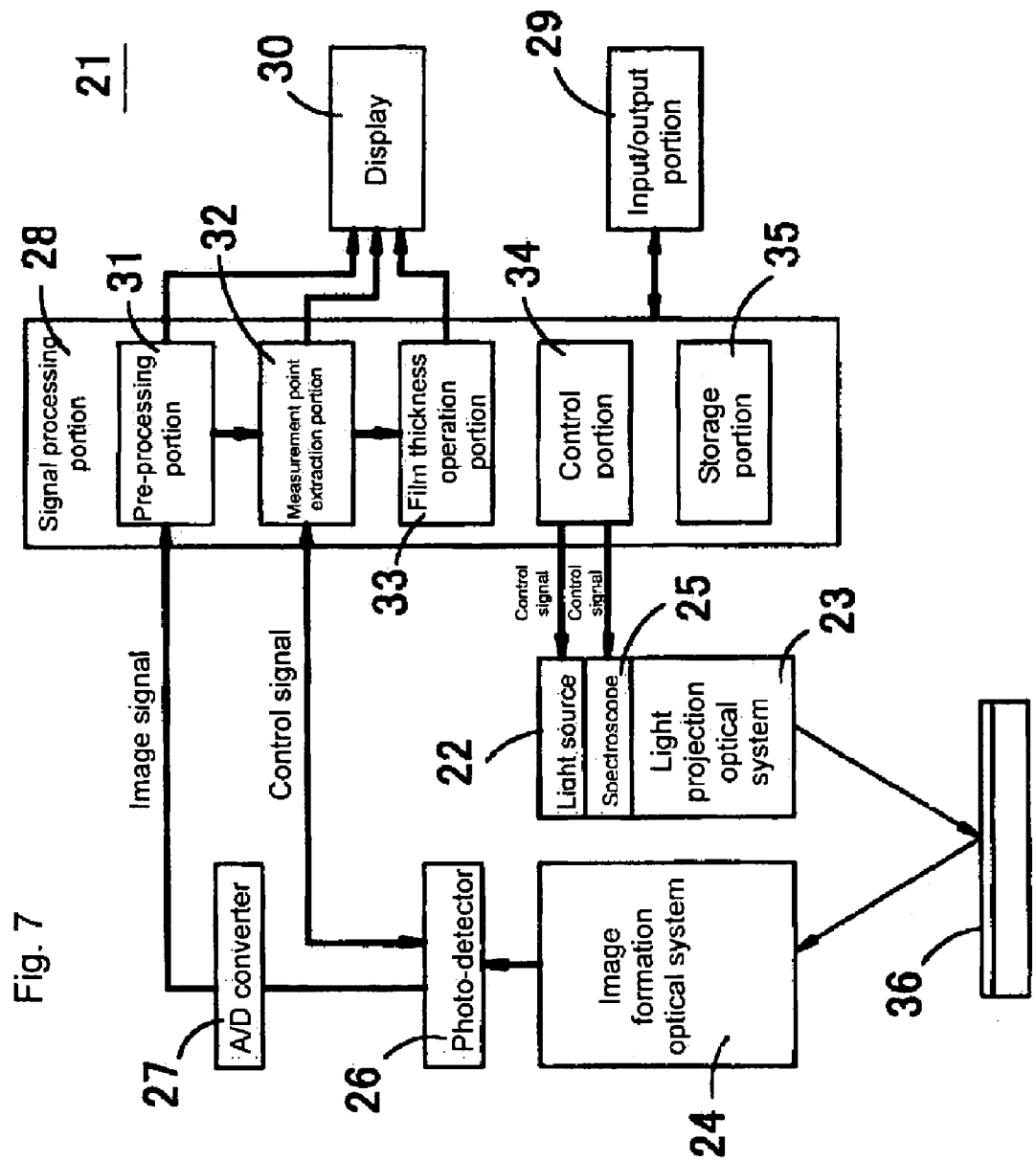
FIG. 7 shows an outlined configuration of a film thickness measuring device according to a second embodiment of the present invention.

FIG. 7 shows an outlined configuration of a film thickness measuring device 21 according to a second embodiment of the present invention. In contrast to the film thickness measuring device 21 according to the first embodiment in which the measurement target 36 has been irradiated with white light to send resultant reflected light through the spectroscopic filters 45*a*, 45*b*, 45*c*, . . . of the spectroscope 25 and measure an obtained spectroscopic image by the photo-detector 26, in the film thickness measuring device according to the second embodiment, white light emitted from a light source 22 is sent through the spectroscopic filters 45*a*, 45*b*, 45*c*, . . . of the spectroscope 25 and then the measurement target 36 is irradiated with this split light, so that light reflected by the measurement target 36 is made incident upon the photo-detector 26 to measure a spectroscopic image by the photo-detector 26.

Figure 8:
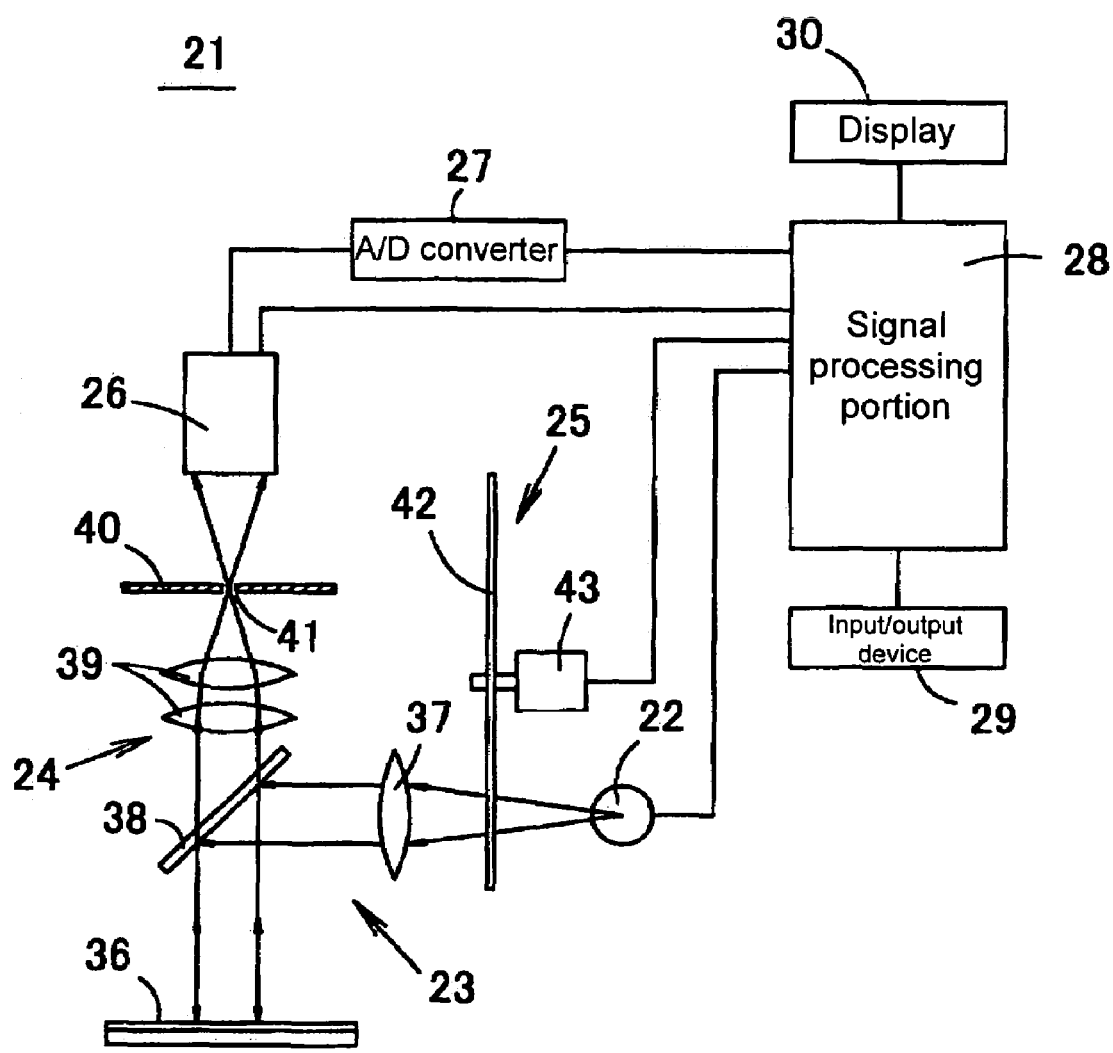
FIG. 8 shows a configuration diagram of a specific example of an optical system of the film thickness measuring device according to the second embodiment of the present invention.

FIG. 8 shows one example of a specific configuration of an optical system used in the film thickness measuring device 21 of the second embodiment. According to the second embodiment, a filter plate 42 of a spectroscope, which has been arranged between the light-blocking plate 40 and the photo-detector 26, is arranged between a light source 22 and a collimation lens 37.

Also by the film thickness measuring device 21 according to the second embodiment, as by the film thickness measuring device 21 according to the first embodiment, by setting a film thickness measurement point to a spectroscopic image obtained by the photo-detector 26, data of the spectroscopic image at the film thickness measurement point can be taken out from the spectroscopic image having each of the wavelength to obtain a spectral reflection coefficient for different wavelength from the thus obtained data of the spectroscopic image and measure a film thickness at the film thickness measurement point, thereby obtaining the same effects as those by the film thickness measuring device 21 according to the first embodiment.

(First Method for Extracting Film Thickness Measurement Point)

The following will describe a variety of methods for extracting a film thickness measurement point at a measurement point extraction portion 32 which are used by a film thickness measuring device, especially the film thickness measuring devices 21 according to the first and second embodiments. First, as the first film thickness extraction method, a method of extracting a repetition unit pattern from a target image.

Figure 1:
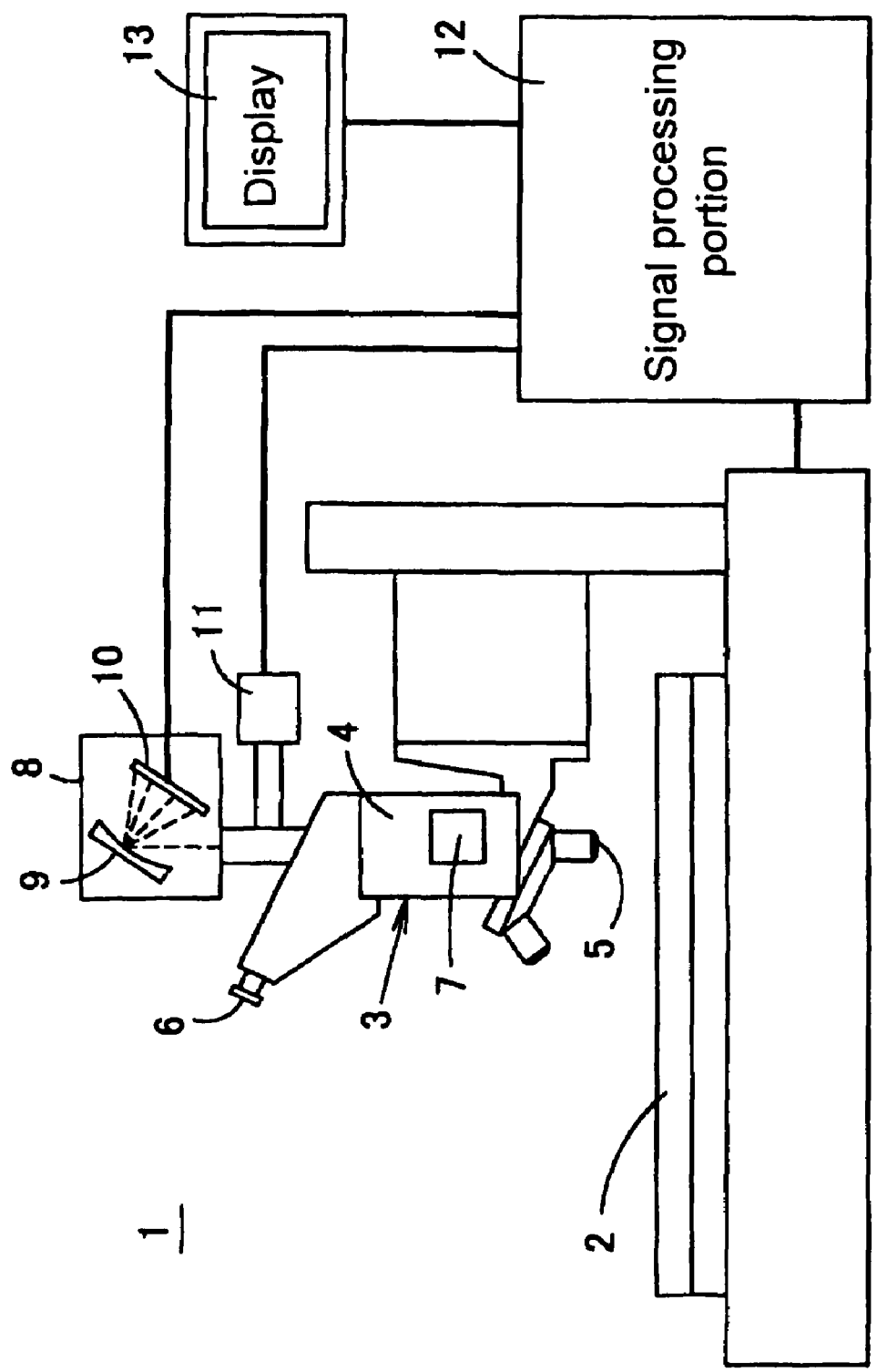
FIG. 1 shows a side view for showing a configuration of a conventional film thickness inspecting device.
Figure 2:
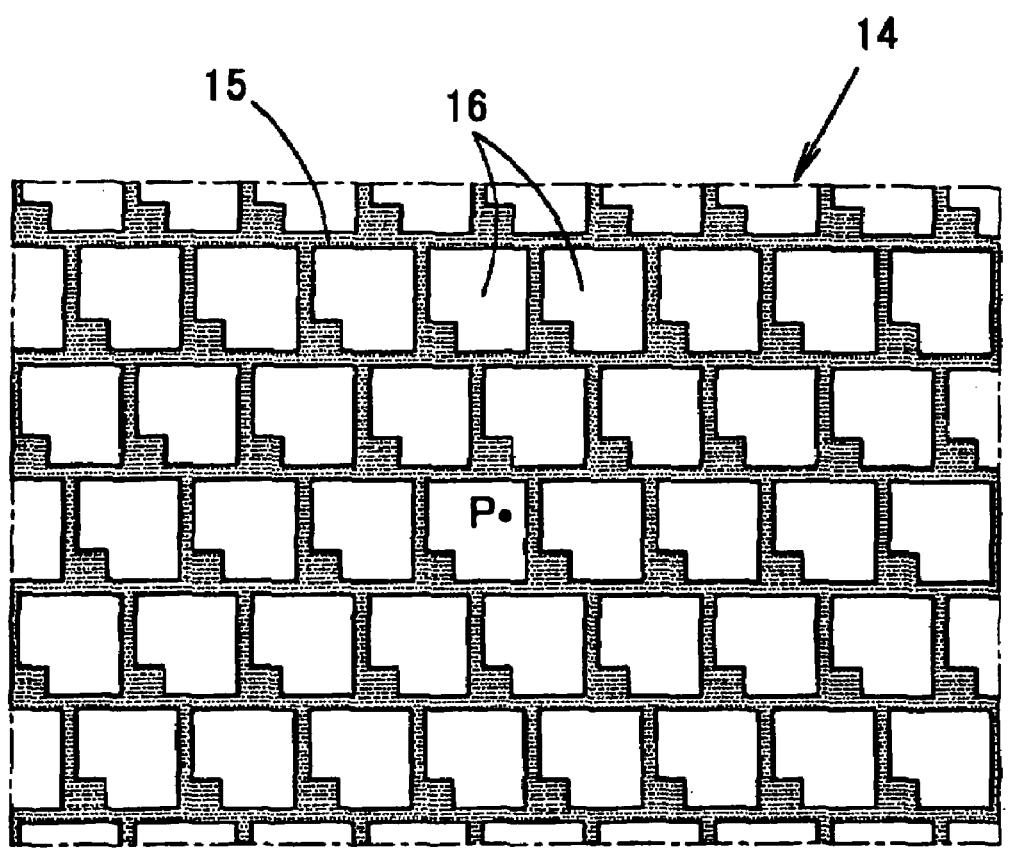
FIG. 2 shows one example (TFT substrate) of a measurement target observed by the film thickness inspecting device of FIG. 1.
Figure 9:
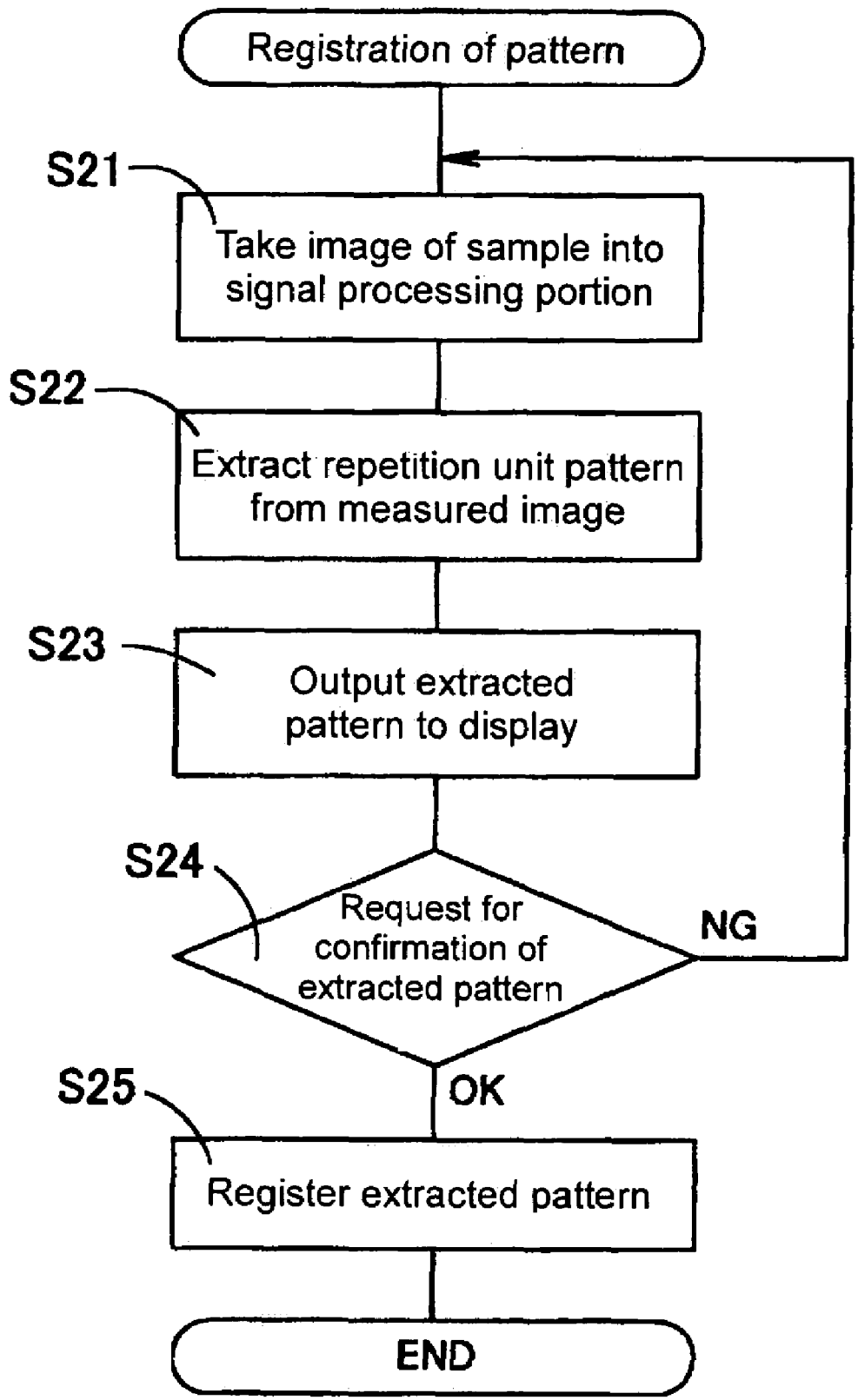
FIG. 9 shows an explanatory flowchart of a pattern registration process of a first measurement point extraction method.
Figure 10A:
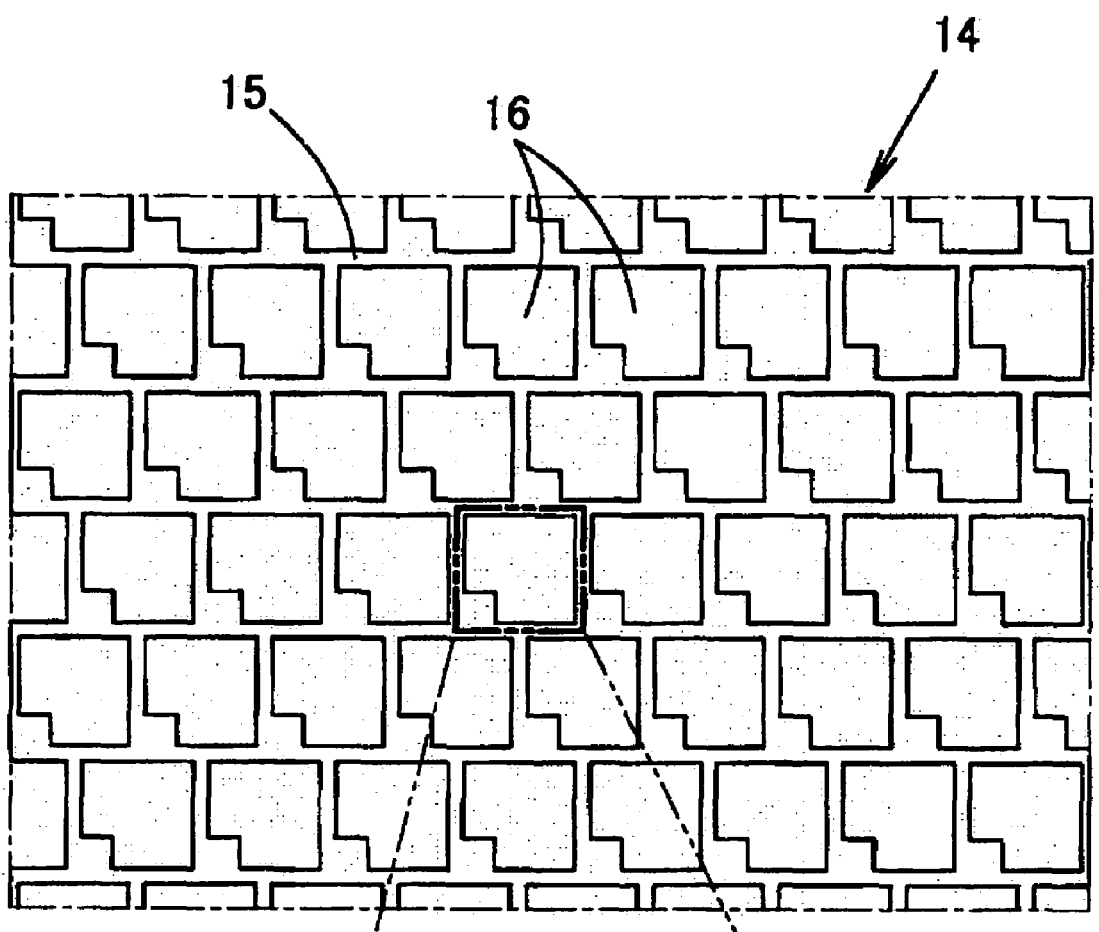
FIG. 10A shows an image of a sample of a measurement target for registering a pattern and FIG. 10B shows an expanded view of a pattern extracted from it.

FIG. 9 is an explanatory flowchart of a pattern registration process of the first film thickness measurement point extraction method. FIGS. 10 explains the pattern registration method. FIG. 10A shows an image of the measurement target 36 in an observation area picked up by the photo-detector 26. This image represents a TFT substrate 14 such as described with reference to FIG. 2, in which a light blocking region 15 and a pixel opening 16 are arrayed as repeated. An object of the present embodiment is to measure a film thickness of a poly-imide film on a surface of the pixel opening 16. What are shown in FIGS. 9 and 10 are divided processes of extracting and registering a repetition unit pattern from a measurement target and of determining a film thickness measurement point.

Figure 10B:
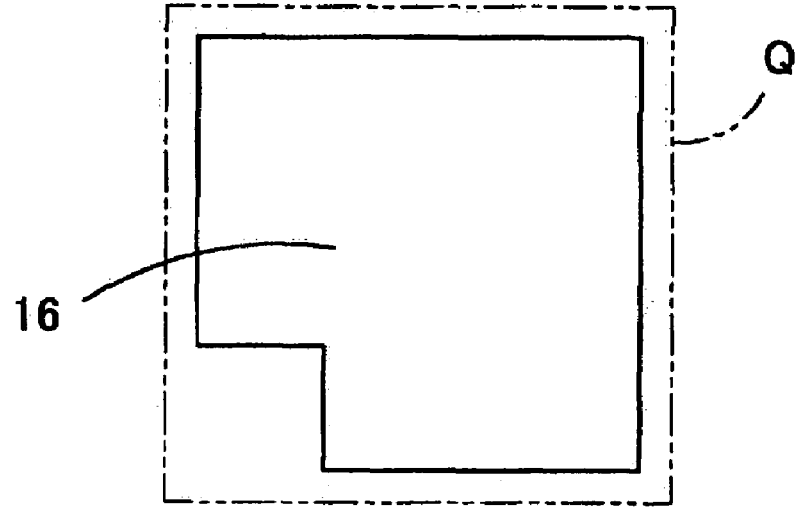

The following will describe a procedure for registering a pattern, along the flowchart of FIG. 9. To register an extracted pattern, first a sample of the measurement target 36 is placed in the observation area directly below the film thickness measuring device 21. When the sample is placed and a registration start command is input, the light source 22 is lit and the photo-detector 26 picks up an image of the sample such as shown in FIG. 10A in the observation area and image data is converted at the A/D converter 27 into a digital signal and taken in by a signal processing portion 28 (step S21). Next, the measurement point extraction portion 32 uses an image recognition technology to extract a pattern of a region surrounded by a two-dots-and-dash line in FIG. 10A, that is, a pattern Q which provides a repetition unit from a measured image thus taken in (step S22), outputs the extracted pattern Q such as shown in FIG. 10B to a display 30, and displays the extracted pattern Q on the display 30 in a condition where it is superimposed on the image in the observation area (step S23). Next, the signal processing portion 28 requests for confirmation of the extracted pattern Q displayed on the display 30 (step S24). An operator confirms the extracted pattern Q displayed on the display 30 and, if the extracted pattern Q is properly recognized, presses, for example, an "OK" button and, otherwise, presses an "NG" button.

When the NG button is pressed at step S24, the film thickness measuring device 21 re-reads the sample image again, extracts a unit pattern from the re-read sample image to display it on the display 30, and requests for confirmation by the operator again (steps S21-S24).

If the OK button is pressed at step S24, on the other hand, the film thickness measuring device 21 stores the extracted pattern Q in a storage portion 35 and completes pattern registration.

Figure 11:
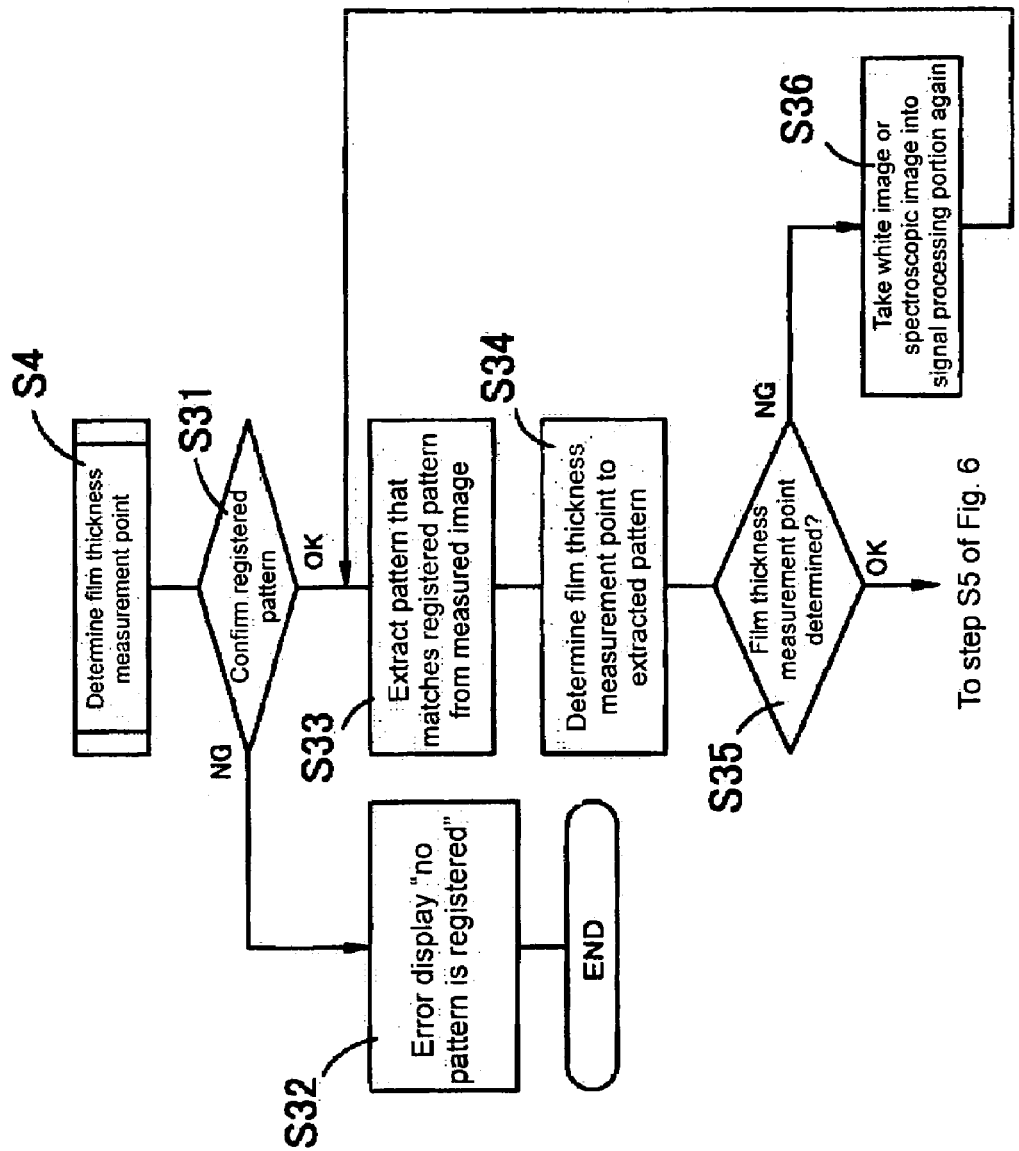
FIG. 11 shows an explanatory flowchart of how to determine a film thickness measurement point according to the first measurement point extraction method.

When the extracted pattern Q is registered as described above, in a film thickness measurement step for the measurement target 36, a film thickness of the measurement target 36 is measured according to the procedure described with reference to FIG. 6. FIG. 11 is a flowchart of step S4, that is, a process for determining a film thickness measurement point P. Further, FIG. 12A explains how to determine the film thickness measurement point in accordance with the flowchart of FIG. 11.

The following will describe a procedure for determining the film thickness measurement point P, along the flowchart of FIG. 11. In film thickness measurement, as described above, the measurement target 36 is carried in directly below the film thickness measuring device 21 and an image of the measurement target 36 is taken in by the photo-detector 26 (steps S1-S3), to determine a film thickness measurement point P (step S4 of FIG. 6). In a process of the measurement point extraction portion 32 determining the film thickness measurement point P at step S4, as shown in FIG. 11, first it is confirmed that no pattern is registered in the storage portion 35 (step S31). If no pattern is registered in the storage portion 35 (NG at step S31), the process outputs an error message "no pattern is registered" to the display 30 or an input/output portion 29 (step S32) and stops the processing.

Figure 12A:
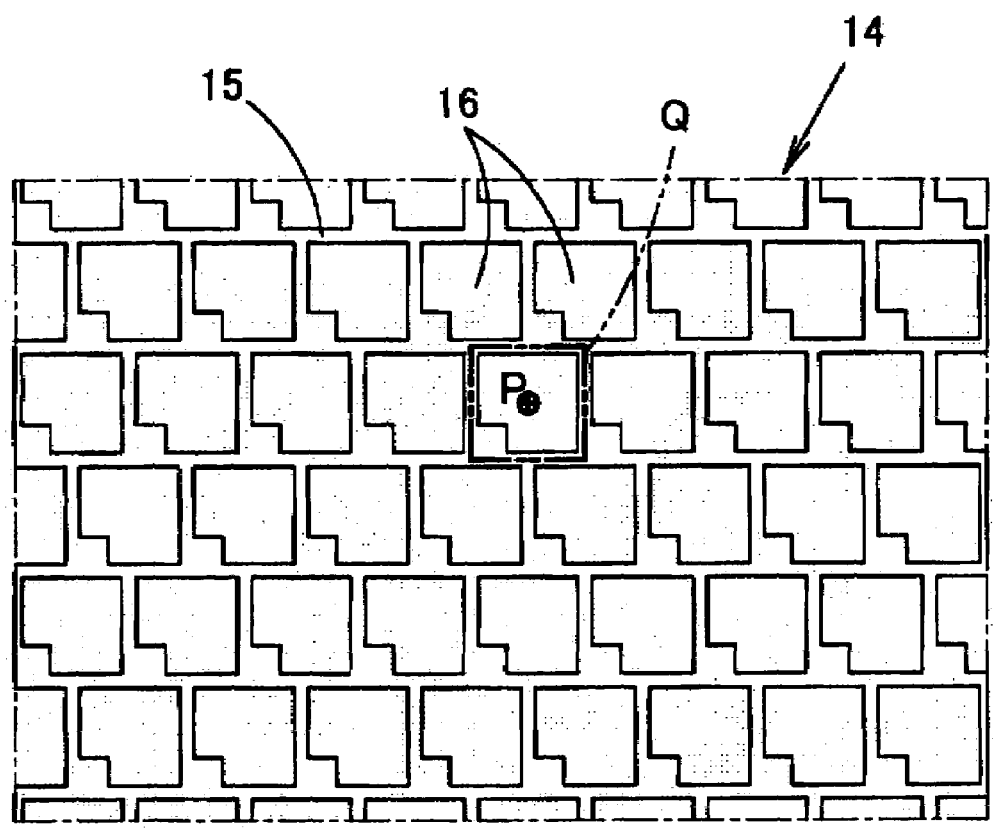
FIG. 12A explains how to determine a film thickness measurement point in accordance with a procedure shown in the flowchart of FIG. 11

If it is confirmed that a pattern is registered (OK at step S31), on the other hand, the measurement point extraction portion 32 reads the registered pattern from the storage portion 35 and compares a measured image such as shown in FIG. 12A and the registered pattern thus read to each other to extract a pattern Q that matches the measured image from the measured image (step S33). The extracted pattern Q is indicated as surrounded by a two-dots-and-dash in FIG. 12A (which is described using the same figure as that in the case of pattern registration). When the pattern Q that matches the registered pattern is extracted from the measured image, as shown in FIG. 12A, the measurement point extraction portion 32 obtains by operations a midpoint or a geometrical gravity center position of the extracted pattern Q and decides it as the film thickness measurement point P (step S34).

When the film thickness measurement point P is thus determined, the measurement point extraction portion 32 decides whether the film thickness measurement point P has been determined properly (step S35). If it decides that the film thickness measurement point P has not been determined properly (NG at step S35), it takes in the image of the measurement target 36 again and extracts the pattern Q and determines the film thickness measurement point P again (steps S36, S33-S34).

If it is decided that the film thickness measurement point has been determined properly (OK at step S35), steps of step S5 and the subsequent in FIG. 6 are performed to measure a film thickness of the measurement target 36.

It is to be noted that although a registered pattern has been confirmed each time the film thickness measurement point is determined in the step of determining the film thickness measurement point in the flowchart of FIG. 11 (step S31), the registered pattern needs to be confirmed only once when starting such a film thickness measurement step as shown in FIG. 6, so that steps S31 and S32 in FIG. 11 may be omitted to confirm the registered pattern only once when starting film thickness measurement (before step S1 of FIG. 6), which holds true with the following embodiments.

Figure 12B:
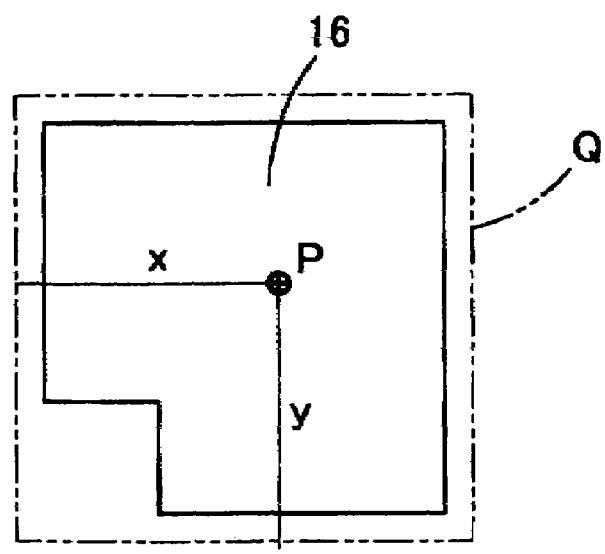
FIG. 12B shows a variant of FIG. 12A, that is, an explanatory expanded view of another method for determining a film thickness measurement point.

Note here that what is shown in FIG. 12B explains a variant of the first film thickness measurement point extraction method. In this variant, after the operator confirms at step S24 of FIG. 9 that the pattern has been registered properly, the process requests the operator to enter a film thickness measurement point. For example, the operator enters the film thickness measurement point P by manipulating a mouse pointer or by touching a touch panel provided on a surface of the display 30 into a unit pattern displayed on the display 30. The film thickness measurement point P thus entered by the operator is converted, as shown in FIG. 12B, into coordinates (x, y) in the extracted pattern Q and stored together with the extracted pattern Q at step S25 of FIG. 9. In a process of determining a film thickness measurement point, on the other hand, without performing step S34 of FIG. 11, the relative coordinates (x, y) are read from the storage portion 35, to determine the film thickness measurement point P to a position (x, y) in the extracted pattern Q as shown in FIG. 12B.

Figure 13:
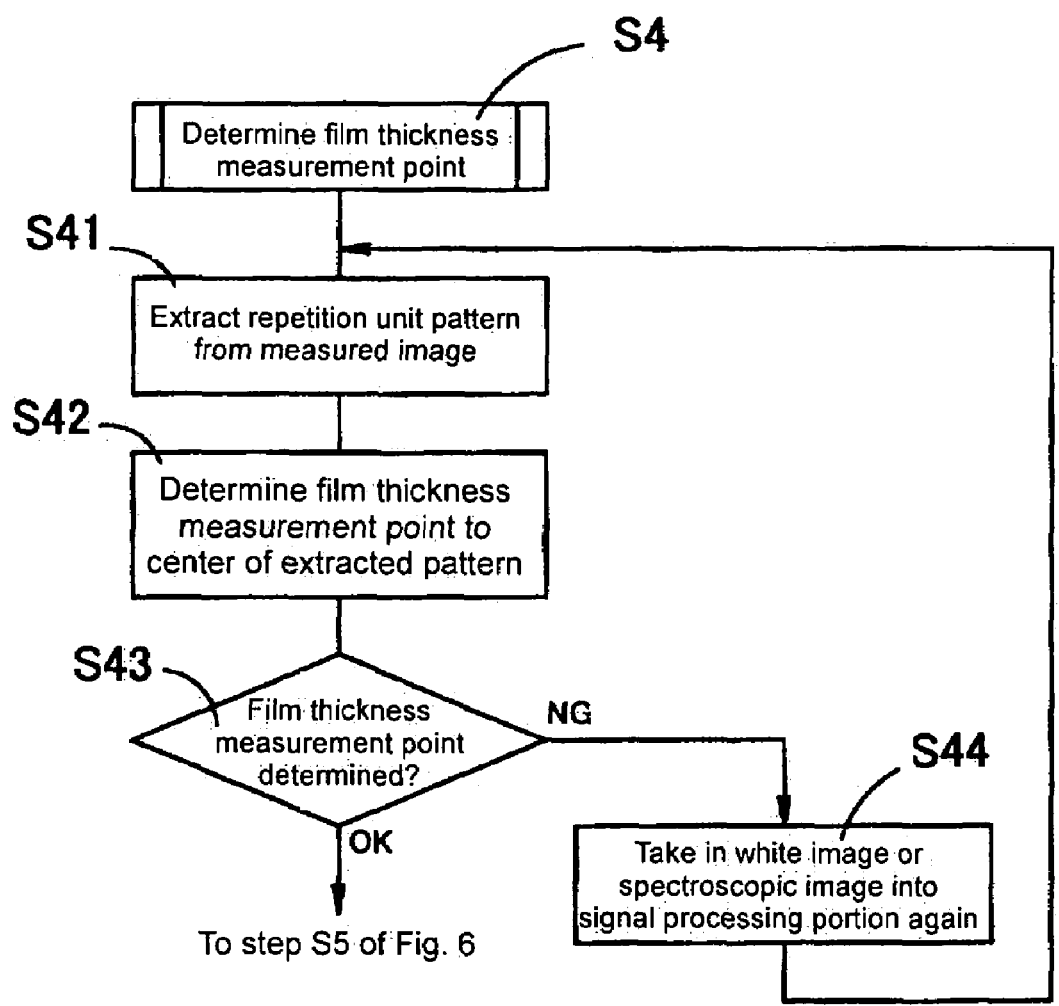
FIG. 13 shows an explanatory flowchart of another variant of the first film thickness measurement point extraction method.

Further, FIG. 13 shows an explanatory flowchart of another variant of the first film thickness measurement point extraction method. This variant enables extracting a film thickness measurement point without registering a pattern beforehand. That is, a film thickness measurement point is determined along FIG. 13. When step S4 of FIG. 6 for determining film thickness measurement points starts, the measurement point extraction portion 32 uses the image recognition technology to extract a pattern Q which provides a repetition unit from a measured image picked up at the photo-detector 26 (step S41), detects a center (or a predetermined position such as a geometrical gravity center position of the unit pattern Q), and sets the film thickness measurement point P to that point (step S42). When the film thickness measurement point P is thus determined, the measurement point extraction portion 32 decides whether the film thickness measurement point P has been determined properly (step S43). If it decides that the film thickness measurement point P has not properly determined (NG at step S43), it takes in an image of the measurement target 36 again (Step S44) and extracts the unit pattern Q and determines the film thickness measurement point P again (steps S33, S41-S42). If it decides that the film thickness measurement point P has been determined properly (OK at step S43), on the other hand, steps of S5 and the subsequent of FIG. 6 are performed, thereby measuring a film thickness of the measurement target.

By a method of extracting a predetermined pattern from a measured image at a film thickness measurement step without registering a pattern beforehand as in the case of the variant of FIG. 13, it is unnecessary to register a pattern beforehand, thereby reducing a labor of preparation. In contrast to this method, by a method of registering a predetermined pattern beforehand and comparing an extracted pattern and the registered pattern to each other at the film thickness measurement step, a certainty of the film thickness measurement point is improved. In particular, even in a case where at least two kinds of patterns are contained in a measurement target, it is possible to extract a predetermined pattern and determine a film thickness measurement point more securely.

(Second Method for Extracting Film Thickness Measurement Point)

Figure 14:
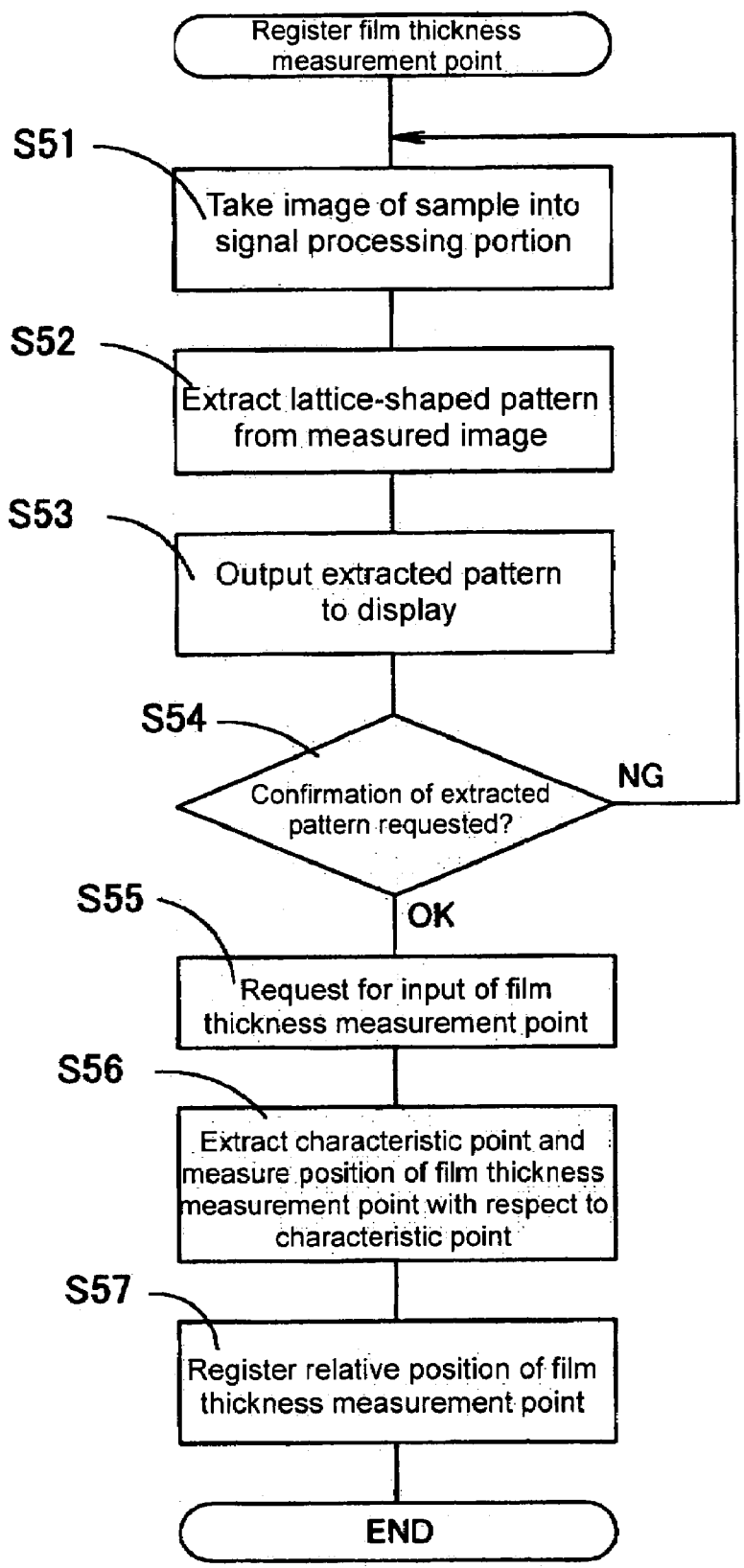
FIG. 14 shows an explanatory flowchart of a procedure for beforehand instructing a film thickness measurement point and registering it in a second measurement point extraction method.
Figure 15A:
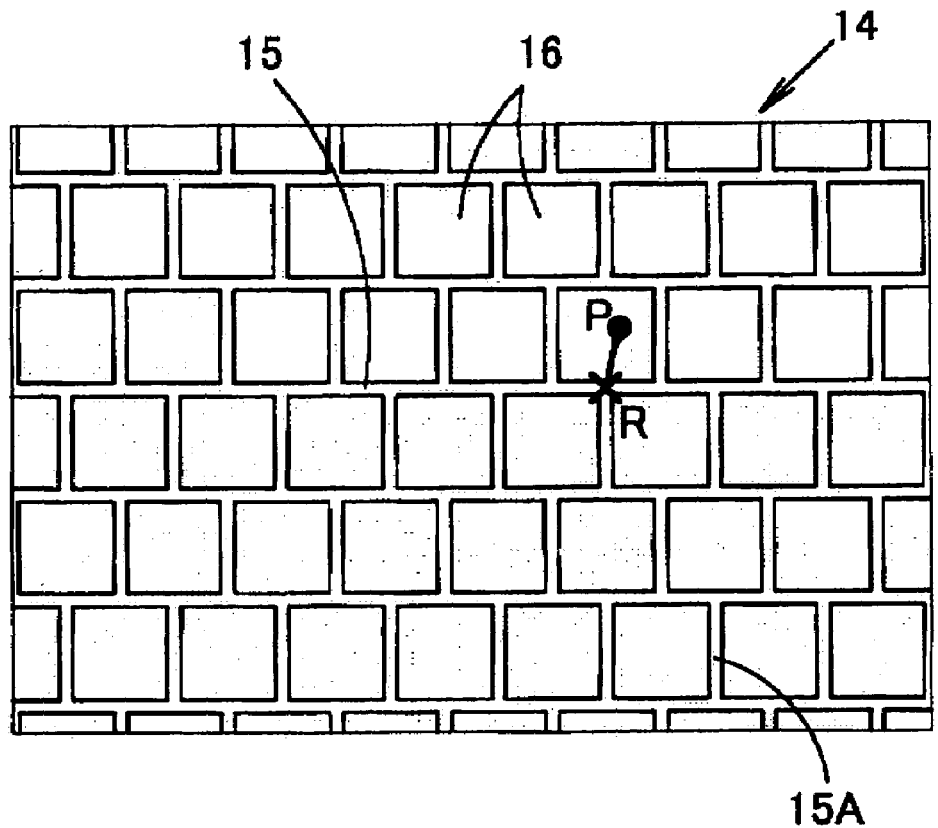
FIG. 15A shows how to instruct a film thickness measurement point for an image to be measured and FIG. 15B is a partial expanded view of FIG. 15A.
Figure 15B:
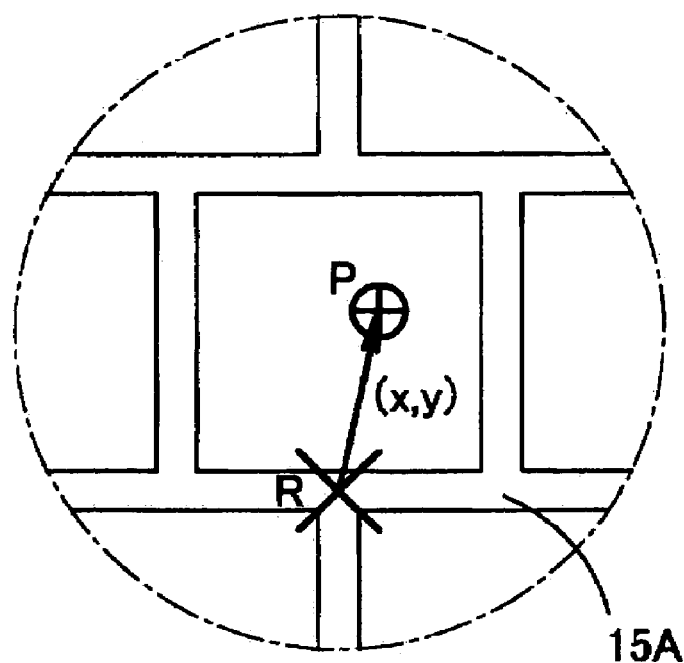
Figure 16:
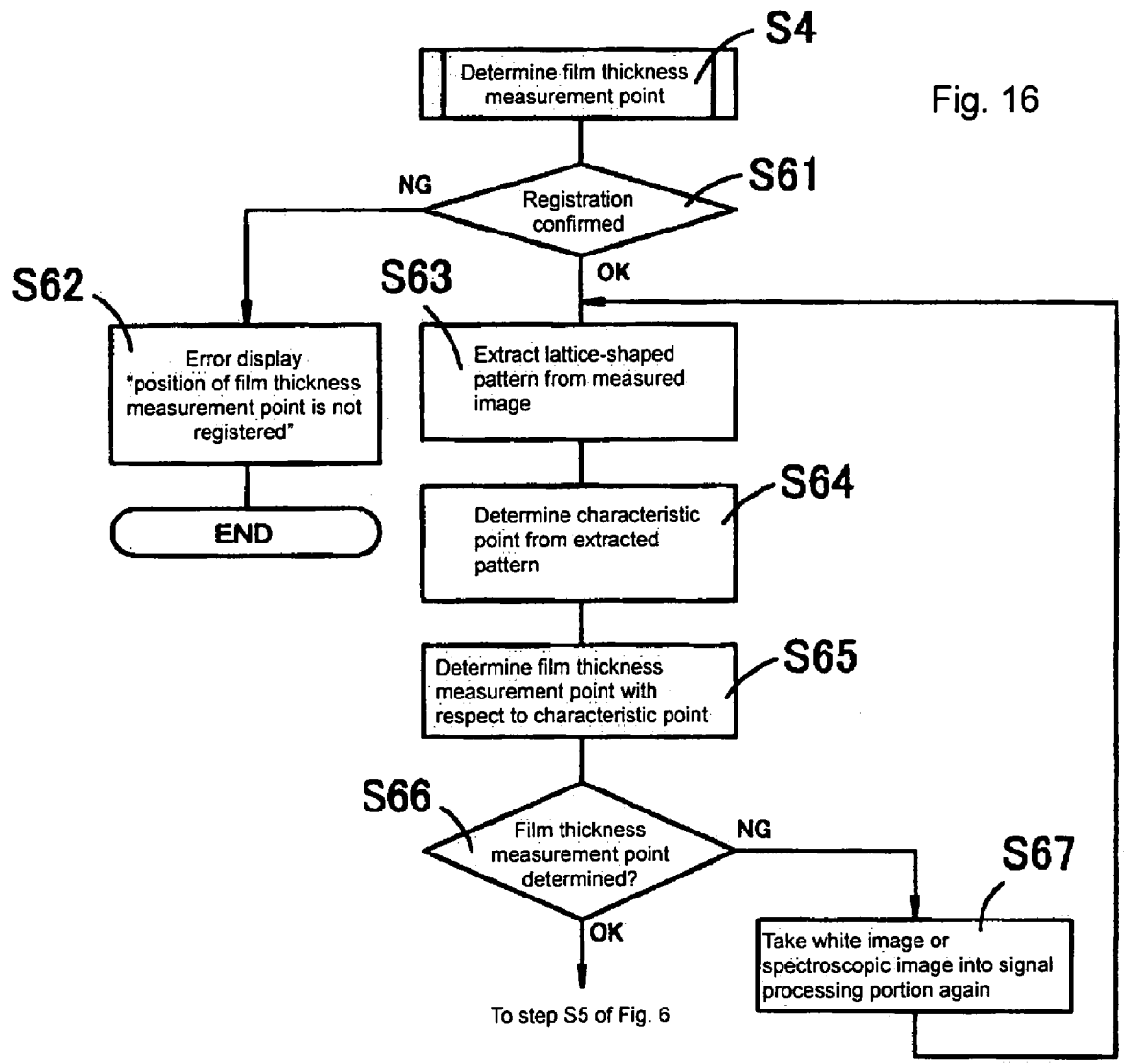
FIG. 16 shows an explanatory flowchart of a procedure for determining a film thickness measurement point in the second film thickness measurement point extraction method.

The second film thickness measurement point extraction method comprises the processes of: permitting an operator to enter a film thickness measurement point and registering a relative position of the film thickness measurement point; and determining a film thickness measurement point by using the registered relative position of the film thickness measurement point. FIG. 14 is an explanatory flowchart of a procedure for registering a relative position of a film thickness measurement point. FIGS. 15A and 15B show how to extract a relative position from an entered film thickness measurement point. FIG. 16 is an explanatory flowchart of a procedure for determining a film thickness measurement point in the second film thickness measurement point extraction method.

By the film thickness measurement point extraction method, in place of a unit pattern, a pattern of the light-blocking region (black matrix) 15 from the TFT substrate 14 is extracted and a film thickness measurement point is determined with respect to this roughly lattice-or frame-shaped pattern (hereinafter refereed to as lattice-shaped pattern also). First, the following will describe a procedure for causing a film thickness measurement position for the extracted lattice-shaped pattern to be entered and extracting and registering its relative position, along the flowchart of FIG. 14. In the process of registering a relative position of a film thickness measurement point, an image of a sample in the observation area is picked up by the photo-detector 26 and a measured image converted into a digital signal at the A/D converter 27 is taken into the signal processing portion 28 (step S51). Next, the measurement point extraction portion 32 uses the image recognition technology to extract a lattice-shaped pattern 15A which corresponds to the light-blocking region 15 such as shown in FIG. 15A from the taken in measured image (step S52) and this extracted pattern 15A is output to the display 30 in a condition where it is superimposed on an image in an image area (step S53)

When the extracted pattern 15A is displayed on the display 30, the signal processing portion 28 outputs to the operator a message requesting him to confirm the extracted pattern 15A (step S54). The operator confirms the extracted pattern 15A displayed on the display 30 and, if the extracted pattern 15A has been recognized properly, presses the "OK" button and, otherwise, presses the "NG" button.

If the NG button is pressed at step S54, the film thickness measuring device 21 re-reads the sample image, extracts the lattice-shaped pattern 15A from this re-read sample image to display it on the display 30, and requests the operator again for decision (steps S51-S54).

If the OK button is pressed at step S54, on the other hand, the signal processing portion 28 requests the operator to enter a film thickness measurement point P (step S55). When the operator requested to enter the film thickness measurement point P manipulates the mouse or touches a touch panel etc. provided on the surface of the display 30 to enter a film thickness measurement point P into the extracted pattern 15A on the display 30, as shown in FIGS. 15A and 15B, the measurement point extraction portion 32 selects a characteristic point R near the entered film thickness measurement point P (e.g., an intersection of the extracted patterns 15A or an edge of a region surrounded by the extracted patterns 15A) and measures a relative position (x, y) of the film thickness measurement point P with respect to the selected characteristic point R (step S56). The thus obtained relative position (x, y) of the film thickness measurement point P is stored in the storage portion 35, to complete the registration (step S57).

When the relative position of the film thickness of the film thickness measurement point P is thus registered, in a film thickness measurement step for the measurement target 36, a film thickness of the measurement target 36 is measured in accordance with the procedure described with reference to FIG. 6. At step S4 of FIG. 6, that is, in a process of determining the film thickness measurement point P, as shown in FIG. 16, first it is confirmed that the relative position of the film thickness measurement point P has been registered in the storage portion 35 (step S61) If the relative position has not been registered in the storage portion 35 (NG at step S61), the film thickness measuring device 21 outputs to the display 30 an error message "position of film thickness measurement point is not registered" (step S62) and stops the processing. If registration of the relative position is confirmed (OK at step S61), on the other hand, the measurement point extraction portion 32 reads a relative position (x, y) of the film thickness measurement point P from the storage portion 35. Next, the lattice-shaped pattern 15A is extracted from the measured image picked up by the photo-detector 26 (step S63), to select an appropriate characteristic point R (e.g., characteristic point nearest the center of the observation area) from the extracted lattice-shaped pattern (step S64). Then, the film thickness measurement point P is determined to the position (x, y) with respect to the selected characteristic point R (as in the case of FIG. 15B) (step S65).

When the film thickness measurement point P is determined, the measurement point extraction portion 43 decides whether the film thickness measurement point P has been determined properly (step S66). If it decides that the film thickness measurement point P has not properly been determined (NG at step S66), it takes in the image of the measurement target 36 again (step S67) and extracts the lattice-shaped pattern 15A and determines the film thickness measurement point P again (steps S63-65).

If it decides that the film thickness measurement point P has been determined properly (OK at step S66), on the other hand, the steps of S5 and the subsequent of FIG. 6 are performed, to measure the film thickness of the measurement target 36.

It is to be noted that if a relative position of the film thickness measurement point with respect to a characteristic point of the lattice-shaped pattern is determined beforehand, it is possible to omit the process of registering the relative position of the film thickness measurement point in this embodiment also.

Figure 17A:
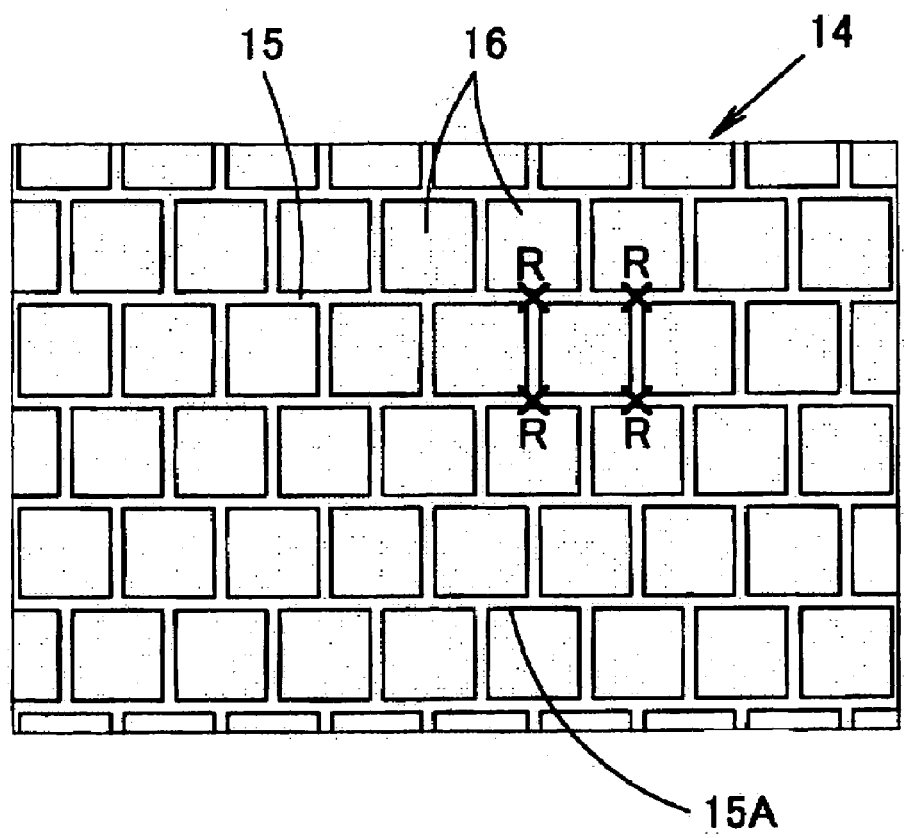
FIGS. 17A and 17B show a variant of the second embodiment and FIG. 17B shows a partial expanded view of FIG. 17A.
Figure 17B:
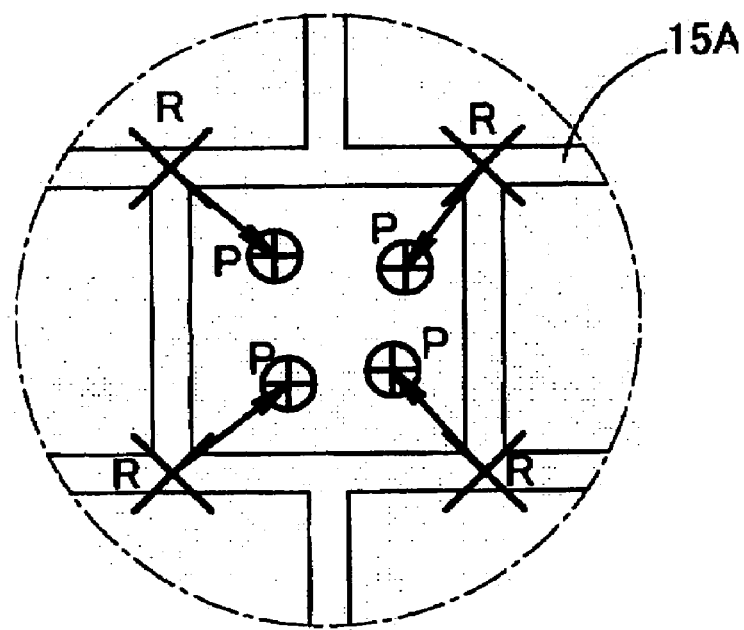

FIGS. 17A and 17B show a variant of the second embodiment. By this variant, a plurality of film thickness measurement points P is entered in the process of registering a relative position of the film thickness measurement point. For example, if a plurality of positions of film thickness measurement points P is entered into the extracted lattice-shaped pattern 15A in the process of registering the relative position of the film thickness measurement point, a relative position of each of the film thickness measurement points P with respect to a characteristic point R positioned near (e.g., edge of a square region surrounded by the lattice-shaped extracted patterns 15A) is measured and registered in the storage portion 35. Then, in the process of determining the film thickness measurement point, based on a plurality of position data pieces stored in the storage portion 35, a plurality of film thickness measurement points for the extracted lattice-shaped pattern 15A is determined (step S4 of FIG. 6). Next, at step S8 of FIG. 6, data pieces of the spectral reflection coefficient at each of these film thickness measurement points P are averaged for each wavelength and, based on each of these averaged data pieces of the spectral coefficient at each of these film thickness measurement points P, a film thickness of the measurement target is measured at steps S10 and S11 of FIG. 6. Alternatively, at steps S11 and S12 of FIG. 6, the film thickness of the measurement target may be measured for each of the film thickness measurement points to obtain an average value of these film thickness values and output it. By thus performing averaging by using a plurality of film thickness measurement points, it is possible to improve a stability of the measurement of a film thickness of the measurement target.

(Third Method for Extracting Film Thickness Measurement Point)

Figure 18A:
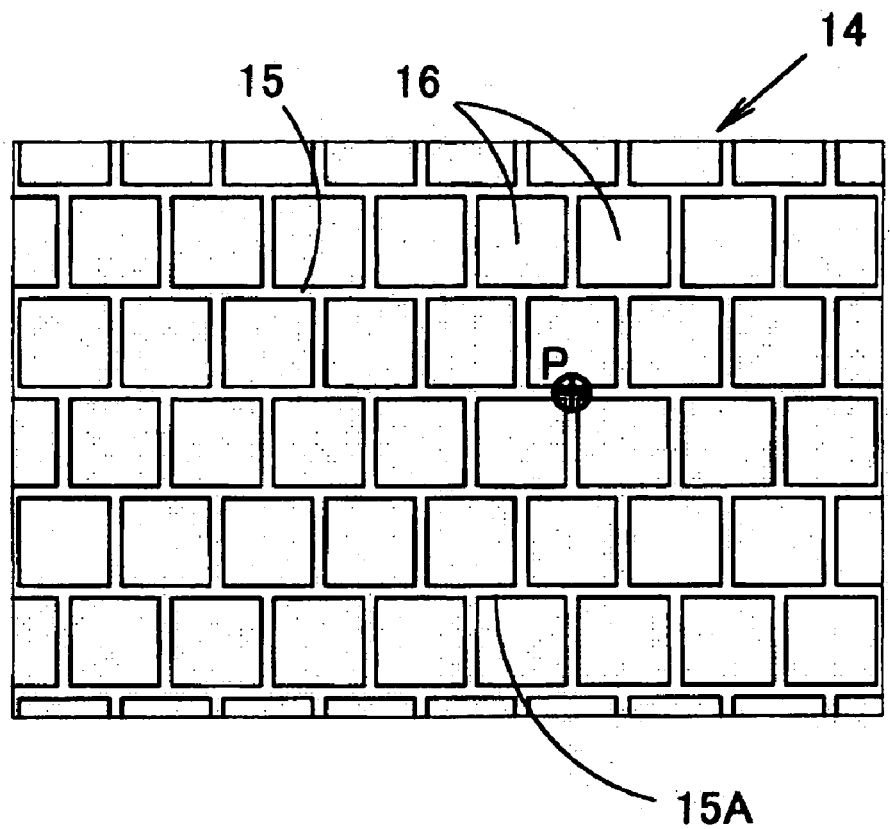
FIGS. 18A and 18B show different variants of the second embodiment and FIG. 18B shows a partial expanded view of FIG. 18A.
Figure 18B:
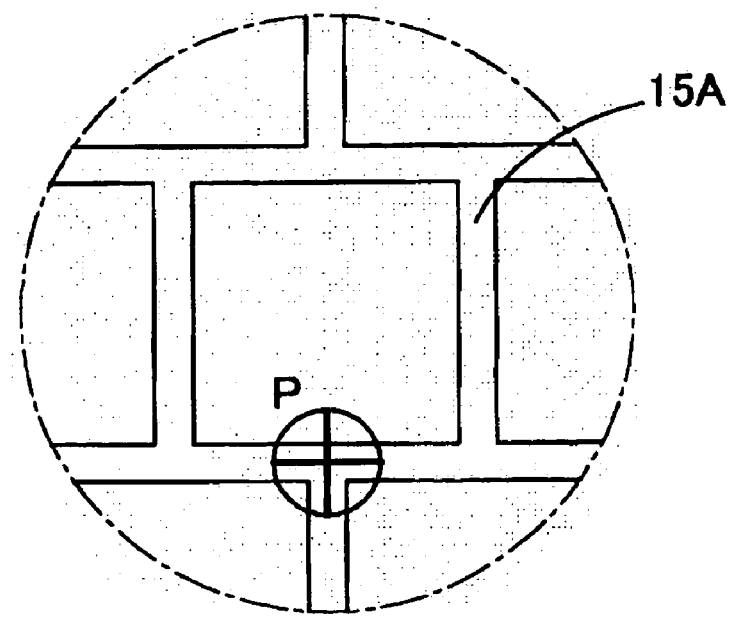

By the third film thickness measurement extraction method, a characteristics point is extracted from a measured image of a measurement target to determine a film thickness measurement point. FIGS. 18A and 18B show the third film thickness measurement point extraction method. This method assumes a case where a film thickness of a poly-imide film in the light blocking region 15 is measured. By this method, in a process of determining a film thickness measurement point (a process for registering an extracted pattern or a process for registering a position of the film thickness measurement point are unnecessary), a lattice-shaped pattern 15A is extracted and then an intersection, which is a characteristic point of the extracted pattern 15A, is extracted to determine a center of these extracted intersections as a film thickness measurement point P.

Figure 19:
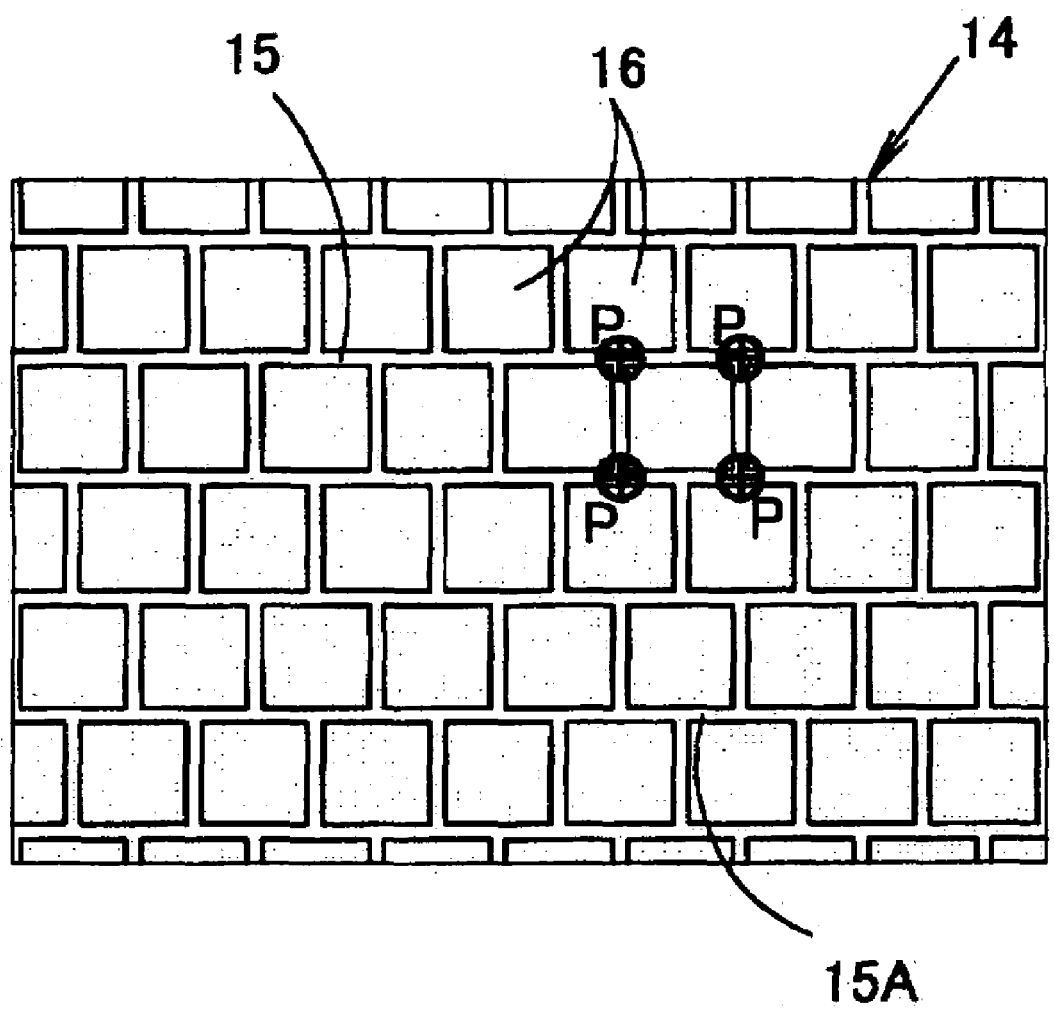
FIG. 19 shows a further different variant of the second embodiment.

FIG. 19 shows a variant of the third film thickness measurement point extraction method, by which a film thickness of a poly-imide film in the light blocking region 15 is measured as expected. By this variant, the lattice-shaped pattern 15A is extracted in a process of determining a film thickness measurement point and then, an edge of a square region surrounded by the extracted patterns 15A is extracted as a characteristic so that a center of the extracted edge may be determined as the film thickness measurement point P. The film thickness to be output may be an average value of film thickness values measured at the various film thickness measurement points P or a film thickness obtained from an average value of the spectral reflection coefficient at these film thickness measurement points P.

(Fourth Method for Extracting Film Thickness Measurement Point)

Figure 20:
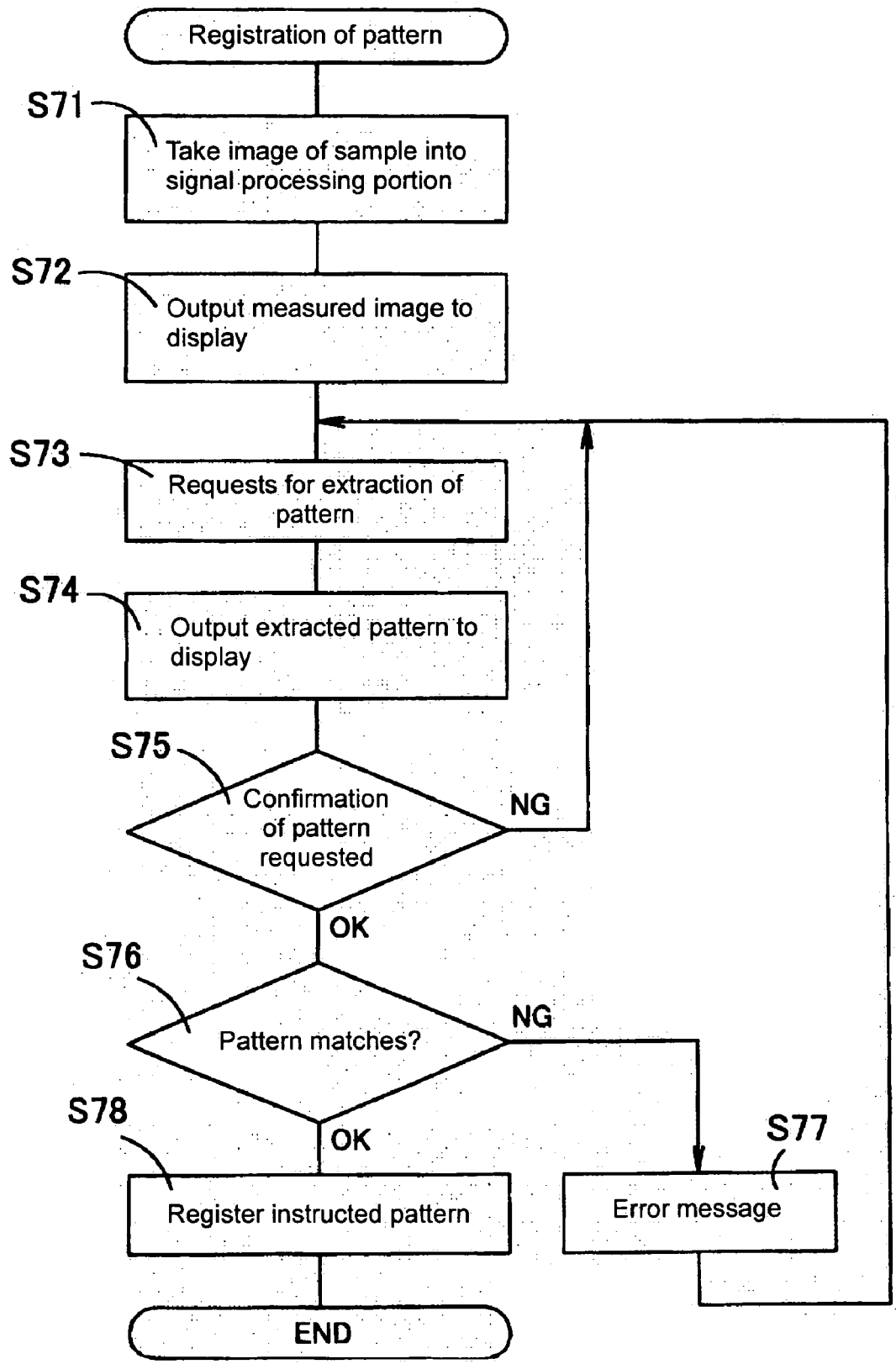
FIG. 20 shows an explanatory flowchart of a procedure for registering a pattern according to a fourth film thickness measurement point extraction method.
Figure 21A:
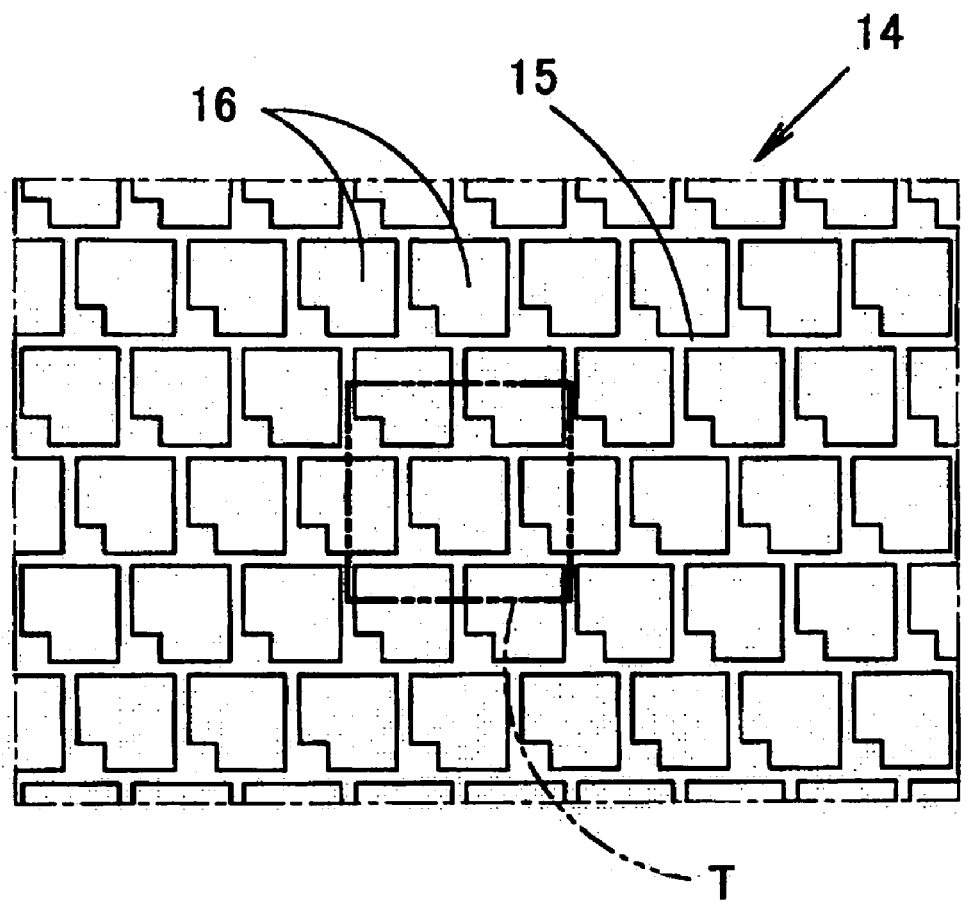
FIG. 21A shows how to instruct a region which provides a pattern for a measured image and FIG. 21B shows an expanded view of a pattern extracted from the measured image.
Figure 21B:
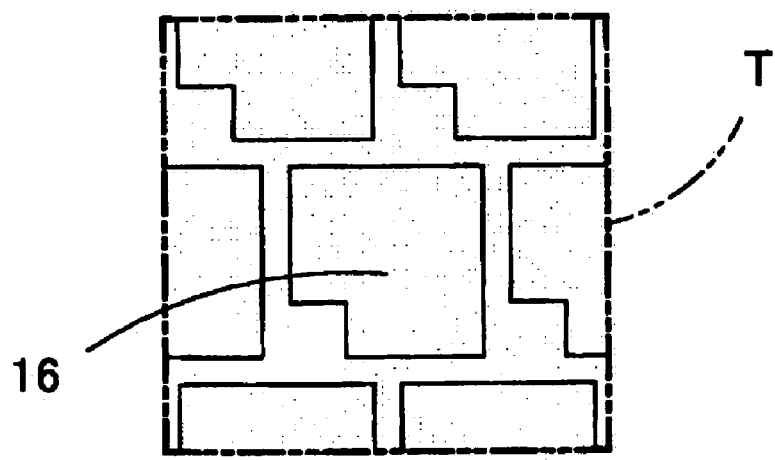

By the fourth film thickness measurement point extraction method, in a process of registering a pattern, an operator specifies a region which provides a pattern and registers it. FIG. 20 is an explanatory flowchart of a procedure for registering a pattern according to the fourth film thickness measurement point extraction method and FIGS. 21A and 21B are their explanatory illustrations. This method enables the operator to directly specify a pattern to be registered for a measured image.

The following will describe a pattern registering process in the fourth film thickness measurement point extraction method along the flowchart of FIG. 20. In this process, an image in an observation area of a sample is picked up by the photo-detector 26, so that image data converted into a digital signal at the A/D converter 27 is taken into the signal processing portion 28 (step S71). Next, the measurement point extraction portion 32 outputs the image data to the display 30 so that the display 30 may display a measured image thus taken in (step S72)and requests the operator to specify a region which provides a pattern for the measured image in order to extract the pattern.

The operator requested to extract the pattern specifies a region in such a manner that a point desired to be specified as a film thickness measurement point may be a center. That is, input part such as the mouse (input/output portion 29) is used to specify a region to be extracted as the pattern for a measured image displayed on the display 30 as shown in FIG. 21A. When the region is specified, the measurement point extraction portion 32 recognizes the specified region as an extraction pattern T and, as shown in FIG. 21B, outputs the extracted pattern T to the display 30 to display it on the display 30 in a condition where it is superimposed on the image in the observation area (step S74). Next, the signal processing portion 28 requests the operator to confirm whether the displayed extraction pattern T is right (step S75). The operator, when requested for confirmation, confirms the extraction pattern T displayed on the display 30 and, if the displayed extraction pattern 15A is right, presses the "OK" button and, if it needs to be modified, presses the "NG" button.

When the NG button is pressed at step S75, the film thickness measuring device 21 requests for pattern extraction again, displays the extracted pattern T on the display 30, and requests for confirmation by the operator again (steps S73-75).

If the OK button is pressed at step S75, on the other hand, the measurement point extraction portion 32 decides whether the extracted pattern T is right. For example, if a region of the pattern T is too small or large, it outputs an error message (step S77) and requests for pattern extraction again (step S73). Alternatively, in the case of NG at step S76, an error message may be output to the effect that any other registration method should be used to make setting at step S77.

If the pattern is decided to be right at step S76, the obtained extracted pattern T is stored in the storage portion 35, to complete pattern registration (step S78).

After registration of the extracted pattern T is completed, in a process of determining a film thickness measurement point in the film thickness measurement step, in accordance with the same procedure as that shown in the flowchart of FIG. 11, a region that matches the extracted pattern T is extracted from a spectroscopic image and a film thickness measurement point is set to a center of this region.

By such a method, the operator can specify an extraction pattern as watching a measured image, so that the operator, who is a user, can set an extraction pattern easily, thereby reducing time required in registration.

Further, a repetition unit pattern may be extracted from a pattern T specified by the operator and stored in the storage portion 35 as a registered pattern.

Further, another method for causing the operator to specify a pattern may be employed for causing the operator to specify a plurality of points so that a region surrounded by the plurality of points can be registered as a pattern. For example, the operator may instruct a position having a X-mark shown as a characteristic point R in FIG. 19 to register a square region surrounded by the X-marks as the pattern.

(Fifth Method for Extracting Film Thickness Measurement Point)

Figure 22:
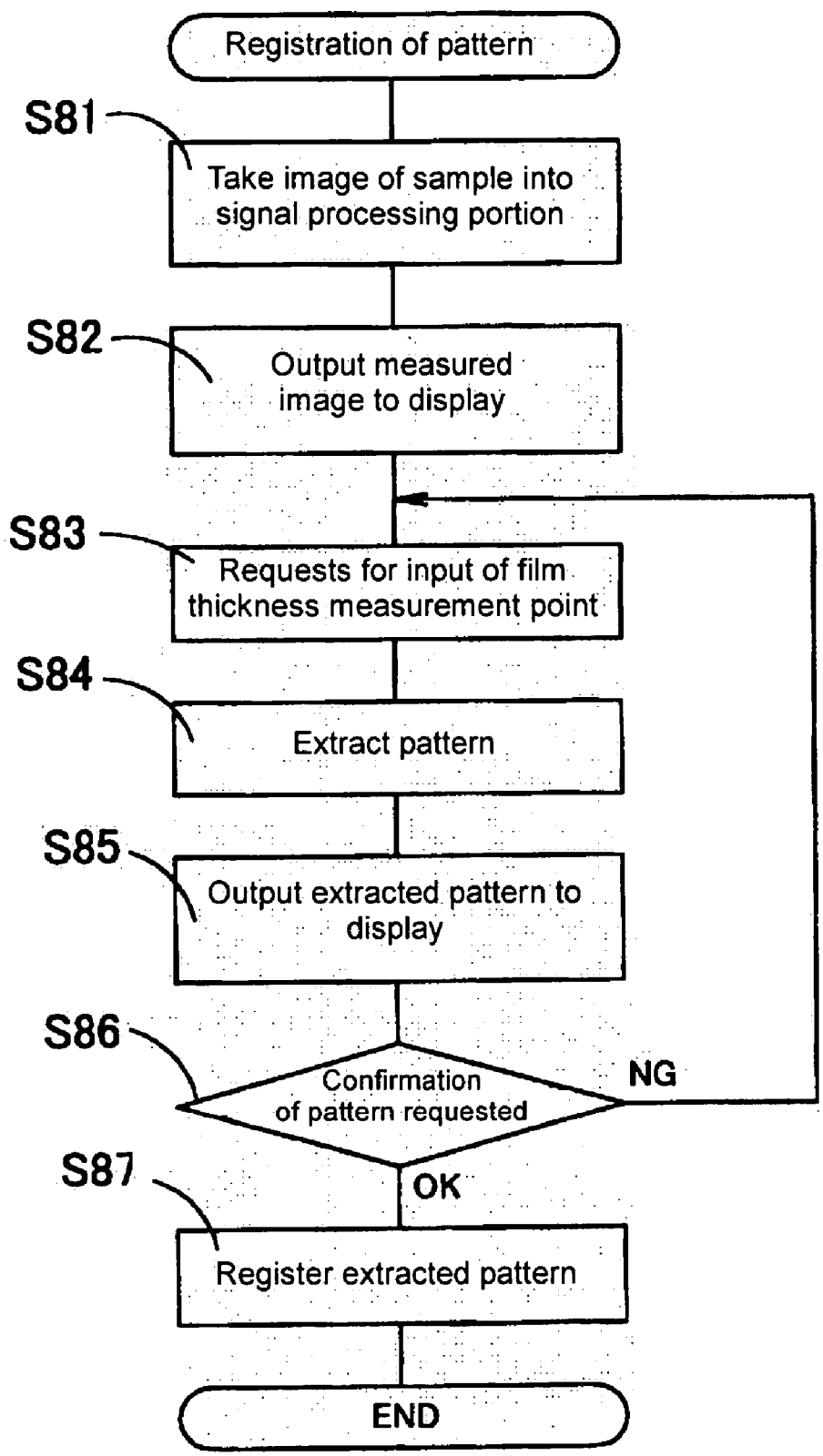
FIG. 22 shows an explanatory flowchart of a procedure for registering a pattern according to a fifth film thickness measurement point extraction method.

By the fifth film thickness measurement point extraction method, in a pattern registration process, a pattern is automatically extracted on the basis of an entry of a film thickness measurement point by the operator and registered. FIG. 22 is an explanatory flowchart of a procedure for registering a pattern according to the fifth film thickness measurement point extraction method and FIGS. 23A and 23B and FIGS. 24C and 24D are explanatory illustrations. This method enables the user to directly specify a film thickness measurement point P for a measured image.

The following will describe a pattern registration process in the fifth film thickness measurement point extraction method along the flowchart of FIG. 22. In this process, an image of a sample in the observation area is picked up by the photo-detector 26 and image data converted into a digital signal by the A/D converter 27 is taken into the signal processing portion 28 (step S81). Next, the measurement point extraction portion 32 outputs the image data to the display 30 and causes the display 30 to display a measured image taken in (step S82) and then requests the operator to enter a film thickness measurement point P into the measured image (step S83).

Figure 23A:
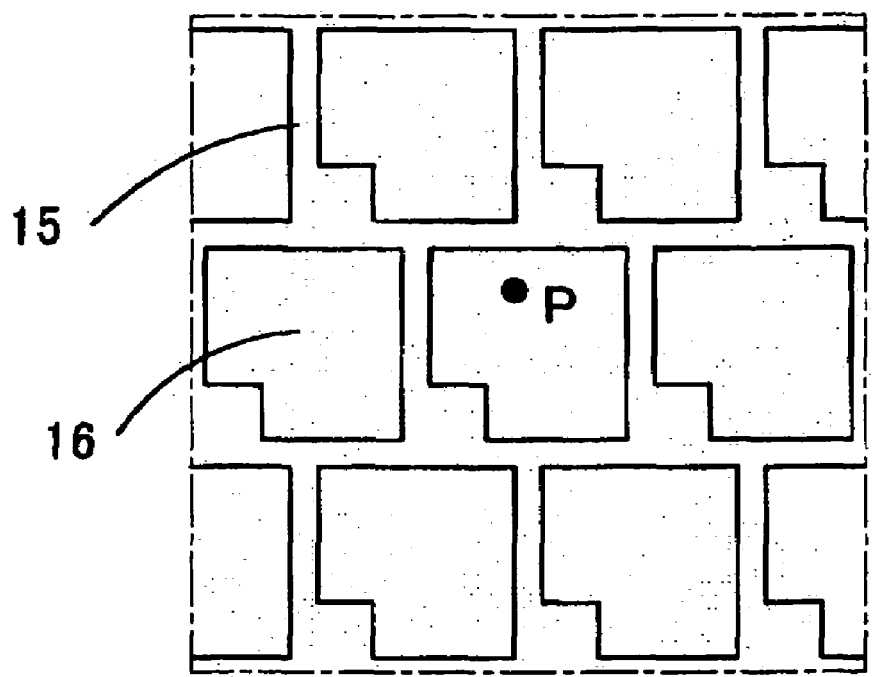
FIGS. 23A and 23B show explanatory illustrations of a process in which a film thickness measurement point is input to a measured image and then a region which provides a pattern is extracted.
Figure 23B:
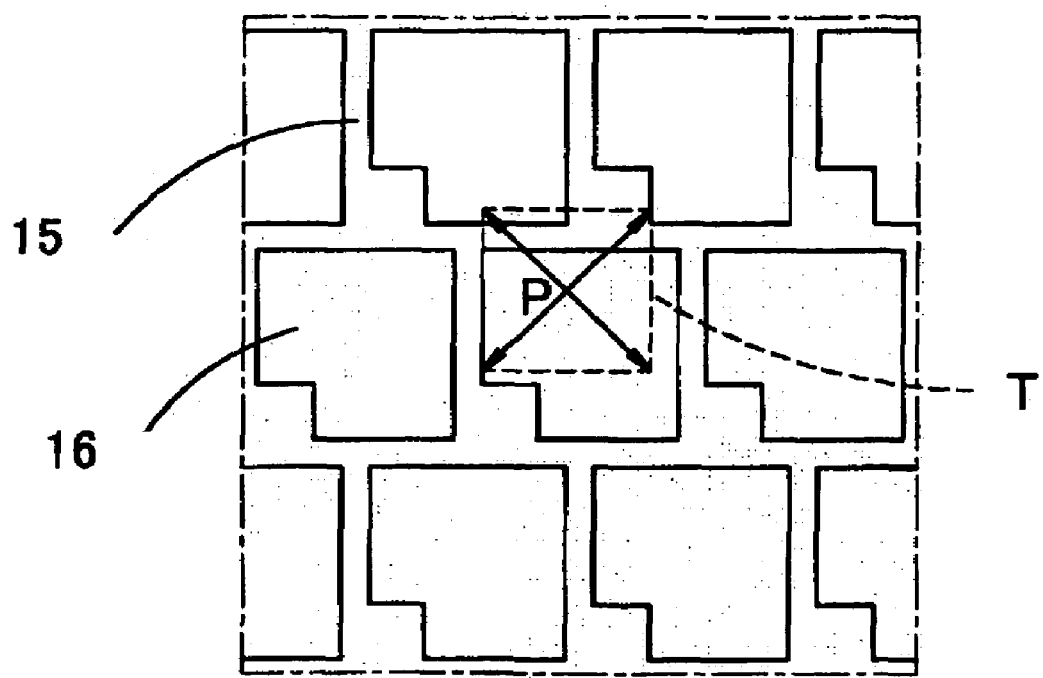

When requested to enter a film thickness measurement point, the operator uses the mouse or the touch panel to specify the film thickness measurement point P fir the measured image displayed on the display 30. When the film thickness measurement point P is specified as shown in FIG. 23A, the specified film thickness measurement point P is displayed on the display 30, so that the measurement point extraction portion 32 extracts as a targeted pattern region a region including the specified film thickness measurement point P(step S84). By an extraction pattern determination method, for example, as shown in FIG. 23B, when a film thickness measurement point P is entered, a square region which provides an extraction pattern T having the film thickness measurement point P as its center is extracted and, as shown in FIG. 23C, the square region which provides the extraction pattern T is expanded with the film thickness measurement point P as the center, so that the region having an optimal size is selected to determine the extraction pattern T. Although in the case of expanding the square region in such a manner, it may be expanded continuously, the square region may be expanded in a skipping manner so that at least one side may be aligned with an edge of the light-blocking region 15 in an example shown in FIGS. 23A, 23B, and 23C. Alternatively, a region having a constant luminosity including the specified film thickness measurement point P may be defined as the extraction pattern T.

Figure 24C:
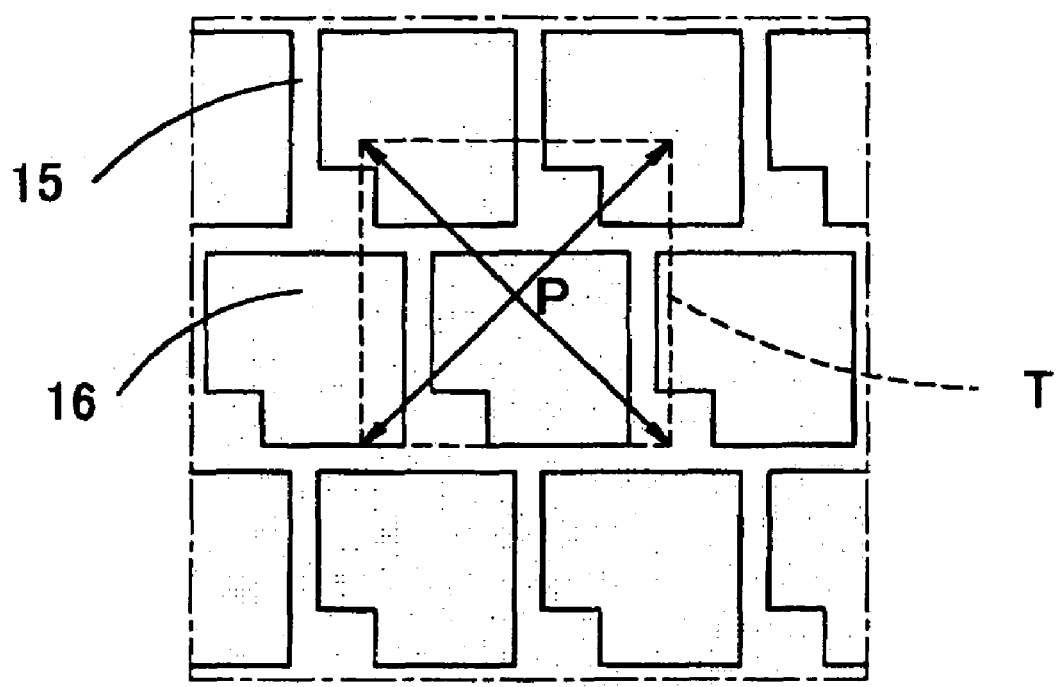
FIG. 24C shows a continuation of FIGS. 23A and 23B and explains how a square region which provides a pattern is expanded and FIG. 24D shows an expanded view of a pattern extracted from a measured image.
Figure 24D:
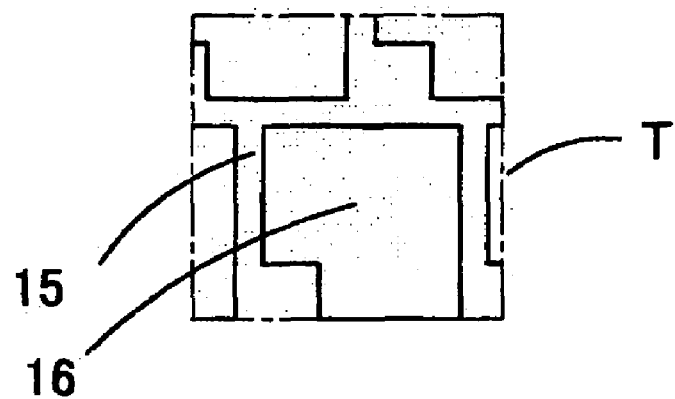

When the square region is determined in such a manner, the measurement point extraction portion 32 recognizes the specified region as the extraction pattern T and outputs the extracted pattern T to the display 30 to display on the display 30 such an extracted pattern T as shown in FIG. 24D in a condition where it is superimposed on the image in the observation area (step S85). Next, the signal processing portion 28 requests the operator to confirm whether the displayed extracted pattern T is right (step S86). When requested for confirmation, the operator recognizes the extracted pattern T displayed on the display 30 and, if the displayed extracted pattern 15A is right, presses the "OK" button and, if it needs to be modified, presses the "NG" button.

When the NG button is pressed at step S86, the film thickness measuring device 21 requests for entry of a film thickness measurement point again, displays the extracted pattern T on the display 30, and requests the operator for confirmation again (steps S83-86).

If the OK button is pressed at step S86, on the other hand, the obtained extracted pattern T is stored in the storage portion 35 to complete pattern registration (step S87)

After the registration of the extracted pattern T is completed, in a process of film thickness measurement point extraction determination process in the film thickness measurement step, in accordance with the same procedure as that shown in the flowchart of FIG. 11, a region that matches the extracted pattern T is extracted from the spectroscopic image and the film thickness measurement point P is set to a center of the region.

In accordance with such a method, the operator can specify an extraction pattern as watching a measured image, so that the operator, who is a user, can easily set the extraction pattern, thereby reducing time required in registration.

(Sixth Method for Extracting Film Thickness Measurement Point)

Figure 25:
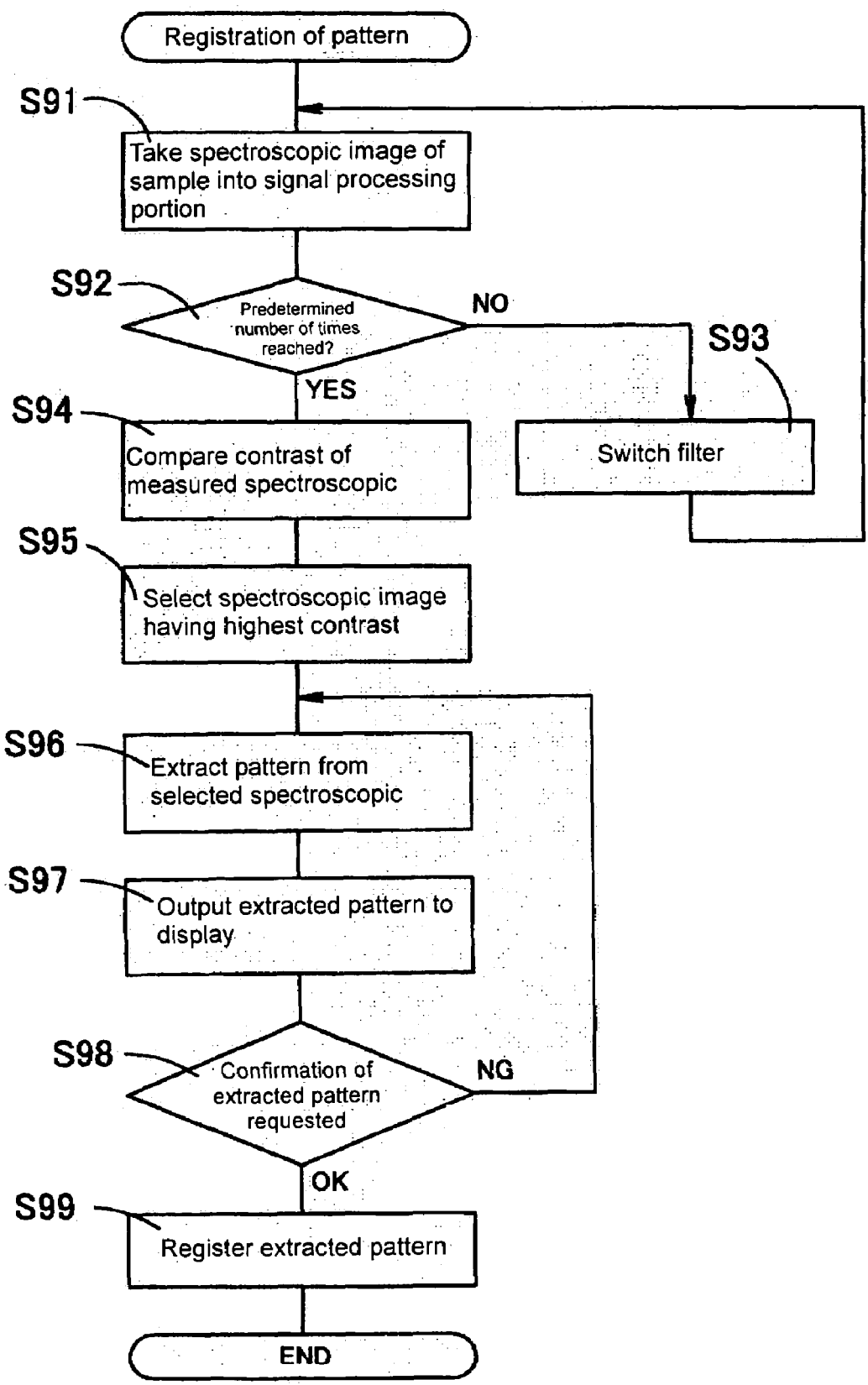
FIG. 25 shows an explanatory flowchart of a procedure for registering a pattern according to a sixth film thickness measurement point extraction method.

The sixth film thickness measurement point extraction method enables improving an accuracy of pattern registration, taking into account that different spectroscopic images have different contrasts. FIG. 25 is an explanatory flowchart of a procedure for registering a pattern according to the sixth film thickness measurement point extraction method and FIGS. 26A, 26B, 26C, and 26D and FIG. 27 are explanatory illustrations.

The following will describe the pattern registration procedure along the flowchart of FIG. 25. First, a spectroscopic image of a measurement target 36 which has passed through any one of the spectroscopic filters is taken from the photo-detector 26 into the signal processing portion 28 (step S91). Next, until a predetermined number of times is reached (step S92), the spectroscopic filter is switched to such a spectroscopic filter as to have a different wavelength band (step S93), so that a spectroscopic image which has passed through this switched spectroscopic filter is taken into the signal processing portion 28. As a result, the measurement point extraction portion 32 obtains a predetermined number of spectroscopic images having different wavelengths as shown in FIGS. 26A, 26B, 26C, and 26D.

Figure 27:
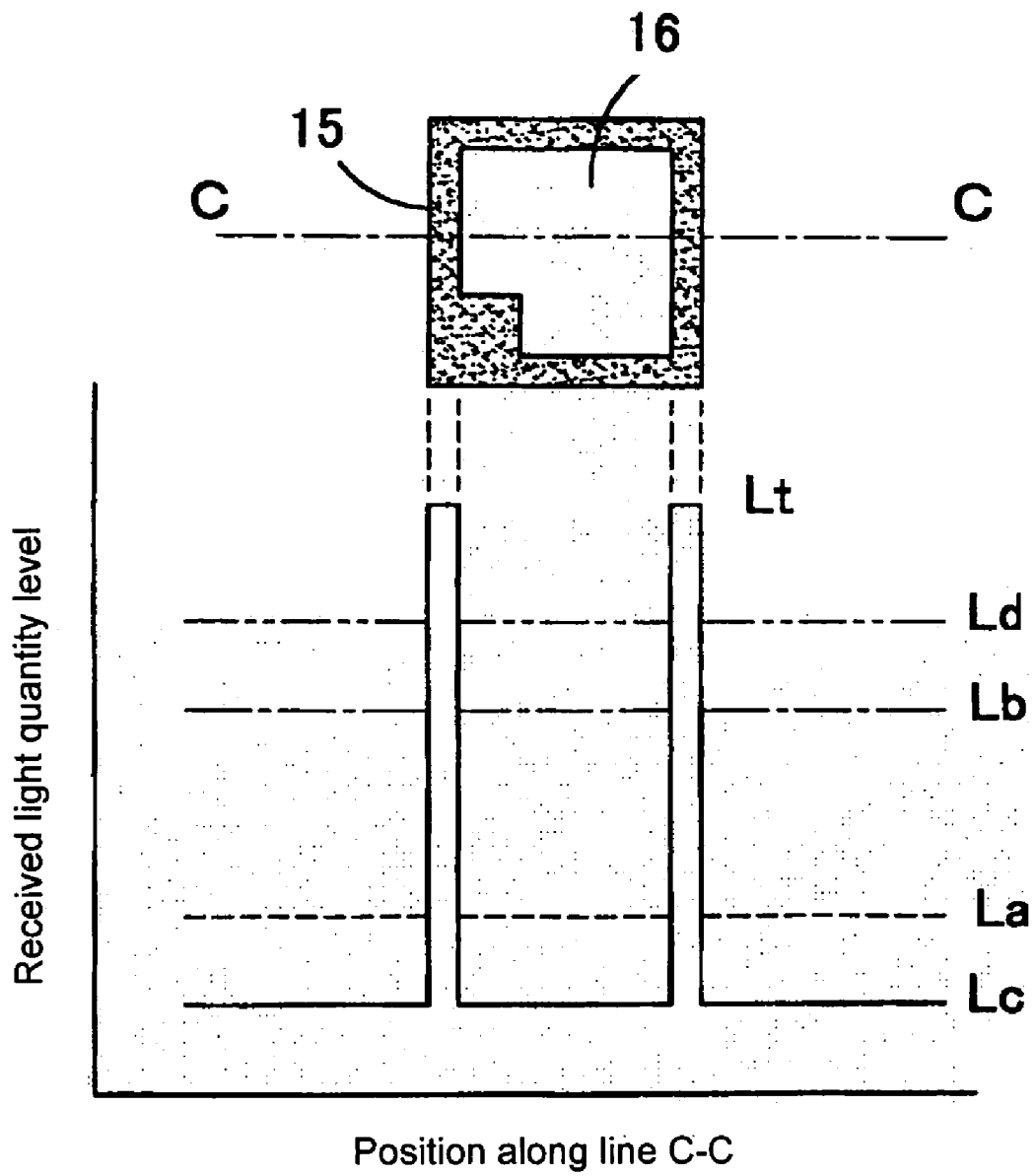
FIG. 27 shows a comparison in contrast of patterns extracted from different spectroscopic images.

Next, the measurement point extraction portion 32 compares contracts of the plurality of spectroscopic images to each other (step S94). For example, patterns extracted from the TFT substrate 14 do not have a large different in reflection coefficient and have a roughly constant received light quantity level of Lt but, at the pixel opening 16, have different reflection coefficients depending on a wavelength, so that if the received light quantity is measured along a line C-C of the spectroscopic images as shown in FIG. 27, the received light quantity level at the pixel opening 16 has different values such as La, Lb, Lc, and Ld depending on a wavelength.

The measurement point extraction portion 32 selects a spectroscopic image that has a highest contrast of those spectroscopic images (step S95). Of those shown in FIG. 27, a spectroscopic image that has the received light quantity level of Lc at the pixel opening 16 has the highest contrast, so that it this is an spectroscopic image of the extracted pattern Q obtained from the spectroscopic image of FIG. 26C, for example, the measurement point extraction portion 32 selects the spectroscopic image of FIG. 26C.

Next, the measurement point extraction portion 32 automatically extracts the pattern Q from the selected spectroscopic image as shown in FIG. 26C (step S96). This pattern extraction method may be any one described above or any other than that. Since the pattern Q is extracted on the basis of a spectroscopic image having the highest contrast, the extraction accuracy becomes higher, thereby enabling extracting patterns stably. The measurement point extraction portion 32 outputs the extracted pattern Q to the display 30 so that the pattern Q may be displayed on the display 30 (step S97). Next, the signal processing portion 28 requests for confirmation of the extracted pattern Q displayed on the display 30 (step S98). The operator confirms the extracted pattern Q displayed on the display 30 and, if the extracted pattern has been recognized properly, presses, for example, the "OK" button and, otherwise, presses the "NG" button.

When the NG button is pressed at step S98, the film thickness measuring device 21 extracts a pattern and displays it on the display 30 again and requests the operator to confirm it (steps S96-S98).

If the OK button is pressed at step S98, on the other hand, the film thickness measuring device 21 stores in the storage portion 35 a wavelength of a spectroscopic image selected as the extracted pattern Q (or a spectroscopic filter which is used for that), thus completing pattern registration (step S99).

When the extracted pattern Q is registered in such a manner, in a film thickness measurement step for the measurement target 36, a film thickness of the measurement target 36 is measured in accordance with the procedure described with reference to FIG. 6 and, at step S4 in FIG. 6, a film thickness measurement point P is determined in accordance with such a procedure as shown in FIG. 11. Although in this process of determining the film thickness measurement point P also, a pattern that matches a registered pattern is extracted, such a spectroscopic image as to have a wavelength registered at step S99 can be used as a spectroscopic image used to extract the pattern that matches a registered pattern, thereby extracting the pattern that matches the registered pattern at a high accuracy.

It is to be noted that in a case where the step of registering a pattern beforehand is not necessary, spectroscopic images may be compared to each other to select the spectroscopic image that has a high contrast before extracting the pattern at the process of determining a film thickness measurement point.

(Seventh Method for Extracting Film Thickness Measurement Point)

Figure 28:
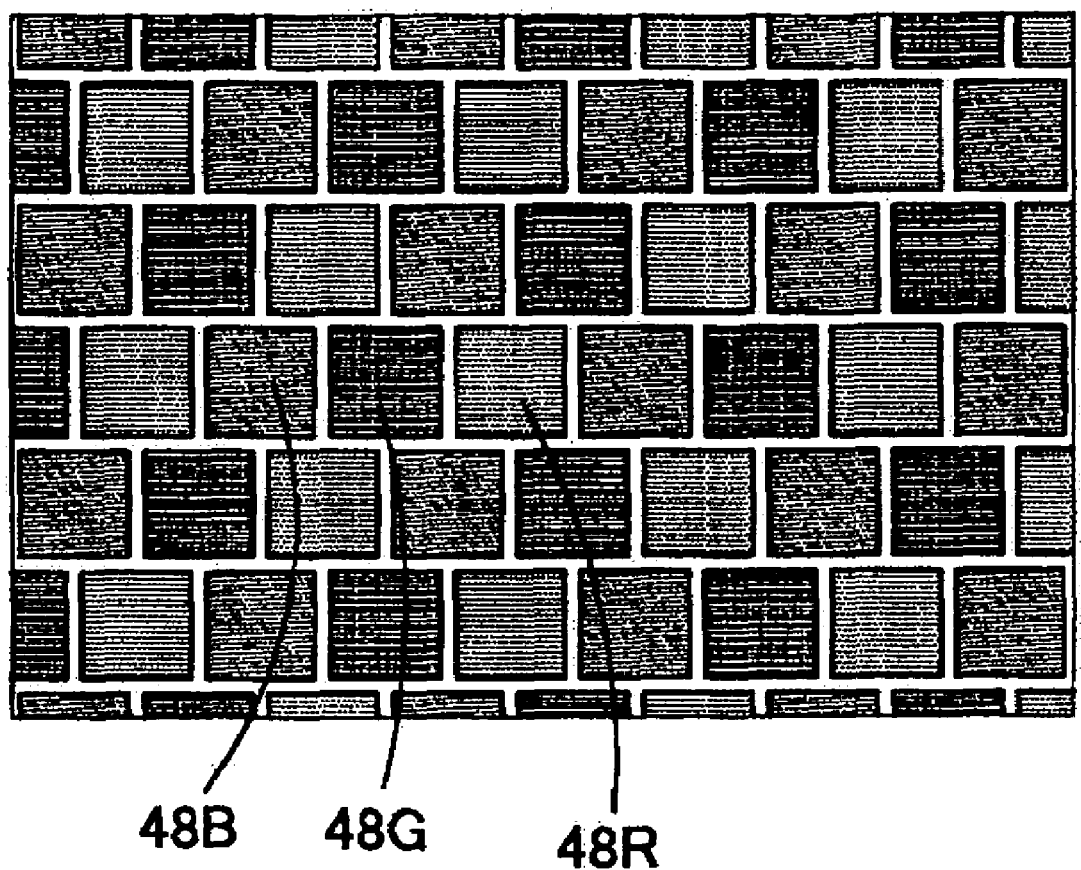
FIG. 28 shows display of a measured image picked up as a white image.
Figure 29:
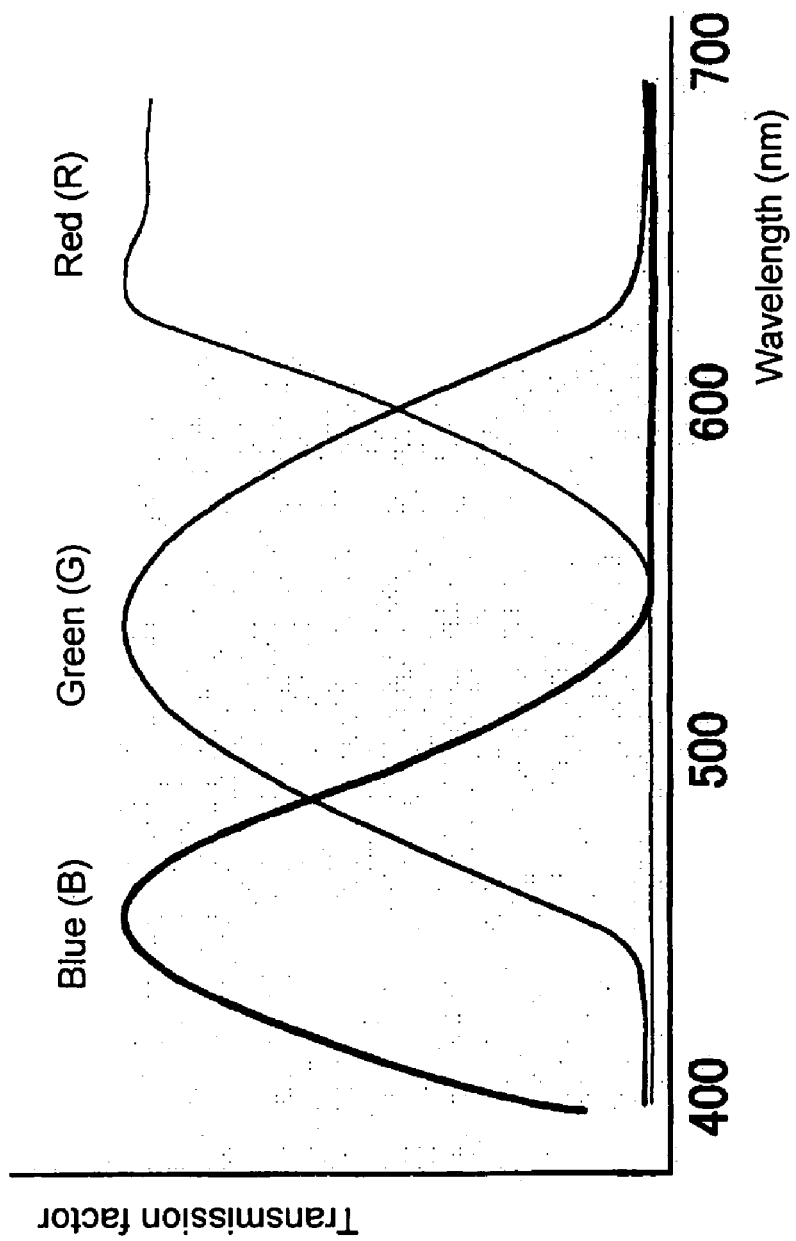
FIG. 29 shows properties of transmission factors of red, green, and blue filters.
Figure 30:
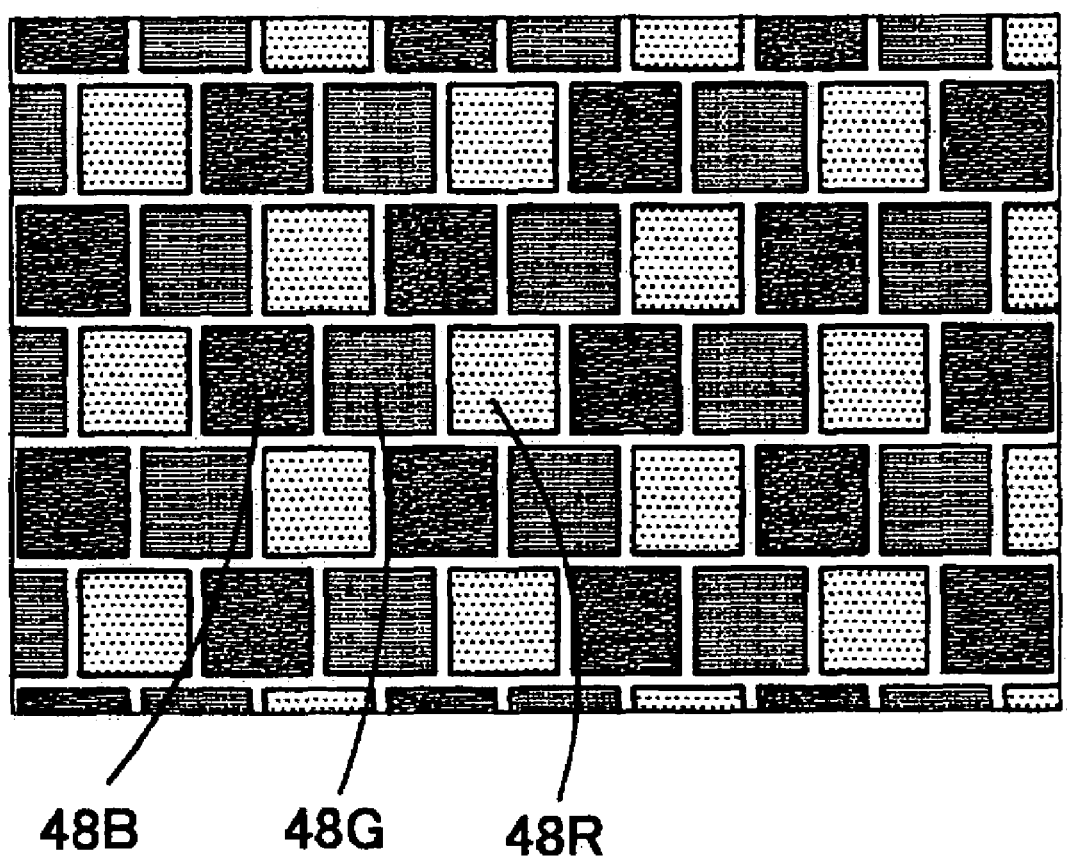
FIG. 30 shows display of a red spectroscopic image which has passed through the red filter.

Assuming a case where a film thickness of each of red, green, and blue color resists (cells) which have been applied to glass substrates of color filters is measured, the photo-detector 26 for measurement of a spectral reflection coefficient cannot accommodate color resists, so that if the photo-detector 26 picks up a white image by using white light, a measured image of the color resist displayed on the display 30 will be such as shown in, for example, FIG. 28, in which case the read resist 48R, the green resist 48G, and the blue resist 48B cannot be distinguished from each other. Therefore, when a pattern whose film thickness is to be measured is registered, the colors cannot be distinguished from each other. Further, transmission factor properties of a red spectroscopic filter, a green spectroscopic filter, and a blue spectroscopic filter are such as shown in FIG. 29, so that in a case where, for example, a red image which has passed through the red spectroscopic filter is picked up by the photo-detector 26, a measured image of a color resist displayed on the display 30 will be such as shown in, for example, FIG. 30, in which a region of the read resist b48R becomes whitish and a region of the green resist 48G and that of the blue resist 48B cannot be distinguished from each other. Therefore, when registering a pattern whose film thickness is to be measured, it is impossible to distinguish the green resist 48G and the blue resist 48B from each other.

Figure 31:
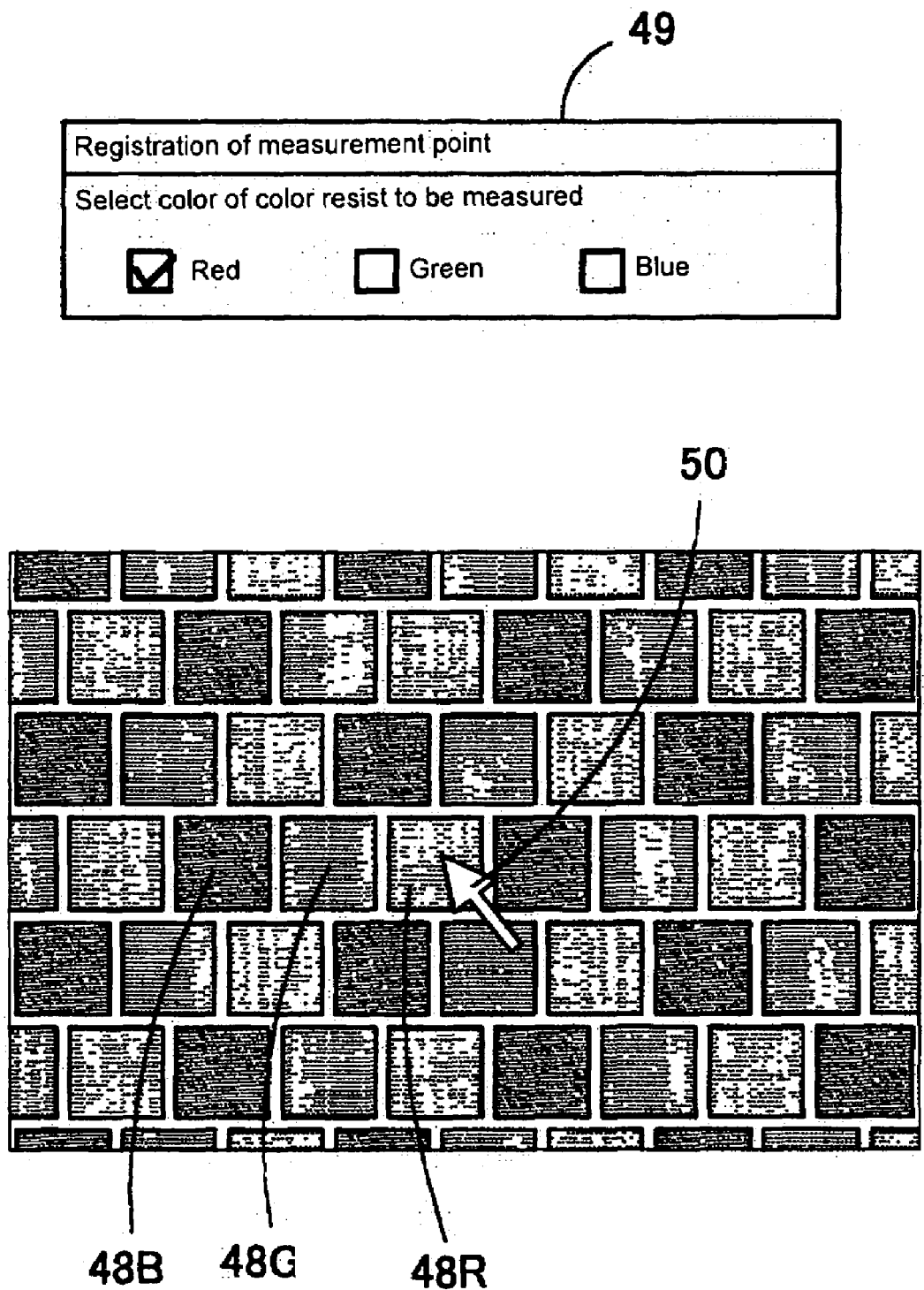
FIG. 31 explains a seventh film thickness measurement point extraction method and shows a selection menu and a measured image which are displayed when a pattern is registered.

The seventh film thickness measurement point extraction method has enabled accommodating color resists in such a case. That is, by this film thickness measurement point extraction method, when a pattern registration process starts, first the spectroscopic filter of the photo-detector 25 is switched in color to red (R), green (G) and blue (B) to take in a measured image. In a measured image which has passed through the red spectroscopic filter, the region of the green resist 48G becomes whitish, in a measured image which has passed through the green spectroscopic filter, the region of the green resist 48R becomes whitish, and in a measured image which has passed through the blue spectroscopic filter, the region of the blue resist 48B becomes whitish, so that by analyzing these measured images, it is possible to map the regions of the red resist 48R, the green resist 48G, and the blue resist 48B and store them in the storage portion 35. When the regions of these colors have been mapped, the signal processing 28 takes in a white-light measured image and displays this white-light measured image and a selection menu 49 on the display 30 as shown in FIG. 31. Then, when the operator selects a resist color (e.g., red resist as shown in FIG. 31) from the selection menu 49, a pointer 50 of the display 30 points to the region of the red resist 48R, so that a pattern of the region of the red resist 48R is extracted and, this extracted pattern and a kind of the corresponding spectroscopic filter are stored in the storage portion 35.

Next, in a step of measuring a film thickness of the red resist 48R, the type of the spectroscopic filter and the registered pattern are read and, the spectroscope 25 is set to a registered spectroscopic filter, e.g., red spectroscopic filter. Then, a pattern that matches the registered pattern is extracted from a region (whitish region) having a larger received light quantity of a spectroscopic image having a specific wavelength which has passed through this spectroscopic filter.

By such a method, it is possible to make efficient an operation of measuring a color target, thereby accurately measuring a film thickness of a thin film having a color of interest. It is to be noted that the color of the measurement target 36 is not limited to red, green, and blue as described above. Further, in contrary to FIG. 31, when a region of the measured image is pointed to by the pointer, a kind (color name) of a color of that region may be displayed on the selection menu.

(Eighth Method for Extracting Film Thickness Measurement Point)

The eighth film thickness measurement point extraction method related to determination of a spectroscopic image from which a pattern is to be extracted. To measure a film thickness by the film thickness measuring device 21, a film configuration and a optical constant or a physical constant are input beforehand. In addition to these, on a manufacturing line, a film thickness value of a target region is also clear, so that by this method, information of the film thickness value is also input into the signal processing portion 28. Then, based on these information pieces (especially a target film thickness value and optical constant), a logical reflection coefficient is calculated, so that based on this result, wavelengths are determined at which the reflection coefficient is maximized and minimized respectively. When wavelength at which the target film's reflection coefficient is maximized and minimized respectively are determined, based on information relating to the measurement target (e.g., substrate configuraiton, kind of film in a periphery of measurement region, actual measurement value of refection coefficient of the periphery), a wavelength (spectral color) at which a contrast of the image is maximized is determined.

Figure 32:
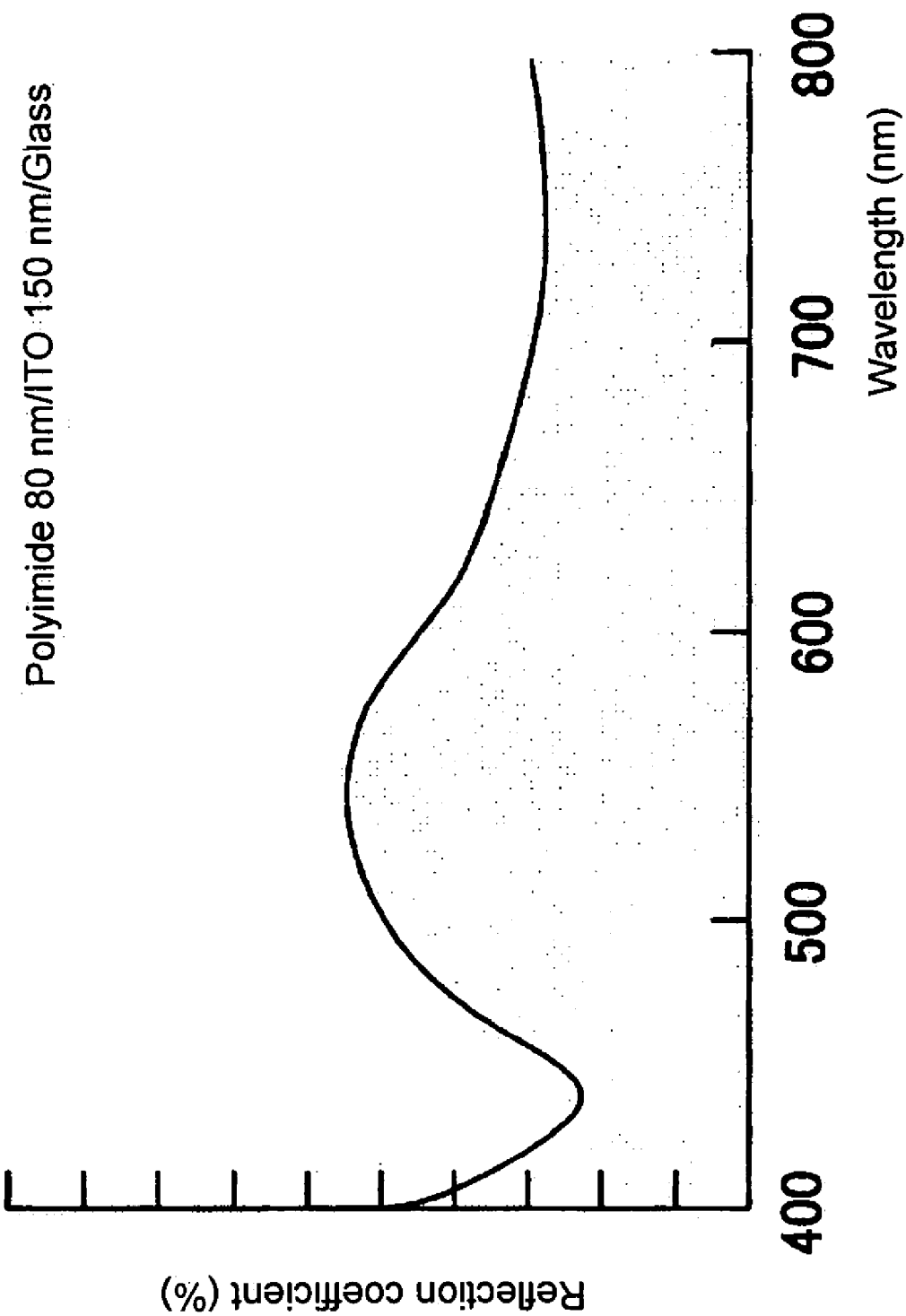
FIG. 32 explains an eighth film thickness measurement point extraction method and shows a result of theoretically calculating a reflection coefficient of a thin film to be measured.

For example, assume that a result of calculating a logical reflection coefficient in a case where a glass substrate on which a 150-nm ITO film and an 80-nm poly-imide film is formed is represented by FIG. 32. Based on this logical reflection coefficient, at a wavelength of about 550 nm, the reflection coefficient is maximized and, at a wavelength of about 430 nm, the reflection coefficient is minimized. If a region in which the film thickness of this measurement target is measured is provided with an electrode on its periphery, the reflection coefficient in the electrode region is very large irrespective of the wavelength (see FIG. 27), so that by reducing the reflection coefficient, an measured image has a large contrast in the film thickness measurement region. Therefore, as a wavelength or a kind of a spectroscopic filter of light used in extraction of a pattern from a measured image, a wavelength at which the reflection coefficient is minimized, that is, a wavelength of about 430 nm and a spectroscopic filter through which light having this wavelength passes are used respectively.

By such a method, it is unnecessary to experimentally determine an optimal light wavelength or a kind of a spectroscopic filter beforehand in order to obtain a spectroscopic image having a high contrast, thereby making film thickness measurement efficient.

(Ninth Method for Extracting Film Thickness Measurement Point)

Figure 33A:
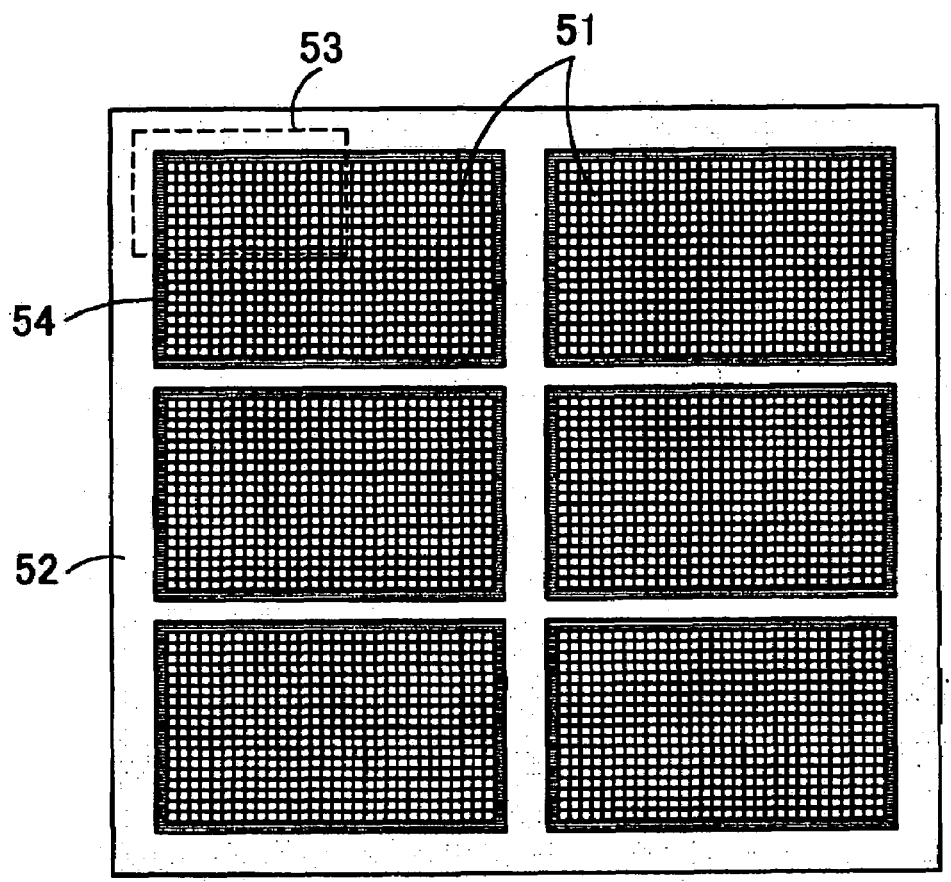
FIGS. 33A and 33B explain a ninth film thickness measurement point extraction method.
Figure 33B:
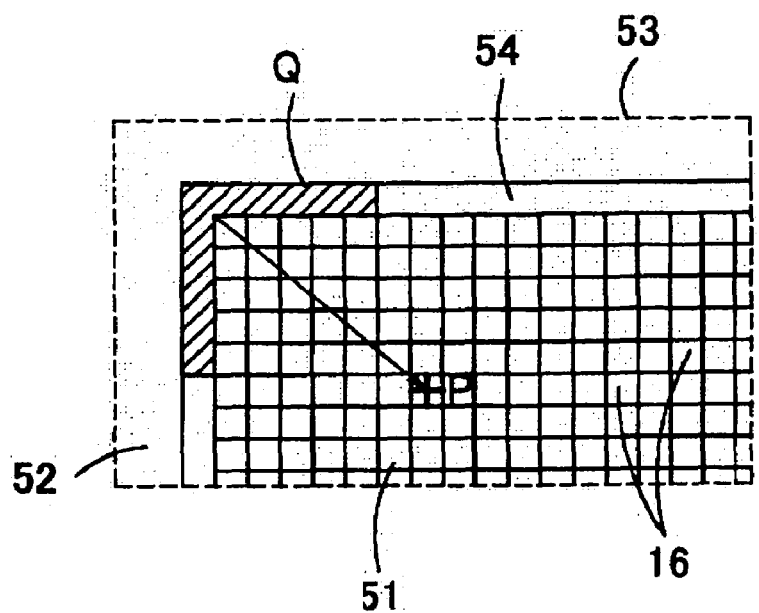

The ninth film thickness measurement point extraction method determines a film thickness measurement point of a panel 51 in a condition where a mother glass 52 has, formed thereon, a plurality of panels 51 such as FPD panels. FIG. 33A shows how to beforehand register a film thickness measurement point for the mother glass 52 on which the plurality of panels 51 is formed and FIG. 33B is an expanded view of a region surrounded by a broken line in FIG. 33A.

In the measurement target shown in FIG. 33A, on the large-sized mother glass 52, the plurality of panels 51 is formed side by side. At an edge of the panel 51, a frame-shaped light blocking region 54 having no pixel opening 16 is formed. These panels 51 are finally cut off from the other by dicing the mother glass 52.

By the ninth film thickness measurement point extraction method, in a case where the operator teaches a film thickness measurement point and registers it in the signal processing portion 28 beforehand, the mother glass 52 of a sample or the film thickness measuring device 21 is arranged so that, as shown in FIG. 33A, only an edge portion of the panel 51 may become a measurement view-field 53. Then, from an image in the measurement view-field 53 such as shown in FIG. 33B, a portion of the light blocking region 54 at the edge of the panel 51 (hatched portion in FIG. 33B) is extracted as the pattern Q. Next, when a point in any one of the pixel openings 16 is instructed as a measurement point P by the operator, the signal processing portion 28 measures a displacement of the measurement point P with respect to the corner or edge of the extracted pattern Q and stores this displacement in the storage 35.

Similarly, also in a process of determining a film thickness measurement point in the film thickness measurement step, the signal processing portion 28 contains the edge portion of the panel 51 in the measurement view-field 53 and extracts one portion of the light blocking region 54, thereby determining the film thickness measurement point P to a registered position with respect to the corner or edge of the pattern Q.

Figure 34A:
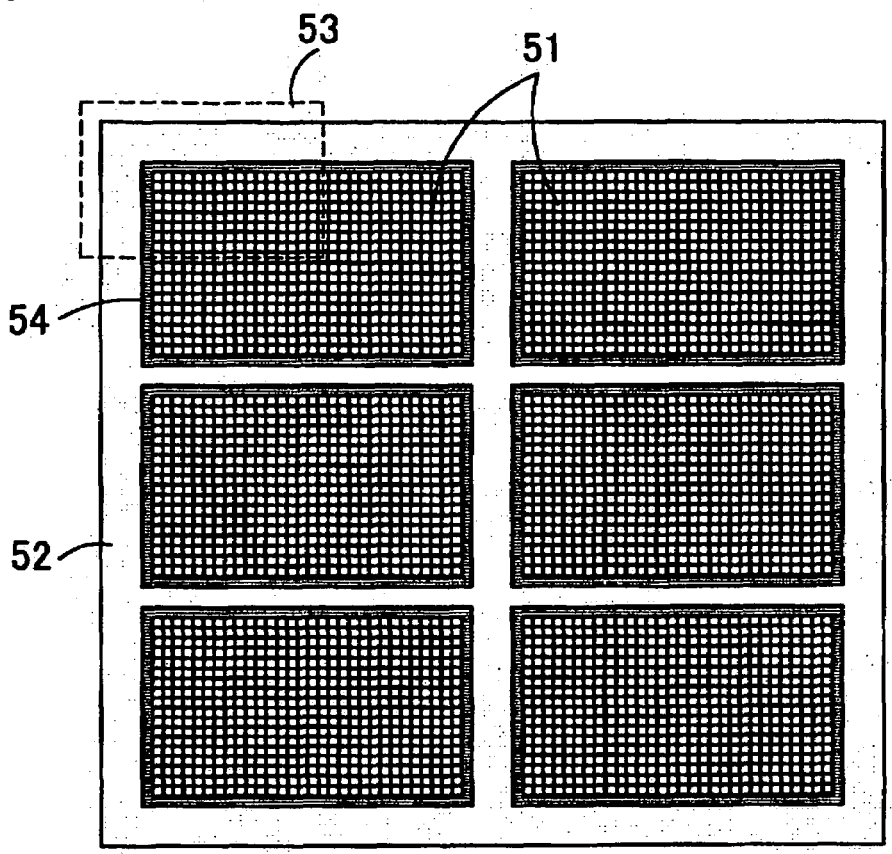
FIGS. 34A and 34B explain a variant of the ninth film thickness measurement point extraction method.
Figure 34B:
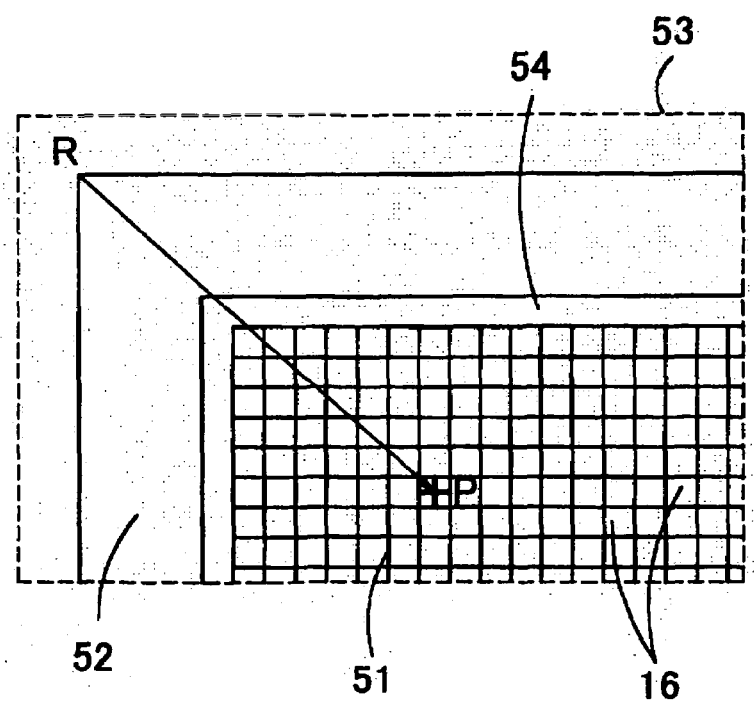

By another method, as shown in FIG. 34A, the mother glass 52 of the sample or the film thickness measuring device 21 is arranged so that the edge portion of the panel 51 and the corner portion of the mother glass 52 may be contained in the measurement view-field 53. Then, from an image in the measurement view-field 53 such as shown in FIG. 34B, a corner of the mother glass 52 is extracted as a characteristic point R. Next, when a point in any of the pixel openings 16 is instructed by the operator as the measurement point P, the signal processing portion 28 may measure a displacement of the measurement point P with respect to the characteristic point R and store this displacement in the storage portion 35.

Figure 35B:
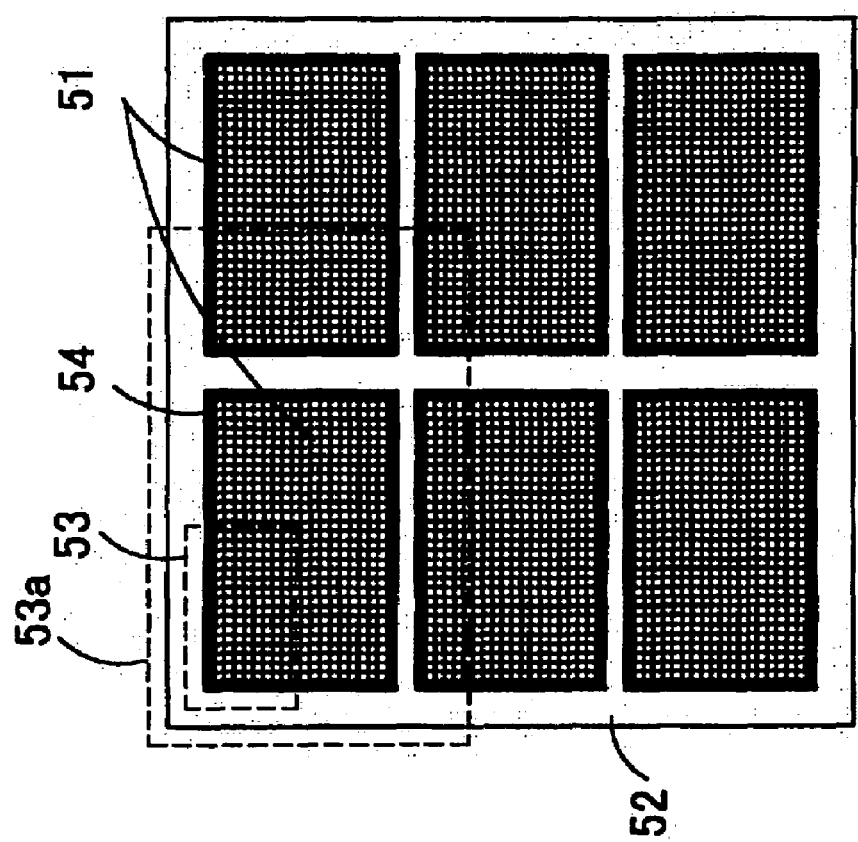
FIGS. 35A and 35B explain a merit of the film thickness measurement point extraction method of FIG. 33 or FIG. 34.
Figure 35A:
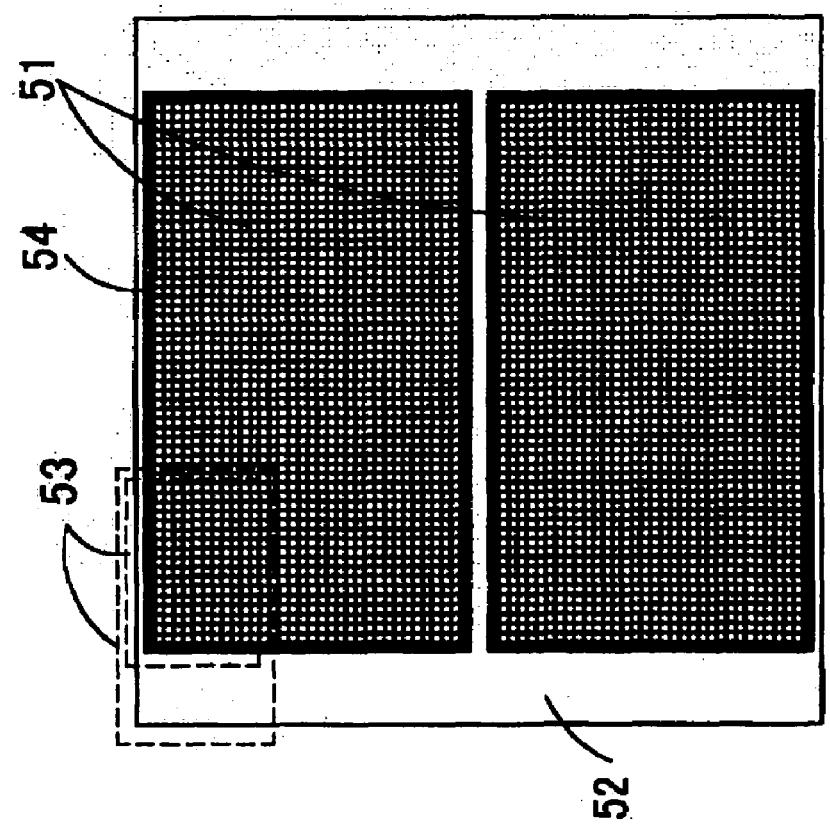

By the method shown in FIG. 33 or 34, as shown in FIG. 35A, even if the panels 51 formed on the mother glass 52 are different from each other in shape or the number of them, it is possible to set the film thickness measurement point P for each product class, thereby accommodating production of many product classes. Although by the method shown in FIG. 33, when a large measurement view-field such as shown in FIG. 35B is set, several patterns Q (i.e., edge portions of several panels 51) are contained in the measurement view-field and so it is necessary to decide which one of the panels 51 should be used as a reference, by reducing a size of the measurement view-field 53 such as shown in FIG. 35B, a retrieval range can be reduced, thereby increasing a speed of pattern extraction. Further, the observation area may be adjusted for each product type of the measurement target.

Third Embodiment

Figure 36:
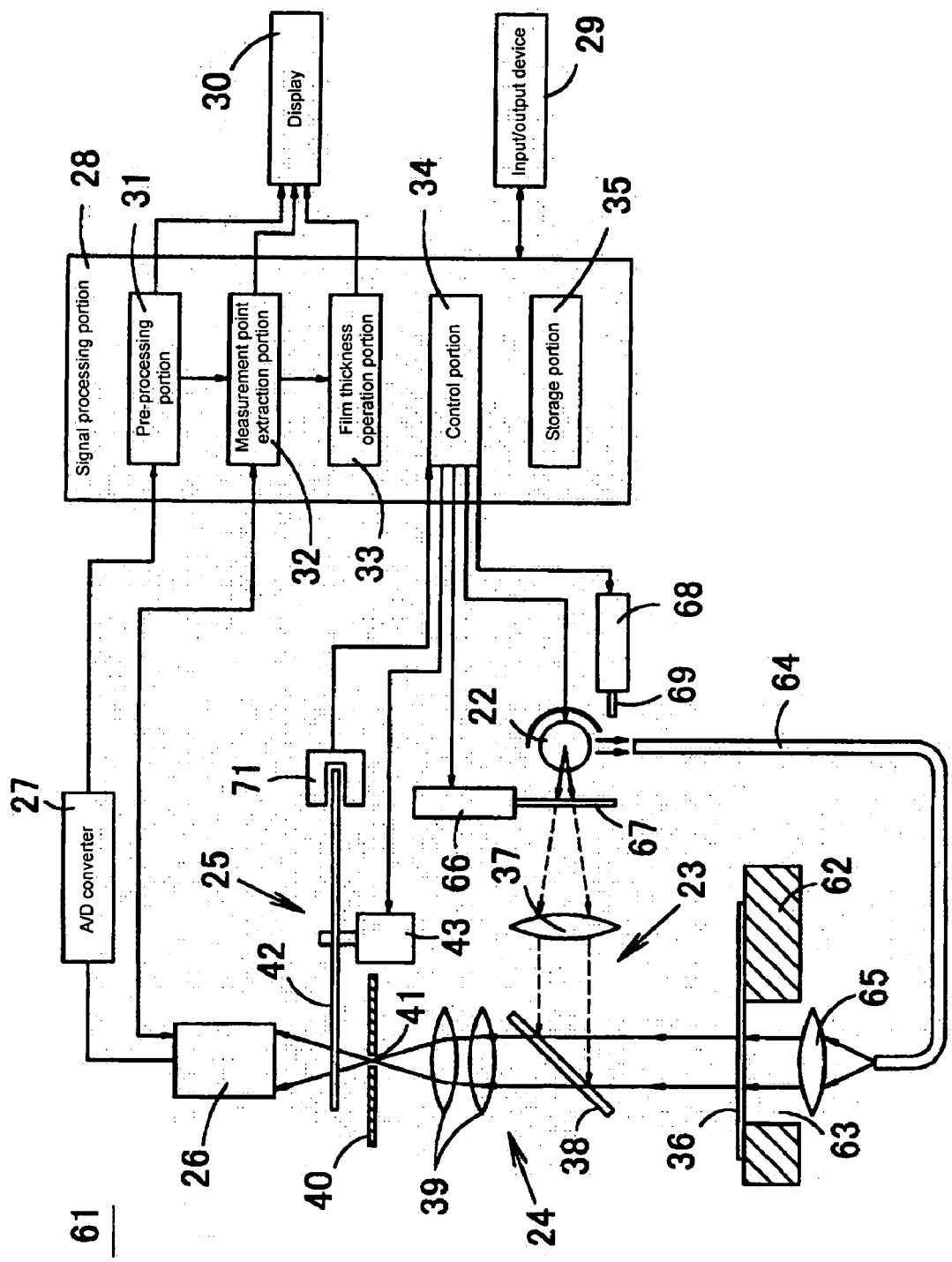
FIG. 36 shows a configuration of a film thickness measuring device according to a third embodiment of the present invention.

FIG. 36 shows a configuration of a chromaticity measuring device 61 according to the third embodiment of the present invention. This chromaticity measuring device 61 can measure a film thickness and chromaticity of a color film used in an LCD panel etc. in which colors cells of a red resist, a green resists, and a blue resist are arranged on a glass substrate. This chromaticity measuring device 61 has the same configuration as that of the film thickness measuring device 21 shown in FIG. 4, so that different resects are described mainly. At a midpoint of a support bench 62 on which the measurement target 36 is placed, an opening 63 is formed, so that white light of a light source 22 constituted of a halogen lamp is guided through an optical fiber 64 to a position below the opening 63 and, white light emitted from a tip of the optical fiber 64 is converted into parallel light through a collimation lens 65, with which the measurement target 36 having transparency is irradiated through the opening 63 and, light which has passed through the measurement target 36 passes through an image formation optical system 24, a pinhole 41, and a spectroscope 25 to form its image on a photo-detector 26. Further, shutters 67 and 69 driven by solenoids 66 and 68 are arranged in a space between the light source 22 and a light projection optical system 23 and a space between the light source 22 and the optical fiber 64 respectively so that light emitted from the light source 22 may be switched to a side of the light projection optical system 34 and a side of the optical fiber 64. Further, as the photo-detector 26, a camera mounted with a silicon-made CCD is used.

Figure 37:
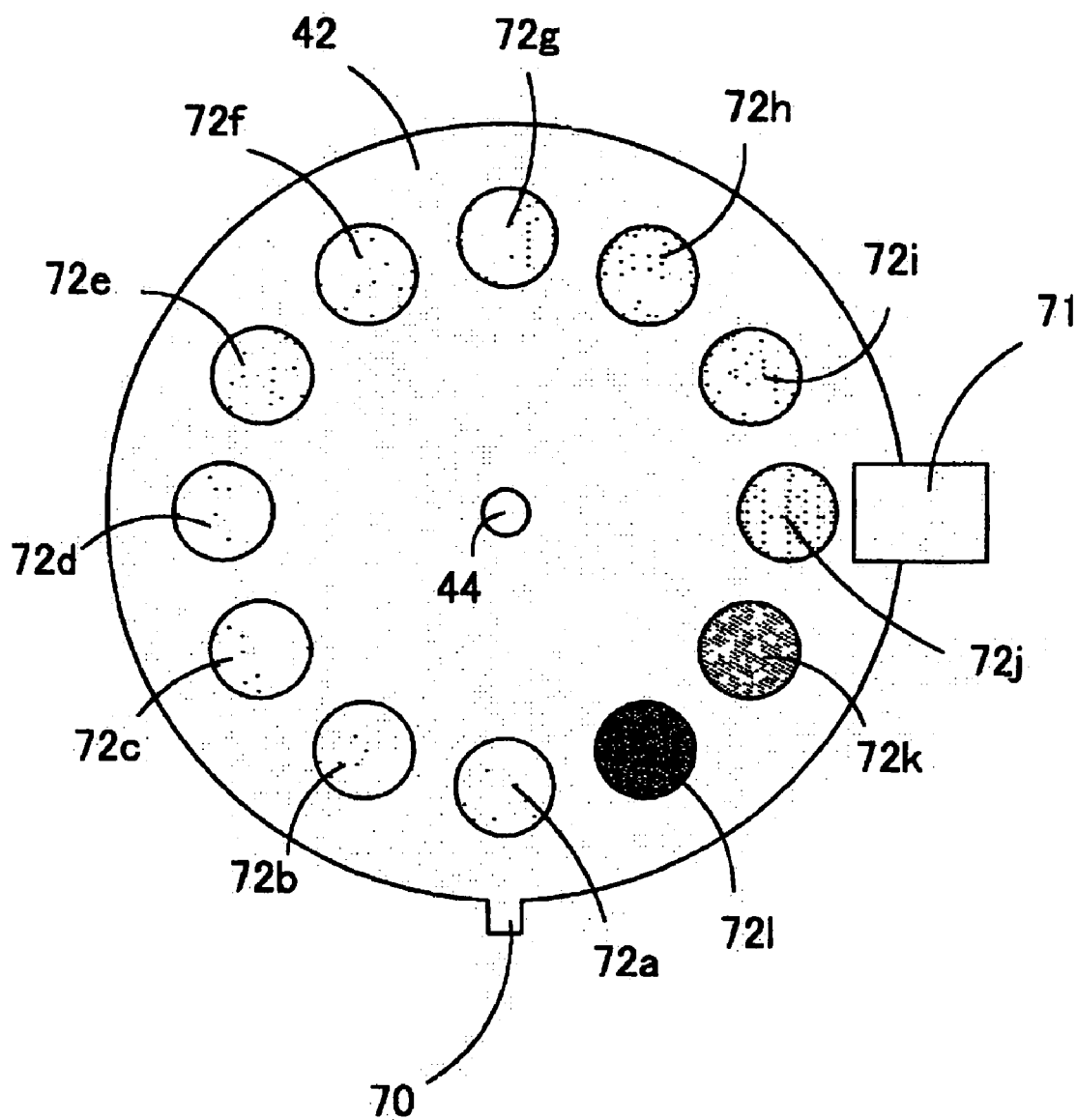
FIG. 37 shows a plan view of a spectroscope used in the film thickness measuring device of FIG. 36.

At an edge of a filter plate 42 that constitutes the spectroscope 25, a projection 70 or a notch for detecting an origin point is provided as shown in FIG. 37, so that by detecting a position of the projection 70 or the notch by an origin point detection sensor 71 such as a photo-coupler, a position of an origin point of the filter plate 42 can be detected. How much the filter plate 42 has rotated from the origin point is determined by the number of pulses given to a control motor 43 for rotating the filter plate 42. On the filter plate 42, there are arranged side by side a spectroscopic filter 72a for a wavelength of 450 nm, a spectroscopic filter having a wavelength of 550 nm, and a spectroscopic filter 72c for a wavelength of 650 nm in this order from the origin point, which are followed by spectroscopic filters 72d-72g for visible light wavelengths of 400 nm, 500 nm, 600 nm, and 700 nm as well as spectroscopic filters 72h-72l for near-infrared wavelengths of 800 nm, 850 nm, 900 nm, and 1000 nm.

In a case where a film thickness and chromaticity of each of the color filters by using such a chromaticity measuring device 61, the following operations are performed. First, the filter plate 42 s positioned at the origin point and the spectroscopic filter 72a is positioned over the pinhole 41. The optical system is of a transmission type and the shutter 67 is closed and the shutter 69 is open, so that white light emitted from the tip of the optical fiber 64 is converted by the collimation lens 65 into parallel light, with which the color filter (measurement target 36) is irradiated upward. The filter plate 42 is rotated in this condition to switch the spectroscopic filter 72a for a wavelength of 450 nm, the spectroscopic filter 72b for a wavelength of 550 nm, and the spectroscopic filter 72c for a wavelength of 650 nm in this order, thereby obtaining images of spectroscopic wavelengths 450 nm, 550 nm, and 650 nm. In these spectroscopic images, the transmission factor becomes highest for a red resist, a green resist, and a blue resist, so that it is possible to detect the position of each color of resists by using the signal processing portion 28.

Next, spectroscopic images are taken in by using the spectroscopic filters 72d-72 for visible light wavelengths of 400-700 nm. Then, by the above-mentioned method, a film thickness measurement point is determined to obtain by operations chromaticity of each of the color resists at the film thickness measurement position from image data obtained at the film thickness measurement position.

After that, the shutter 69 is closed and the shutter 67b is opened to perform coaxial down-emission lighting from the above. Then, the spectroscopic images are taken in by using the spectroscopic filters 72g-72l for near-infrared wavelengths of 700-1000 nm, to measure a film thickness of each of the color resists at the film thickness measurement position from the image data obtained at the film thickness measurement position.

Figure 38:
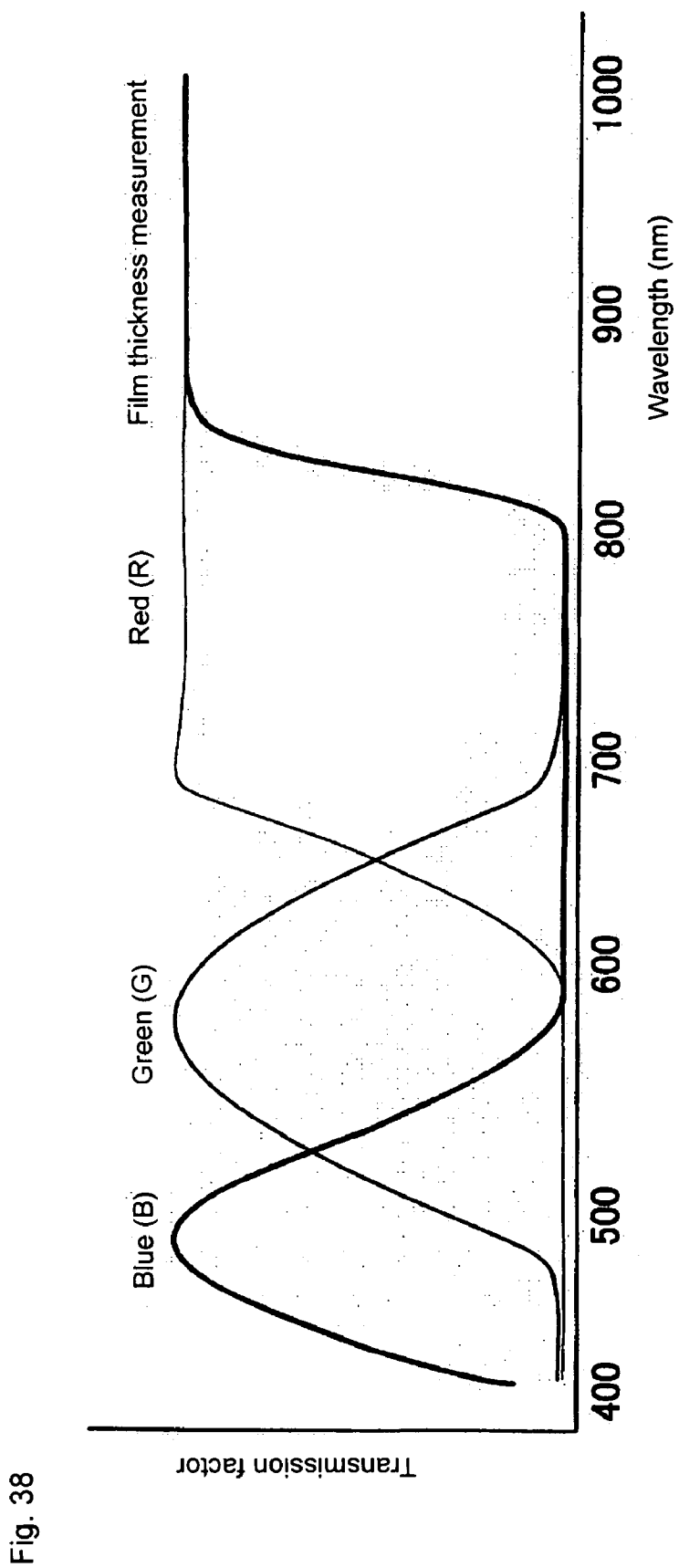
FIG. 38 shows transmission factors of red, green, and blue filters which constitute a color filter to be measured.

FIG. 38 shows transmission factors of the red (R), green (G), and blue (B) resists of the color filter. The red resist has transparency properties on a wavelength side larger than about 600 nm and the green and blue resists have transparency properties on a wavelength side larger than about 800 nm. Therefore, by using, as the light source 22, a halogen lamp which emits light in a wavelength band of 800-1000 nm to output an image signal in a wavelength of 800-100 nm from the photo-detector, it is possible to measure a film thickness without having an interference wave disturbed by an effect of a pigment of the color filter. Further, by using a transmission type optical system with a wavelength of 400-700 nm, chromaticity of the color filter can be measured.

The red, green, and blue resists of the color filter have their respective wavelength regions which are not transparent in a visible wavelength range. The blue resist is transparent in a region of 500-700 nm, the green resist is transparent in rages of 400-500 nm and 600-700 nm, and the red resist is transparent in a range of 630-700 nm. Therefore, by the above-mentioned method, first a resist color is specified and then, all of spectroscopic images in the visible light region and the infrared region are obtained, after which the spectroscopic images in these transparent wavelength regions can be used to obtain a film thickness by operations, thereby improving a film thickness accuracy because of an increase in the number of points and improvement of wavelength noise resistance as compared to the case of measuring a film thickness only in a near-infrared region of wavelengths of 700-1000 nm.

By the optical film measuring device of the present invention, it is possible to determine a film measurement position based on an image in an observation area which is larger than a film measurement position taken in by the photo-detector and obtain by operations the properties of a film based on a signal extracted from this film measurement position, so that it is unnecessary to align the film measurement position of a measurement target with a predetermined position each time each of the measurement targets is measured. Therefore, it is possible to measure the film properties at a predetermined film measurement position irrespective of the position of the measurement target.

As a result, it is possible to reduce time required in film thickness measurement and measure properties of films efficiently. Further, the film can be measured in short time, so that it is possible to perform in-line measurement in a condition where this optical film measuring device is mounted to a production line. Furthermore, the measurement target need not be aligned, so that an alignment stage is unnecessary, thereby enabling reducing device costs and simplifying film measurement.

What is claimed is:

1. An optical film measuring device for measuring properties of a film of a measurement target at a predetermined film measurement position in an observation area, comprising:
    a light source for emitting white light or multi-color light;
    a light-projection optical system for projecting a light emitted from the light source to the observation area in the form of parallel light;
    a photo-detector of a region-divided type in which a plurality of detection cells for receiving the light from the observation area are collected in a two-dimensional space;
    an image-formation optical system for forming an image of light reflected by the measurement target in the observation area onto the photo-detector, said light being the light projected by the light-projection optical system;
    a spectroscopic part that can make only light in a predetermined wavelength band incident upon the photo-detector and selectively switch the wavelength band; and
    a signal processing portion for extracting a pattern registered beforehand from the image of the measurement target taken in by the photo-detector, defining a predetermined position in this pattern as the film measurement position, obtaining a plurality of images having different wavelengths selectively switched by the spectroscopic part with respect to the measurement target, and thereby measuring the properties of the film of the measurement target at a predetermined film measurement position based on the signals of the detection cells corresponding to the film measurement position of each of the plurality of images,
    wherein the signal processing portion obtains images having different wavelengths selectively switched by the spectroscopic part with respect to the measurement target and determines the film measurement position with the image in which a contrast of an image becomes highest among the plurality of images obtained.

2. The optical film measuring device according to claim 1, comprising:
    a part for registering in a storage part as the registered pattern a pattern extracted on the basis of a characteristic point when the characteristic point is specified from an outside through an input part on an image of a measurement target taken in by the photo-detector; and
    a part for displaying the extracted pattern in a condition where the pattern is superimposed on an image in the observation area.

3. The optical film measuring device according to claim 1, comprising:
    a part for extracting a pattern contained in a partial image and registering it in a storage part as the registered pattern when the partial image is specified from an outside through an input part on an image of a measurement target taken in by the photo-detector; and
    a part for displaying the extracted pattern in a condition where the pattern is superimposed on an image in the observation area.

4. The optical film measuring device according to claim 1, comprising:
    a part for extracting as a pattern a region which has a roughly constant luminosity and contains one point or one region when the one point or one region is specified from an outside through an input part on an image of a measurement target taken in by the photo-detector; and
    a part for displaying the extracted pattern in a condition where the pattern is superimposed on an image in the observation area.

5. The optical film measuring device according to claim 1, comprising a part for providing color display of each pixel in a color that corresponds to a wavelength band having a highest detected light intensity in a visible light region of images that correspond to a plurality of obtained wavelength bands so that a film measurement position can be set on the color-displayed image.

6. The optical film measuring device according to claim 1, wherein in a case where an image of a measurement target to be taken in by the photo-detector is a periodic repetition of a pattern having a predetermined shape, the signal processing portion extracts a characteristic point of the pattern from the image of the measurement target taken in by the photo-detector and defines as the film measurement position a predetermined position with respect to the characteristic point.

7. The optical film measuring device according to claim 1, wherein in a case where an image of a measurement target to be taken in by the photo-detector has a frame-shaped pattern, a center of intersections of the patterns is defined as the film measurement point.

8. The optical film measuring device according to claim 1, wherein:
the signal processing portion determines a plurality of film measurement positions based on an image in the observation area taken in by the photo-detector; and
the signal processing portion obtains by operations properties of a film based on a signal extracted from the plurality of film measurement positions.

9. The optical film measuring device according to claim 1, wherein:
an image of a measurement target is taken in by the photo-detector in such a manner as to contain a corner of the measurement target; and
the corner of the measurement target is extracted from the image taken in by the photo-detector, to determine the film measurement position with respect to the corner of the measurement target thus extracted.

10. The optical film measuring device according to claim 1, wherein the spectroscopic part is equipped with spectroscopic filters for visible light to near-infrared light regions, and the device further comprising a part for measuring chromaticity and film thickness of a colored thin film.

11. The optical film measuring device according to claim 1, comprising a spectroscopic filter for a wavelength of about 450 nm, a spectroscopic filter for a wavelength of about 550 nm, a spectroscopic filter for a wavelength of about 650 nm, a plurality of spectroscopic filters for a visible light region, and a plurality of spectroscopic filters for near-infrared through infrared regions are arranged side by side, at least the spectroscopic filter for a wavelength of about 450 nm, spectroscopic filter for a wavelength of about 550 nm, and spectroscopic filter for a wavelength of about 650 nm being arranged consecutively in sequence.

12. The optical film measuring device according to claim 1, wherein reflected light and transmission light of light emitted from the light source with which a measurement target has been irradiated can be taken in by the photo-detector.

13. The optical film measuring device according to claim 1, wherein in a case where a plurality of measurement targets formed as divided on a substrate is to be measured:
an image of the measurement target is taken in by the photo-detector in such a manner as to contain a corner of the substrate; and
the corner of the substrate is extracted from the image taken in by the photo-detector, to determine the film measurement position of the measurement target with respect to the extracted substrate corner.

14. The optical film measuring device according to claim 13, wherein a region of the observation area where an image is taken in by the photo-detector can be set for each of product types.

15. An optical film measuring device for measuring properties of a film of a measurement target at a predetermined film measurement position in an observation area, comprising:
a light source for emitting white light or multi-color light;
a light-projection optical system for projecting a light emitted from the light source to the observation area in the form of parallel light;
a photo-detector of a region-divided type in which a plurality of detection cells for receiving the light from the observation area are collected in a two-dimensional space;
an image-formation optical system for forming an image of light reflected by the measurement target in the observation area onto the photo-detector, said light being the light projected by the light-projection optical system;
a spectroscopic part that can make only light in a predetermined wavelength band incident upon the photo-detector and selectively switch the wavelength band; and
a signal processing portion for extracting a pattern registered beforehand from the image of the measurement target taken in by the photo-detector, defining a predetermined position in this pattern as the film measurement position, obtaining a plurality of images having different wavelengths selectively switched by the spectroscopic part with respect to the measurement target, and thereby measuring the properties of the film of the measurement target at a predetermined film measurement position based on the signals of the detection cells corresponding to the film measurement position of each of the plurality of images,
wherein the spectroscopic part is set so that a contrast of an image may be highest when the film measurement position determination part determines the film measurement position based on the image in the observation area.

16. An optical film measuring device for measuring properties of a film of a measurement target at a predetermined film measurement position in an observation area, comprising:
a light source for emitting white light or multi-color light;
a light-projection optical system for projecting a light emitted from the light source to the observation area in the form of parallel light;
a photo-detector of a region-divided type in which a plurality of detection cells for receiving the light from the observation area are collected in a two-dimensional space;
an image-formation optical system for forming an image of light reflected by the measurement target in the observation area onto the photo-detector, said light being the light projected by the light-projection optical system;
a spectroscopic part that can make only light in a predetermined wavelength band incident upon the photo-detector and selectively switch the wavelength band; and a signal processing portion for extracting a pattern registered beforehand from the image of the measurement target taken in by the photo-detector, defining a predetermined position in this pattern as the film measurement position, obtaining a plurality of images having different wavelengths selectively switched by the spectroscopic part with respect to the measurement target, and thereby measuring the properties of the film of the measurement target at a predetermined film measurement position based on the signals of the detection cells corresponding to the film measurement position of each of the plurality of images, wherein based on information about a configuration of a measurement target, a wavelength band of a spectroscopic image in which a contrast of an image to be taken in by the photo-detector becomes highest is obtained by calculations from an optical constant and a thickness of the measurement target registered beforehand.

* * * * *